US011120079B2

(12) United States Patent
White

(10) Patent No.: US 11,120,079 B2
(45) Date of Patent: Sep. 14, 2021

(54) SYSTEM AND METHOD FOR DISCOVERING PERFORMER DATA

(71) Applicant: Dejuan Frank White, Sherman Oaks, CA (US)

(72) Inventor: Dejuan Frank White, Sherman Oaks, CA (US)

(73) Assignee: Dejuan Frank White, Dolton, IL (US)

( * ) Notice: Subject to any disclaimer, the term of this patent is extended or adjusted under 35 U.S.C. 154(b) by 690 days.

(21) Appl. No.: 15/443,496

(22) Filed: Feb. 27, 2017

(65) Prior Publication Data
US 2018/0246898 A1    Aug. 30, 2018

(51) Int. Cl.
G06F 17/30    (2006.01)
G06F 16/78    (2019.01)
G06Q 10/10    (2012.01)
G06Q 30/06    (2012.01)

(52) U.S. Cl.
CPC ..... G06F 16/7867 (2019.01); G06Q 10/1095 (2013.01); G06Q 30/0631 (2013.01); G06Q 30/0643 (2013.01)

(58) Field of Classification Search
CPC ............ G06F 17/3082; G06F 16/7867; G06Q 10/1093; G06Q 10/1095; G06Q 30/0631; G06Q 30/0643
See application file for complete search history.

(56) References Cited

U.S. PATENT DOCUMENTS

| | | | | |
|---|---|---|---|---|
| 2003/0234787 | A1* | 12/2003 | Hines | G06F 16/958 345/440 |
| 2008/0320547 | A1* | 12/2008 | Lupoi | G06Q 10/10 725/136 |
| 2012/0064956 | A1* | 3/2012 | Das | A63B 71/0616 463/7 |
| 2014/0081435 | A1* | 3/2014 | Wagner | G06Q 10/0639 700/91 |
| 2014/0277627 | A1* | 9/2014 | Bastawros | A63B 71/0669 700/91 |
| 2014/0316832 | A1* | 10/2014 | Devlin | G06Q 10/063112 705/7.14 |
| 2015/0375117 | A1* | 12/2015 | Thompson | A63F 13/35 463/9 |
| 2016/0191434 | A1* | 6/2016 | Rice | G06K 9/00228 709/204 |
| 2017/0004512 | A1* | 1/2017 | Weider | G06Q 30/0201 |
| 2017/0201237 | A1* | 7/2017 | Montgomery | G06Q 10/06 |

* cited by examiner

*Primary Examiner* — Huawen A Peng

(57) ABSTRACT

Systems and methods for presenting performer data are disclosed. Performer data, such as athlete information, may be presented in response to a simple query such as an athlete's jersey number. Performer data may be ranked based on a proximity factor relating to location and time in relation to a user performing the query.

20 Claims, 30 Drawing Sheets

Server App 102

Database 104

GUI 12

Playing Now

| 1212a | 1212b | 1212c |
|---|---|---|
| Pacers vs Celtics | Hawks vs Warriors | Nets vs Mavericks |
| 1214a1  1214a2 | 1214b1  1214b2 | 1214c1  1214c2 |

1210

Recent Plays

Steve Curry — 1222a

Steve Curry makes 26-foot three point jumper — 1226a

*1 minute ago*
NBATV 345

Warriors 55   Hawks 48   1:15 2nd Qtr — 1224a

1228a

Dick Nowitzki — 1222b

Dick Nowitzki makes driving dunk — 1226b

*1 minute ago*
KCAL 9

Mavericks 19   Nets 11   5:31 1st Qtr — 1224b

1228b

Monty Ellis — 1222c

Monty Ellis makes 15-foot jumper — 1226c

*2 minutes ago*
TWC 43

Pacers 99   Celtics 97   3:16 4th Qtr — 1224c

SYSTEM AND METHOD FOR DISCOVERING PERFORMER DATA

COPYRIGHT NOTICE

A portion of the disclosure of this patent document contains material that may be subject to copyright protection. The copyright owner has no objection to the facsimile reproduction by anyone of the patent document or the patent disclosure as it appears in the Patent and Trademark Office patent file or records, but otherwise reserves all copyright rights.

TECHNICAL FIELD

The present application relates generally to the field of information processing, and particularly to systems and methods for delivering performer data such as athlete information in response to a query comprising a jersey number.

BACKGROUND

Attending live sporting events is a popular activity for many people around the world and is a multi-billion dollar per year industry. Many people enjoy the atmosphere and excitement of attending live sporting events. Millions of people, both fans and non-fans alike, attend various sporting events including contests in such sports as baseball, basketball, football, hockey, and soccer, where an athlete may typically wear a team uniform with an identifying number, commonly called a "jersey number", that is often placed on the back of a jersey, on a helmet, or on another article of clothing or equipment. Other sporting events may involve athletes performing individually but wearing such identifying numbers. In some cases, a number may be printed on a tag that is pinned to the athlete's clothing, such as in a marathon. Additionally, many people attend spectator sporting events for auto racing, boxing, golf, horse racing, tennis, and many other sports where athletes or performers may or may not be identified by numbers.

Many casual fans of sports may attend live spectator sporting events but may lack in-depth knowledge about athletes participating in these events. Vendors at the stadium or venue hosting the event may provide printed programs that may include, for example, team rosters, biographical and statistical information about the athletes, photographs, and other information. These programs may add to the enjoyment of attending live spectator sporting events, particularly for casual fans, as the programs may provide otherwise unknown information. Typically, such programs are printed well in advance of the spectator sporting event and may contain outdated information. Also, such printed programs comprise static information. At certain events, fans in attendance may receive additional information about the athletes from large screen displays such as those known under the trademark of Jumbotron™ and available from Sony Corporation. However, these displays are not interactive, so that audience members have little or no control over what information is presented. Consequently, audience members may turn to their smartphones and other mobile personal computing devices to obtain additional information about the athletes.

Viewers of live spectator sporting events who do not attend such events may view such event on televisions, smartphones, tablets, and other computing devices either by network, cable, or other broadcast television providers, including Internet streaming services. Such broadcasts may be augmented by graphical overlays that provide athlete information as well as by commentary by analysts such as play-by-play announcers and so-called "color commentators." While the information provided through such graphical overlays and analysts may be more up to date than information provided in printed programs, the acquisition of athlete information through such means is still a non-interactive experience for the viewer. Additionally, graphical overlays are typically temporary and may disappear from the screen before a viewer has the opportunity to read the information. Audio commentary provided by analysts may likewise be missed by the viewer and may suffer from the additional problem that it may be difficult to hear in crowded environments, such as in sports bars. Consequently, viewers may likewise turn to their smartphones and other mobile personal computing devices to obtain additional information about the athletes.

Present methods for discovering information about athletes suffer many deficiencies. For example, conventional search engines generally require a spectator to know the names of athletes. Some casual fans lack in-depth knowledge of athletes participating in spectator sports events. Although some athletes in some sports may be identified by names and/or initials printed on their uniforms or jerseys, this is not always the case. Moreover, search results from conventional search engines may be unreliable, inaccurate or out of date, and may have broken links. Users of such search engines may become frustrated by the task of sifting through multiple search results to discover athlete information during live games.

Fans at live spectator events may be accustomed to receiving background information and detailed analysis during their experiences of viewing televised sports events at home. Increasingly, fans may also interact with other members of the viewing public during televised broadcasts or webcasts using social media channels and through specialized apps. For example, as an analogue outside the context of televised sporting events, fans of popular reality television shows may interact using predetermined hashtags during live-broadcast events.

SUMMARY

In one embodiment of the invention, a method of presenting athlete information is disclosed. The method involves receiving at a server from an electronic device a query for athlete information, wherein the query comprises an athlete's jersey number and the server comprises a processor and storage. The method involves determining a location associated with the electronic device and accessing a database of play-by-play information to identify one or more athletes involved in a recent play. In some cases, determining a location associated with the electronic device is based on location information derived from one or more of a GPS location, IP address, network location data, or a user-specified preference or setting. The method further involves using the received query, the location associated with the electronic device, and the identified one or more athletes to infer that a particular athlete's information is desired. In some cases, inferring that a particular athlete's information is desired may be based on one or more of the following: the particular athlete's jersey number matches the received query, the particular athlete is associated with a location near the location associated with the electronic device, and the particular athlete was involved in a recent play. In some cases, the particular athlete is associated with a location that is based on one of a location of a venue where the particular athlete is performing in a particular athletic event, a media market associated with the particular athletic event, or a location based on a user preference or setting. The method further involves accessing a database associating jersey numbers with individual athletes and athlete information to deliver athlete information for the particular athlete to the electronic device in response to the query. In some cases, the athlete information for the particular athlete also comprises a purchase recommendation or a betting proposition.

In another embodiment of the invention, a method of presenting athlete information is disclosed. The method involves receiving during a time window at a server from an electronic device a query for athlete information, wherein the query comprises an athlete's jersey number and the server comprises a processor and storage. The method involves determining a location associated with the electronic device. In some cases, determining a location associated with the electronic device is based on location information derived from one or more of a GPS location, IP address, network location data, or a user-specified preference or setting. The method further involves retrieving athlete profiles for one or more candidate athletes associated with the jersey number and performing near the location and proximal to the time window by accessing a database of schedule information relating to athletic events to identify one or more athletic events occurring near the location and proximal to the time window, accessing a database of roster information of athletes to identify one or more candidate athletes participating in the one or more athletic events and associated with the jersey number from the received query, and accessing a database associating jersey numbers with individual athletes and athlete information. In some cases, accessing a database of schedule information relating to athletic events to identify one or more athletic events occurring near the location may be based on one of a location of a venue where an athletic event is occurring, a media market for an athletic event, or a location based on a user preference or setting. The method further involves ranking the one or more athlete profiles based on a proximity factor, delivering at least of a portion of the one or more athlete profiles to the electronic device according to the ranking and in response to the received query. In some cases, the proximity factor may relate to one or more of the following: proximity of the location of associated with the electronic device to a location associated with a candidate athlete and temporal proximity of the time window of the received query to the scheduled time of an athletic event in which a candidate athlete performs. In some cases, the at least one of the one or more athlete profiles comprises a purchase recommendation or a betting proposition.

In another embodiment of the invention, a method for presenting athlete information is disclosed. The method involves receiving at a server from an electronic device a query for athlete information, wherein the query comprising an athlete's jersey number and the server comprising a processor and storage. The method further involves determining a location associated with the electronic device and retrieving a set of athlete profiles for candidate athletes by accessing a database associating jersey numbers with individual athletes and athlete information, each candidate athlete having a jersey number matching the query. The method further involves ordering the candidate athletes using an athlete ranking based on a proximity factor relating to the location of the electronic device, and delivering at least a portion of the set of athlete profiles for the candidate athletes to the electronic device, the athlete profiles being ordered according to the athlete ranking. In some cases, at least one athlete profile comprises a purchase recommendation or a betting proposition. In some cases, the method further involves identifying one or more athletic events occurring near the location by accessing a database of schedule information relating to athletic events, and ranking the candidate athletes based on a proximity factor relating to a temporal proximity to the received query. In some cases, identifying one or more athletic events occurring near the location is based on one of a location of a venue where an athletic event is occurring, a media market for an athletic event, or a location based on a user preference or setting.

In another embodiment of the invention, a method for presenting athlete information is disclosed. The method involves determining at a remote server a location associated with a local user's electronic device and identifying a first athletic event occurring near the location by accessing a database of schedule information relating to athletic events. In some cases, identifying a first athletic event occurring near the location is based on one of a location of a venue where first athletic event is occurring, a media market for the first athletic event, or a location based on a user preference or setting. The method further involves identifying a first set of athletes participating in the first athletic event by accessing a database of roster information of athletes, and retrieving athlete profiles for the first set of athletes by accessing a database associating jersey numbers with individual athletes and athlete information. The method further involves delivering to the device schedule information for the first athletic event along with at least a portion of the athlete profiles for the first set of athletes. In some cases, at least one athlete profile comprises a purchase recommendation or a betting proposition. In some cases, the method further involves identifying one or more athletes involve in a recent play by accessing a database of play-by-play information, ranking the first set of athletes according to an athlete ranking where athletes involved in a recent play are ranked higher than athletes not involved in a recent play, and presenting the at least a portion of the athlete profiles according to the athlete ranking. In some cases, the method further involves identifying a second athletic event occurring near the location by accessing the database of schedule information relating to athletic events, identifying a second set of athletes participating in the second athletic event, retrieving athlete profiles for the second set of athletes accessing the database associating jersey numbers with individual athletes and athlete information, and delivering to the device schedule information for the second athletic event along with at least a portion of the athlete profiles for the second set of athletes. In some cases, the method further involves ordering the first athletic event and the second athletic event according to an event ranking based on a proximity factor, and presenting the first athletic event and the second athletic event according to the event ranking.

BRIEF DESCRIPTION OF DRAWINGS

The foregoing summary, as well as the following detailed description, will be better understood when read in conjunction with the appended drawings. For the purpose of illustrating the invention, there are shown in the drawings examples that are presently preferred. It should be understood, however, that the invention is not limited to the precise arrangements and instrumentalities shown. In the drawings:

FIG. 12A illustrates an example of a portion of a graphical user interface of an athlete information discovery tool according to an embodiment of the disclosed subject matter;

FIG. 12B illustrates an example of a portion of a graphical user interface of an athlete information discovery tool according to an embodiment of the disclosed subject matter;

FIG. 12C illustrates an example of a portion of a graphical user interface of an athlete information discovery tool according to an embodiment of the disclosed subject matter;

DETAILED DESCRIPTION

Reference will now be made in detail to the present examples of embodiments of the disclosed subject matter illustrated in the accompanying drawings. Wherever possible, the same reference numbers will be used throughout the drawings to refer to the same or like elements.

Figure 1A:
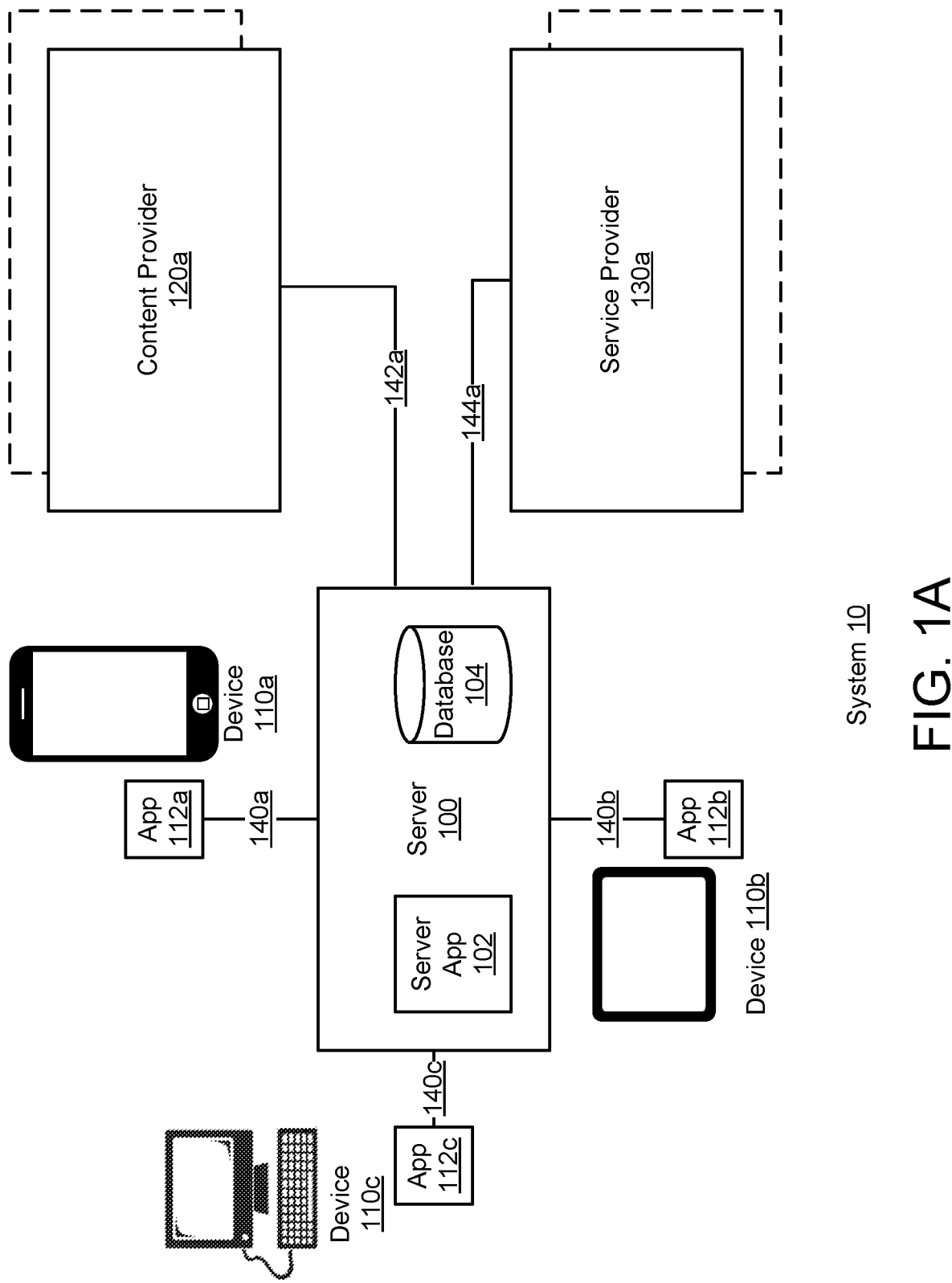
FIG. 1A illustrates an example system according to an embodiment of the disclosed subject matter.

FIG. 1A illustrates an example system according to one embodiment of the disclosed subject matter. In FIG. 1A, system 10 comprises server 100 communicatively coupled to content providers 120, such as content provider 120a shown here, via communication links 142, such as communication link 142a shown here. Server 100 is also communicatively coupled to service providers 130, such as service provider 130a shown here, via communications links 144 such as communication link 144a shown here. Server 100 also comprises server app 102 and database 104, which will be described in more detail herein. Server app 102 communicates with client apps 112, such as client apps 112a, 112b, and 112c shown here, via communication links 140 such as communication links 140a, 140b, and 140c shown here. Client apps 112 execute on various devices 110, such as devices 110a, 110b, and 110c shown here.

Communications links 140 may be, for example, wired or wireless links to the Internet and may traverse public and private networks including cellular/mobile data networks, public switched telephone networks (PSTNs), local area networks (LANs), metropolitan area networks (MANs), wide area networks (WANs), WiFi networks, or other radiofrequency (RF) networks utilizing a range of frequencies and protocols. Communication links 140 may comprise combinations of such networks and may utilize cable, fiber optic, microwave, satellite, and other communications channels and connections. Communications links 142 and 144 may also be wired or wireless links to the Internet or may also comprise private links such as through dedicated or leased lines or through a virtual private network (VPN).

Server 100 may comprise a network of interconnected computing devices. Consequently, server app 102 may comprise a front-end interface executing on one or more computing devices and communicating with a back-end interface executing on one or more computing devices. Similarly, database 104 may be distributed across multiple storage and computing devices without limiting the scope of the present invention.

A device 110 may be a smartphone such as device 110*a*, shown here as an Apple iPhone™ running the iOS™ operating system and sold by Apple, Inc. Device 110*a* may also be a smartphone running the Android™ operating system and manufactured and sold by various companies, or it may be a smartphone running any one of a number of other mobile operating systems including Microsoft Windows™, FirefoxOS™, and the like. Device 110 may alternatively be a tablet computing device such as device 110*b* shown here, and may similarly be running any one of a number of mobile operating systems. Device 110 may also be a personal computer, such as device 110*c* shown here as a desktop computer. Device 110*c* may also be a laptop computer, and it may be running any one of a number of PC operating systems including, for example, a version of Microsoft Windows™, Apple OS™, ChromeOS™, or a version of Linux. Device 110 may also be a smartwatch or other wearable computing device.

In other embodiments, device 110 may also be a so-called "smart TV" or a separate device communicatively coupled—either by a wired or a wireless connection—to a TV or monitor such as a set-top box, video playback device, stick computer, USB dongle, or other peripheral device capable of executing a client app. Likewise, device 110 may also be a headset or other peripheral device communicatively coupled to a smartphone, tablet computing device, or desktop or laptop computer, such as a headset capable of providing a virtual reality (VR) or augmented reality (AR) experience. In all cases, device 110 executes a client app 112 that communicates with server app 102 running on server 100. Client app 112 may be, for example, a free-standing client application or it may be a web-app or applet executing through a web browser interface.

In one embodiment, server app 102 and its corresponding client apps 112 may comprise, for example, an athlete information discovery tool that delivers information about individual athletes across a variety of sports. Server app 102 may store static athlete information in database 104 for later retrieval. Static athlete information may comprise, for example, biographical data about individual athletes.

Continuing with this example, server app 102 may also gather and retrieve dynamic athlete information from content providers 120. Dynamic athlete information from content providers 120 may comprise, for example, updated player statistics, information relating to player sports betting propositions, player rankings, news from various media sources, and video and audio recordings of player interviews and highlights. Dynamic athlete information may also comprise, for example, multimedia information derived from an athlete's social media channels such as Facebook™ profiles and pages, Twitter™ feeds, Instagram™ feeds, YouTube™ channels, and the like. Such multimedia information may also be derived, for example, from social media channels of third parties. Such third parties may include, for example, followers and non-followers of an athlete who may be engaged in posting to social media about the athlete. Dynamic athlete information may also comprise, for example, scheduling information for an athlete's upcoming games or contests, including location information for live events as well as schedules for television and radio broadcasts as well as Internet streaming events.

Sill continuing with this example, server app 102 may also gather and retrieve dynamic athlete information from service providers 130. Dynamic athlete information from service providers 130 may comprise, for example, purchase recommendations related to an athlete including tickets for live events and/or transportation fare to those events as well as sports jerseys and other related merchandise. Information relating to player sports betting propositions may also be provided by service providers 130. In one embodiment, server app 102 may also interface with service providers 130 such as, for example, payment service providers, identity providers and SAML providers. Interactions between server app 102 and such service providers 130 may involve exchange of non-athlete information in some instances.

Figure 1B:
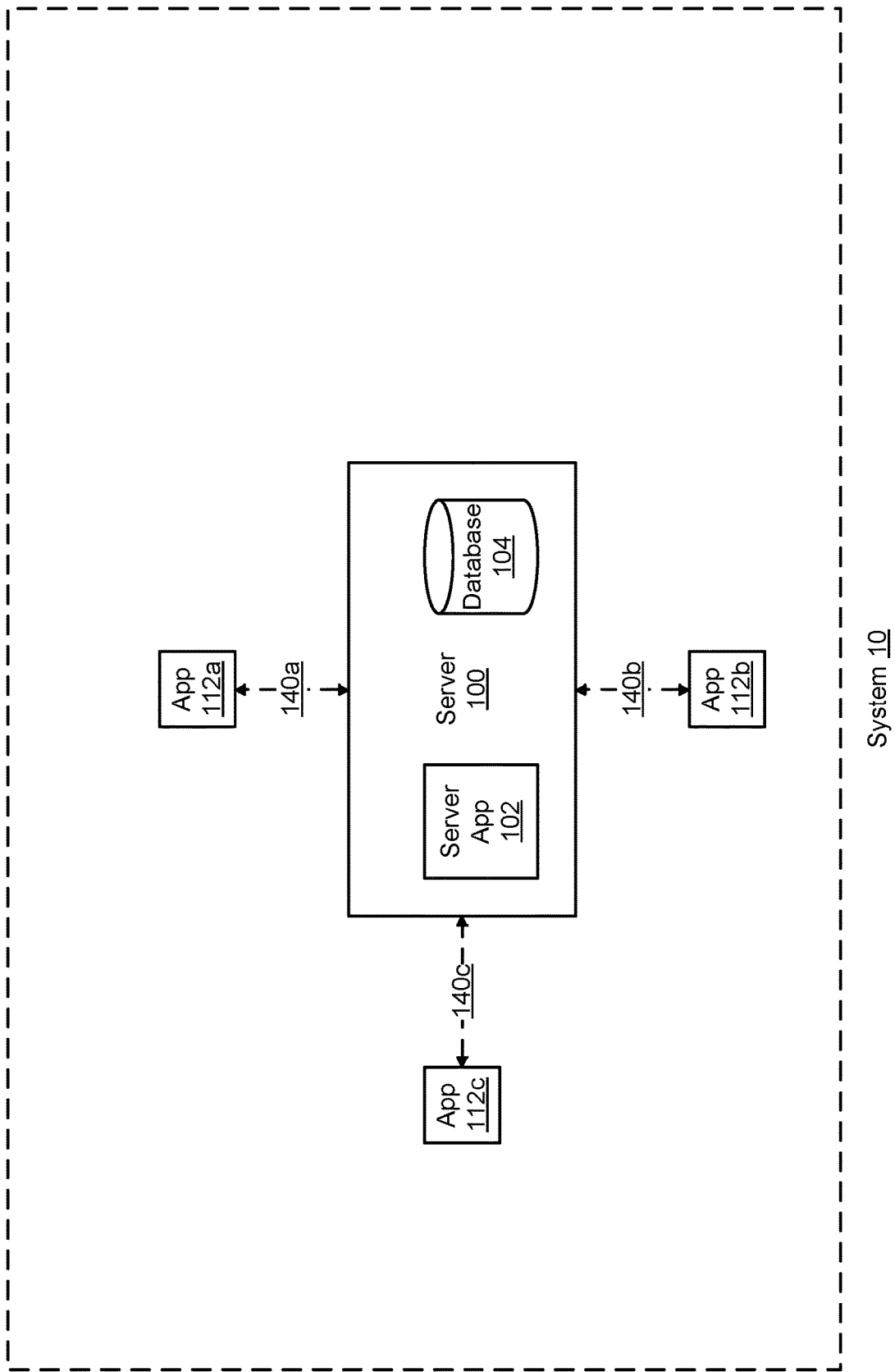
FIG. 1B illustrates an example system according to an embodiment of the disclosed subject matter.

FIG. 1B illustrates a system according to one embodiment of the disclosed subject matter. FIG. 1B is a simplified version of FIG. 1A, with system 10 comprising server 100 communicatively coupled to client applications App 112*a*, 112*b*, and 112*c* through communications links 140*a*, 140*b*, and 140*c*. Server 100 further comprises server app 102 and database 104. As before, client applications 112 may execute on a variety of devices 110 (not shown) including, but not limited to, smartphones, tablet computing devices, personal computers including desktop and laptop computers, smart TVs, VR/AR devices, and smartwatches and other wearable computing devices. Client applications 112 may also execute on network-connected appliances, set-top TV boxes, gaming consoles, network attached storage (NAS) devices, and the like.

Figure 1C:
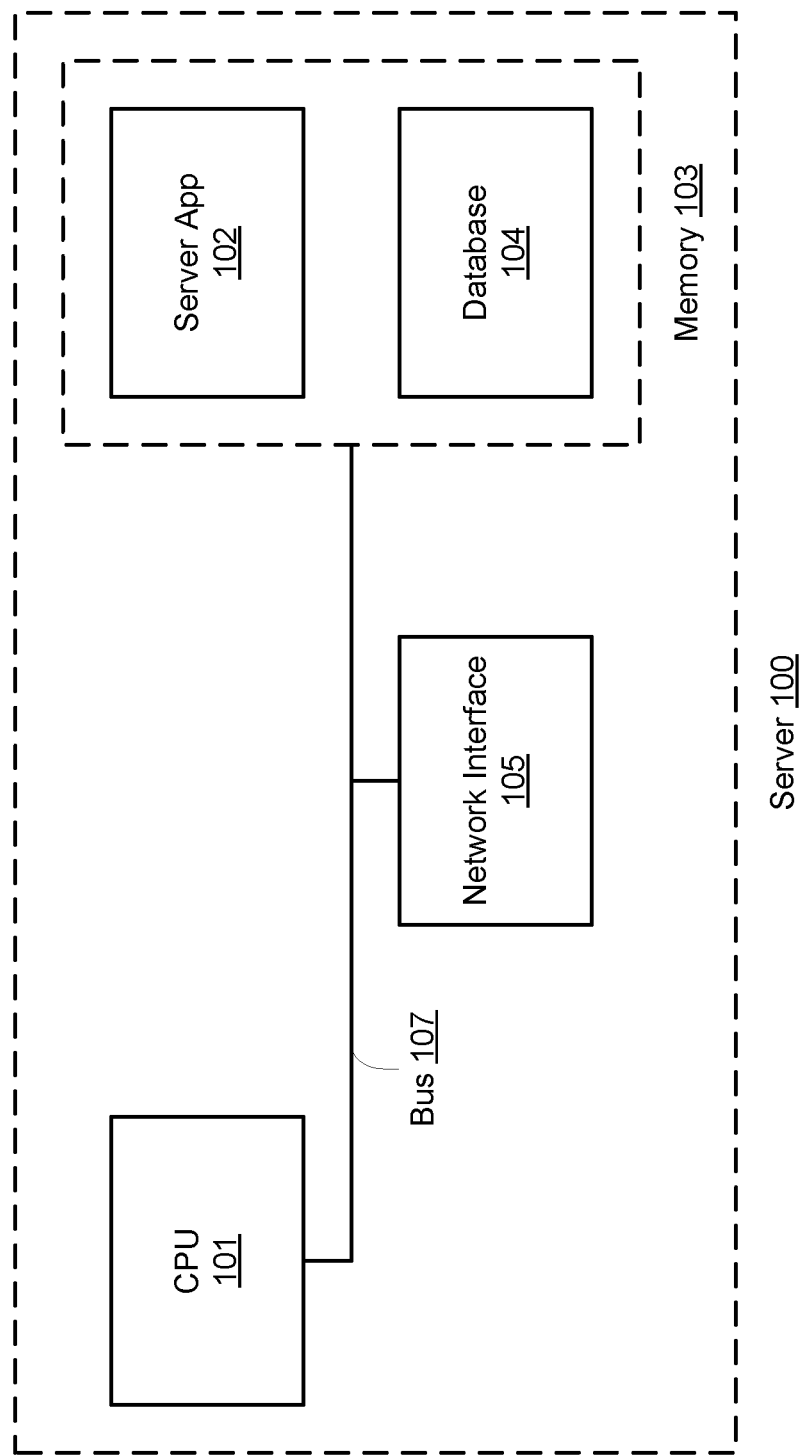
FIG. 1C illustrates an example of a partial system according to an embodiment of the disclosed subject matter.

FIG. 1C illustrates a portion of an example system according to one embodiment of the disclosed subject matter. FIG. 1C shows a more detailed version of the server 100 of FIGS. 1A and 1B. As shown, a server 100 comprises a communications bus 107 interconnecting one or more CPUs 101, a memory 103, and a network interface 105. Memory 103 further comprises server app 102 and database 104. Memory 103 may comprise high-speed random access memory (RAM), such as DRAM, SRAM, DDR RAM or other random access solid state memory devices. Memory 103 may also comprise non-volatile memory, in the form of such as one or more storage devices utilizing magnetic disks, optical disks, flash memory devices, or other non-volatile solid-state storage devices. Memory 103, or alternatively the non-volatile memory devices within memory 103, comprises a non-transitory computer readable storage medium. In some implementations, memory 103 stores programs, modules, and data structures, including software systems and subsystems, for performing the various processes as are further described herein. Network interface 105 provides server 100 with access to the communications links 140, 142, and 144 shown in FIGS. 1A and 1B.

Figure 1D:
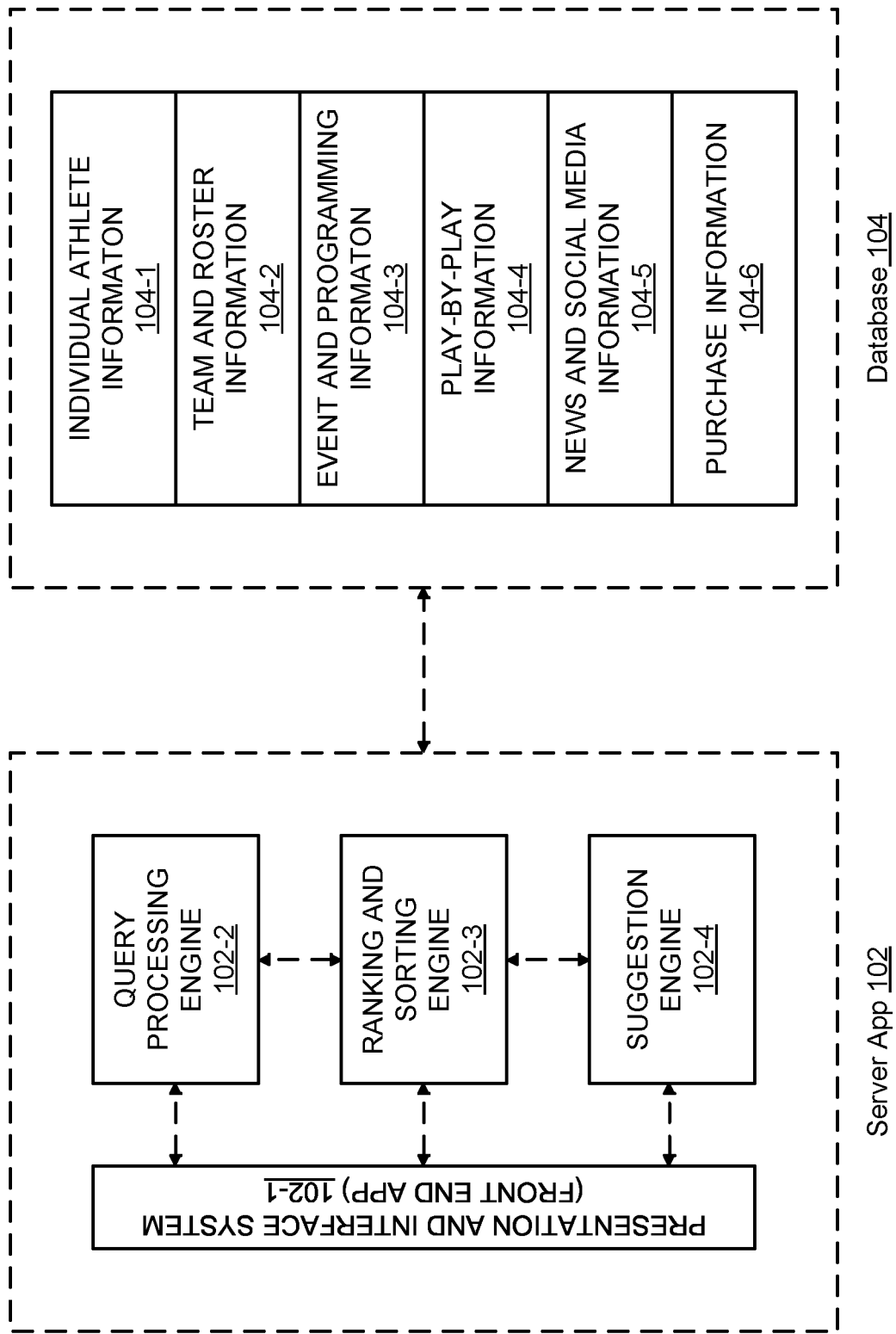
FIG. 1D illustrates an example of a partial system according to an embodiment of the disclosed subject matter.

FIG. 1D illustrates a portion of an example system according to one embodiment of the disclosed subject matter. FIG. 1D shows a more detailed version of the server app 102 and database 104 of FIGS. 1A and 1B. As shown, server app 102 comprises a presentation and interface system 102-1, or a front end app that is communicably coupled to a query processing engine 102-2, a ranking and sorting engine 102-3, and a suggestion engine 102-4, which are in turn communicably coupled to one another. Database 104 as shown here is an athlete information database that comprises individual athlete information 104-1, team and roster information 104-2, event and programming information 104-3, play-by-play information 104-4, news and social media information 104-5, and purchase information 104-6.

In operation, the server app 102 communicates with a corresponding client app 112 through the presentation and interface system (front end app) 102-1. The presentation and interface system 102-1 may organize, package, and present information for the client app 112. The function and operation of each of the back end systems 104-2, 104-3, and 104-4 is now described.

Query processing engine 102-2 receives input from a user device 110 through the front end app 102-1 and processes queries based on such input by accessing the various portions of database 104 to retrieve responsive information matching the queries. As used herein, the term "query" may refer to an action or state that results in the server app 102 receiving input that will trigger the query processing engine 102-2 to access database 104 in order to retrieve responsive information. As such, in some cases, the received input may be in the form of an active query, such as one comprising text input in the form of a jersey number. In other cases, the received input may be in the form of a selection by a user of a client app 112 by tapping on an icon or link within the client app 112 in order to choose a sport or league, a game or event, a venue, a media channel or market, a product or service, an individual athlete, or other option. In still other cases, the received input may take the form of a passive query comprising location information and/or information relating to user preferences or settings that is received from the client app 112. In some cases, the received input may be in the form of a client profile or user profile that may be based on information either stored in client app 112, generated in real-time, or a combination of both. In some cases, the query processing engine 102-2 transforms a received query from a jersey number to an individual athlete's name. This is illustrated and described, for example, in FIGS. 4B and 4C and the corresponding text.

In many cases, the query processing engine 102-2 may retrieve multiple sets of matching information in response to a query such, for example, as multiple athlete names corresponding to a single jersey number or multiple games or athletic events in progress or scheduled proximal to a given time window. In some cases, the query processing engine 102-2 may retrieve candidate sets of information, which may be filtered by ranking and sorting engine 102-3.

Ranking and sorting engine 102-3 may rank and sort information retrieved from database 104 by the query processing engine 102-2. In some embodiments, the ranking and sorting process may be applied to individual athletes who share a common jersey number. In some cases, ranking and sorting of individual athletes may be based on a proximity factor relating to, for example, geographical distance in relation to a location associated with a user's device or a temporal proximity. In other cases, the ranking and sorting of individual athletes may be based on recent play-by-play information. In still other cases, the ranking and sorting of individual athletes may be based on user preferences or settings, news, and social media information (such as trending topics). In other embodiments, the ranking and sorting process may be applied to individual athletes who do not share a common jersey number, to teams, games or event, products, or other category of information, and such ranking and sorting may similarly be based on a proximity factor or other useful criteria.

Suggestion engine 102-4 may select particular information from database 104 in order to make suggestions or recommendations to a user. For example, the suggestion engine 102-4 may access various portions of database 104 to select information about an individual athlete, team, game or event, or purchase recommendation for a user based on a received input from the client app 112. In some embodiments, the received input may comprise a query such an athlete's jersey number. In addition to the query processing engine 102-2 retrieving information about a particular athlete in response to that query, the suggestion engine 102-4 may retrieve information, for example, about another athlete, such as a rival athlete or a similar athlete. As another example, the suggestion engine 102-4 may also retrieve information from database 104 comprising purchase information relating to merchandise or tickets to a game or event. In other embodiments, the suggestion engine 102-4 may operate to facilitate a passive discovery mode for server app 102 as will be further described herein. In such case, for example, the received input from client app 112 would not comprise an active query such as an athlete's jersey number. Instead, the received input from client app 112 may comprise, for example, information relating to a location associated with a user's device 110. Suggestion engine 102-4 may also select information based on, for example, a proximity factor relating to geographical proximity and/or temporal proximity.

Having described the general operation of the server app 102 including the front end app 102-1 and the back-end systems 102-2, 102-3, and 102-4, the descriptions of various embodiments that follow may refer generally to the server app 102 without specific reference to individual components.

Figure 1E:
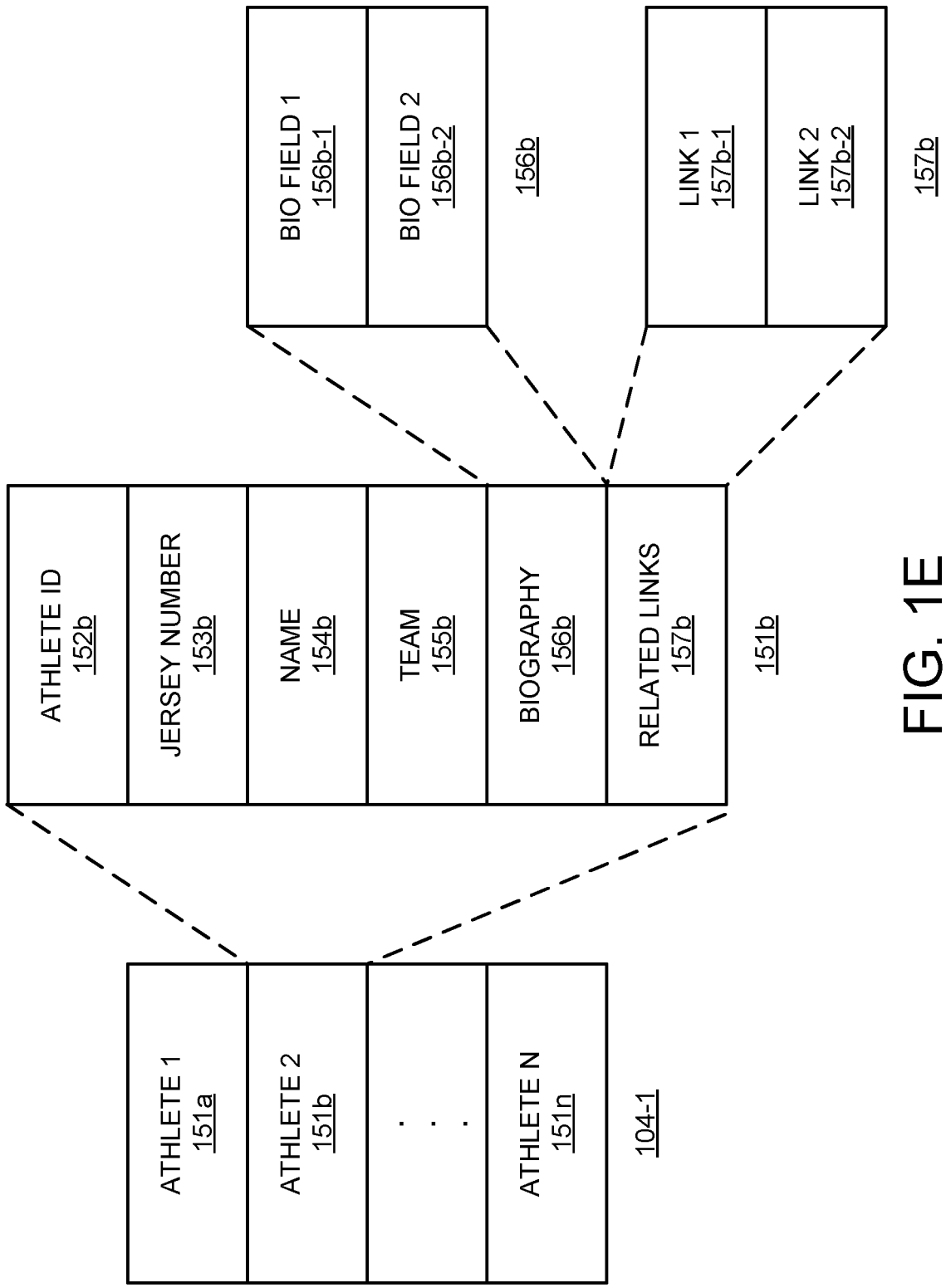
FIG. 1E is a block diagram illustrating an example of a data structure for individual athlete information in an athlete information database according to an embodiment of the disclosed subject matter.

FIG. 1E is a block diagram illustrating an example of a data structure for storing individual athlete information 104-1 in an athlete information database according to an embodiment of the disclosed subject matter. The data structure 104-1 comprises a plurality n of records 151a-151n, each of which corresponds to a specific individual athlete. Records 151 may be individual athlete profiles (or partial profiles). Record 151a corresponds to specific individual Athlete 1, record 151b corresponds to specific individual Athlete 2, and record 151n corresponds to specific individual Athlete N. In some embodiments, each individual athlete information record 151 or athlete profile may comprise additional information fields such as an Athlete ID 152 (a unique ID corresponding to the specific individual), an athlete's Jersey Number 153, an athlete's Name 154, an athlete's Team 155, an athlete's Biography 156, and an athlete's Related Links 157. Shown here is an expanded view of Record 151b for Athlete 2, including fields 152b, 153b, 154b, 155b, 156b, and 157b. In this example, Biography 156b further includes Bio Field 1 (156b-1) and Bio Field 2 (156b-2). These additional Bio Fields may relate to, for example, an athlete's position, date of birth, school attended, salary, and other biographical information. Related Links 157b further includes fields for Link 1 (157b-1) and Link 2 (157b-2), which may relate to, for example, multimedia links such as video highlights, statistics, and other information that may be associated with an athlete.

Figure 1F:
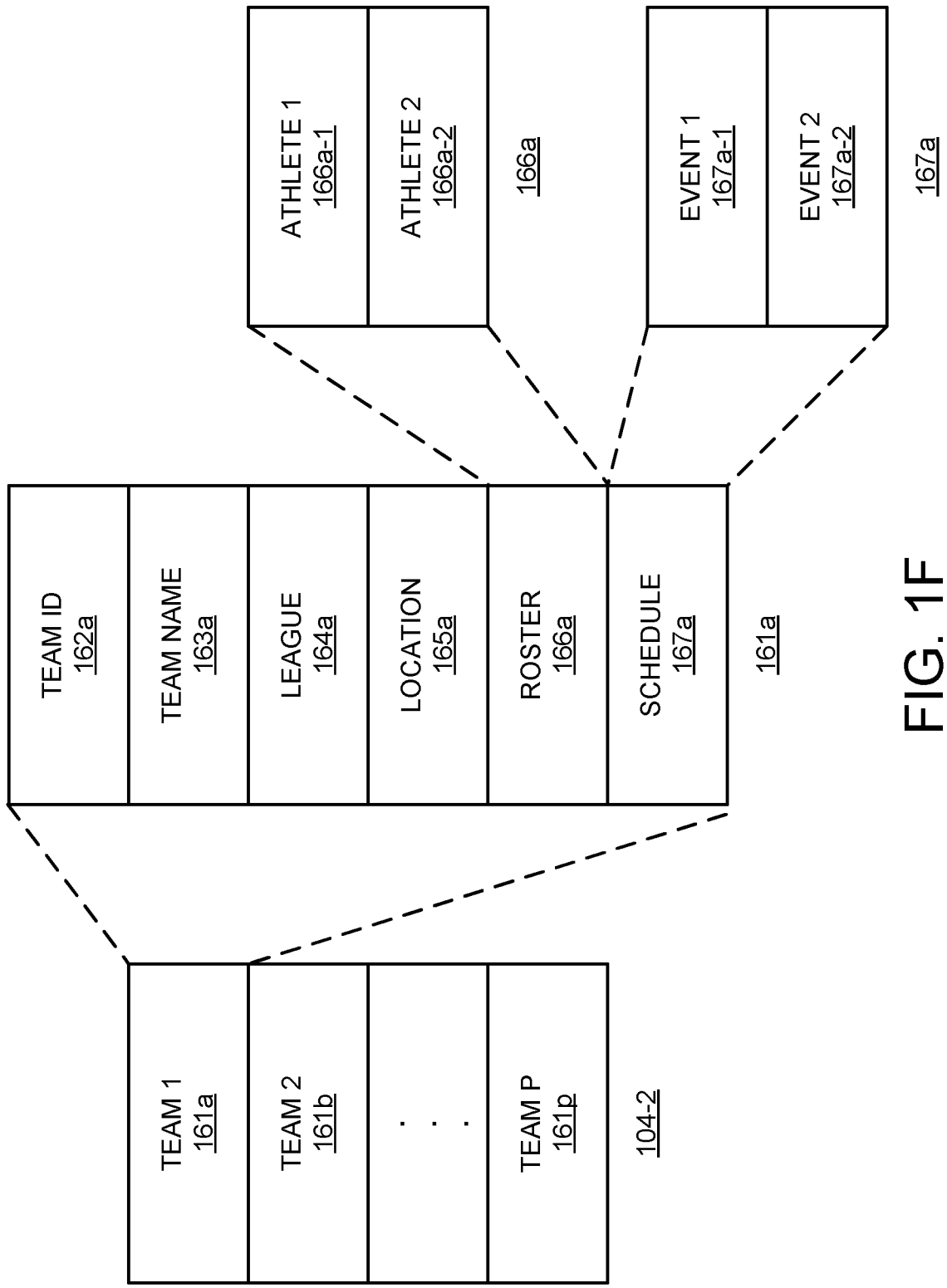
FIG. 1F is a block diagram illustrating an example of a data structure for team information in an athlete information database according to an embodiment of the disclosed subject matter.

FIG. 1F is a block diagram illustrating an example of a data structure for storing team and roster information 104-2 in an athlete information database according to an embodiment of the disclosed subject matter. The data structure 104-2 comprises a plurality p of records 161a-161p, each of which corresponds to a specific team. Records 161 may be team profiles (or partial profiles). Record 161a corresponds to Team 1, record 161*b* corresponds to Team 2, and record 161*p* corresponds to Team P. In some embodiments, each team record 161 or team profile may comprise additional information fields such as a Team ID 152 (a unique ID corresponding to the specific team), a team's Name 163, a team's League 164 in which the team competes, a team's Location 165 (which may be a permanent location, a current location, or which may specify a media market), a team's Roster 166, and a team's Schedule 167. Shown here is an expanded view of Record 161*a* for Team 1, including fields 162*a*, 163*a*, 164*a*, 165*a*, 166*a*, and 167*a*. In this example, Roster 166*a* further includes fields for Athlete 1 (166*a*-1) and Athlete 2 (166*a*-2). These additional Athlete fields specify members of the roster of Team 1. Schedule 167*a* further includes fields for Event 1 (167*a*-1) and Event 2 (167*a*-2), which may relate to, for example, Team 1's upcoming scheduled games.

Figure 1G:
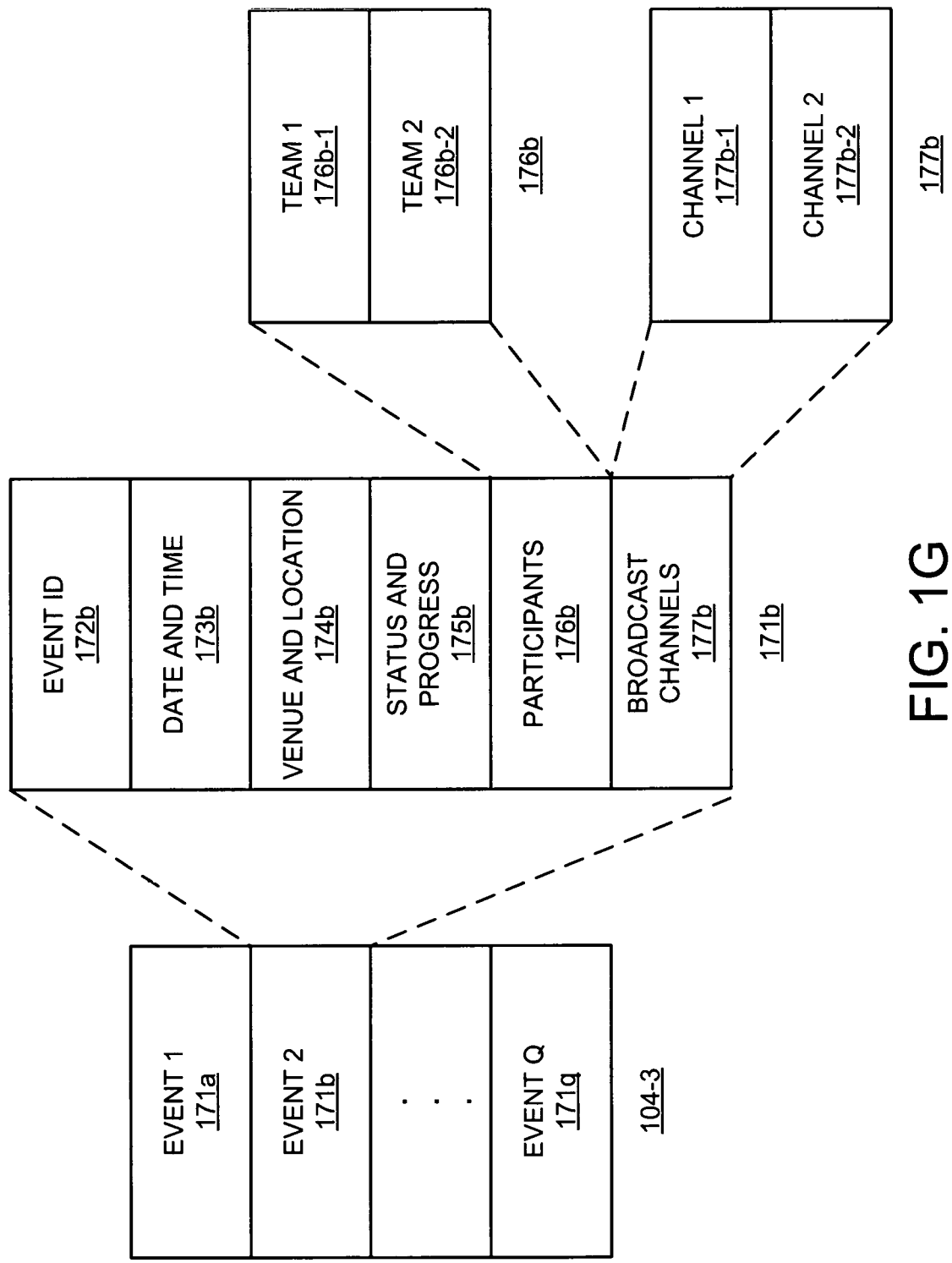
FIG. 1G is a block diagram illustrating an example of a data structure for event and programming information in an athlete information database according to an embodiment of the disclosed subject matter.

FIG. 1G is a block diagram illustrating an example of a data structure for storing event and programming information 104-3 in an athlete information database according to an embodiment of the disclosed subject matter. The data structure 104-3 comprises a plurality q of records 171*a*-171*q*, each of which corresponds to a specific athletic event. Records 171 may be event profiles (or partial profiles). Record 171*a* corresponds to Event 1, record 171*b* corresponds to Event 2, and record 171*q* corresponds to Event Q. In some embodiments, each event record 171 or event profile may comprise additional information fields such as an Event ID 152 (a unique ID corresponding to the specific event), an event's schedule Date and Time 173, an event's Venue and Location 174 where the event is occurring (alternatively the location may relate to a media market), an event's Status and Progress 175 (which may relate to the score as well as the time remaining or portion completed), an event's Participants 176, and an event's Broadcast Channels 177 where the event is being broadcast. Shown here is an expanded view of Record 171*b* for Event 2, including fields 172*b*, 173*b*, 174*b*, 175*b*, 176*b*, and 177*b*. In this example, Participants 176*b* further includes fields for Team 1 (176*b*-1) and Team 2 (176*b*-2). These additional Team fields specify the participating Teams 1 and 2. Broadcast Channels 177*b* further includes fields for Channel 1 (177*b*-1) and Channel 2 (177*b*-2), which may relate to, for example, media channels which are broadcasting Event 2.

As has been used herein, the term "field" may refer to a data structure or part of a data structure that may itself include sub-fields or meta-data fields.

Figure 2A:
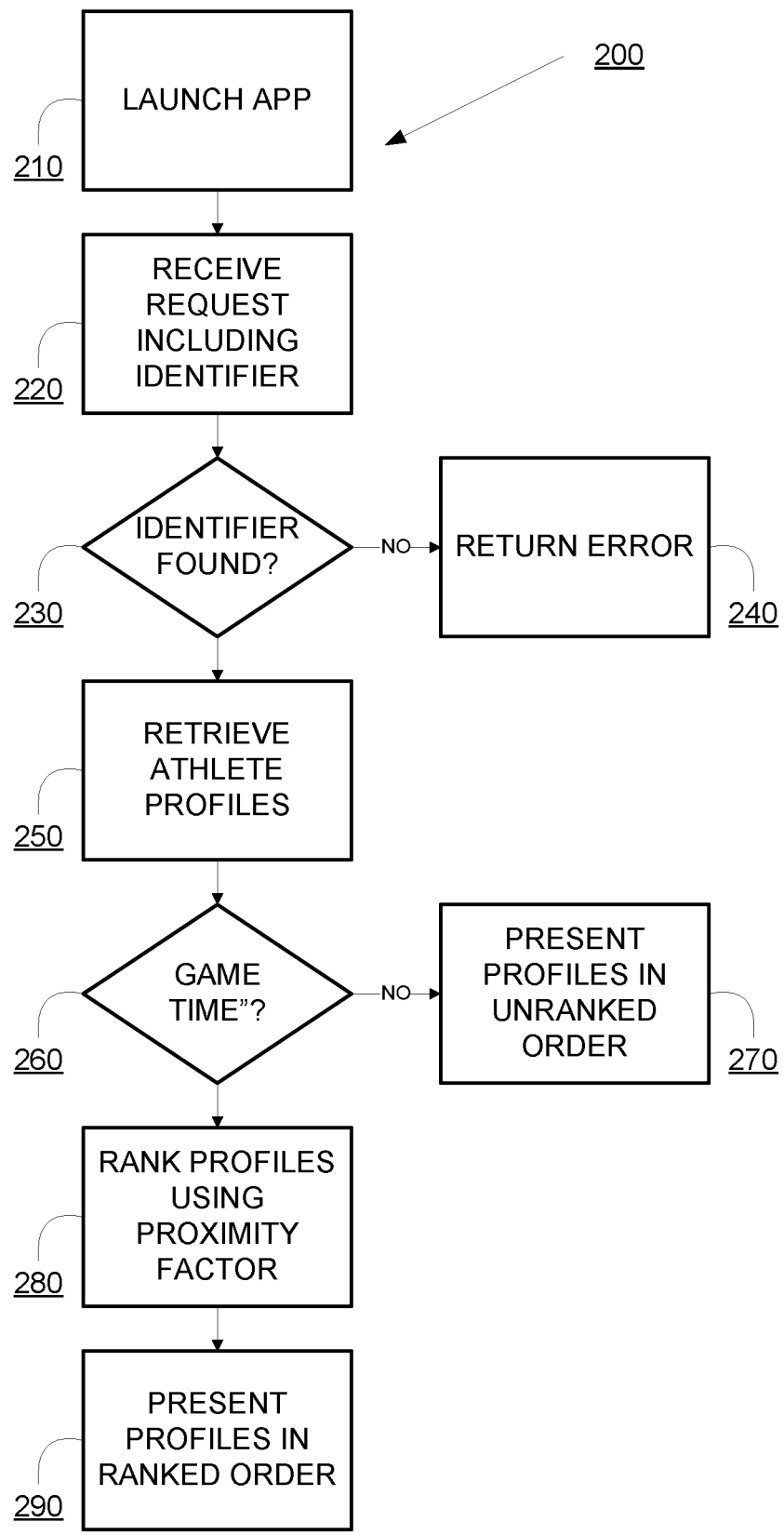
FIG. 2A is a block diagram illustrating a method for processing a request for athlete information according to an embodiment of the disclosed subject matter.

FIG. 2A is a block diagram illustrating a method for processing a request for athlete information according to an embodiment of the disclosed subject matter. Each of the operations shown in FIG. 2A may correspond to instructions stored in a computer memory or computer readable storage medium. Referring to FIG. 2A and with reference to FIG. 1A, the method 200 begins at step 210 with the block labeled "LAUNCH APP". At this step, a user launches an app, such as a mobile client application executing on the user's mobile device, and the mobile client application establishes a communications session with a server application executing on a server. For example, App 112*a* may establish a communications session with server app 102 executing on server 100. The server app 102 and the corresponding mobile client application App 112*a* may comprise, for example, an athlete information discovery tool.

The method 200 proceeds to step 220 with the block labeled "RECEIVE REQUEST INCLUDING IDENTIFER". At this step, the mobile client application receives a request from the user for athlete information. The request may include an identifier such as, for example, a jersey number or other numeric identifier. For example, App 112*a* may receive a request from the user and transmit the request to server app 102. The identifier may also be, for example, any other pseudo-unique ID comprising an alphanumeric string or combination. The term "pseudo-unique ID" as used herein means an identifier that may be unique in a narrow or local context but not necessarily unique in a broader or global context. For example, an athlete's jersey number may be unique in a narrow or local context of a team's current active roster, but the number may not be unique in a broader or global context of all teams in the league or in other leagues. It should be noted that while even a person's legal name is not necessarily a truly unique identifier—since 2 individuals may share a common legal name—it would normally not be utilized as a pseudo-unique ID according to embodiments of the disclosed subject matter. However, other names such as, for example, nicknames or usernames from social media accounts could be used as pseudo-unique IDs.

The method 200 proceeds to step 230 with the decision block labeled "IDENTIFIER FOUND?" At this step, a server application queries a database of athlete information using the identifier as a key. For example, server app 102 may query database 104 using the identifier received at step 220.

If the identifier is not found in the database, the method 200 proceeds to step 240 with the block labeled "RETURN ERROR". At this step, the server application returns an error message. For example, server app 102 may return an error message to client app 112*a*.

If, on the other hand, the identifier is found in the database in step 230, the method 200 proceeds to step 250 with the block labeled "RETRIEVE ATHLETE PROFILES". At this step, the server application selects and retrieves athlete information organized as profiles and corresponding to the identifier from the database. Because the athlete identifier may be a pseudo-unique ID such as a jersey number or other numeric identifier that is common to more than one athlete, the server application may select and retrieve multiple athlete profiles based on a request using a single identifier. For example, server app 102 may query database 104 and select and retrieve athlete information organized as athlete profiles and corresponding to the identifier from steps 220 and 230. Server app 102 may also retrieve, for example, athlete information and other non-athlete information from content providers 120 and service providers 130. Accordingly, the selected and retrieved athlete profiles may comprise a combination of static athlete information and dynamic athlete information, and the profiles may be generated in real-time in response to the request of step 220.

The method 200 continues to step 260 with the decision block labeled "GAME TIME?" At this step, the server application determines whether there are any active or remaining games or sports contests scheduled for the current day. For example, server app 102 determines whether there are any active or remaining games or sports contests scheduled for the current day. Step 260 will be further described with reference to FIG. 2B.

If the determination at step 260 is negative (i.e., it is not game time and there are no active or remaining games or sports contests scheduled for the current day), then the method 200 proceeds to step 270 with the block labeled "PRESENT PROFILES IN UNRANKED ORDER". At this step, the server application presents the athlete profiles selected and retrieved at step 250. For example, server app 102 presents selected and retrieved athlete profiles to a user by sending the selected and retrieved athlete profiles to the user through client app 112a. The server app 102 may present the selected and retrieved athlete profiles in an unranked order. These athlete profiles may be sorted, for example, by sport and/or league, alphabetically by the last names, alphabetically by the names of teams, or by any other pre-determined order.

If, on the other hand, the determination at step 260 is positive (i.e., it is game time and there is at least one active or remaining game or sports contest scheduled for the current day) then the method 200 proceeds to step 280 with the block labeled "RANK PROFILES USING PROXIMITY FACTOR". At this step, the server application ranks the athlete profiles selected and retrieved at step 250 using a proximity factor. For example, server app 102 may rank the athlete profiles selected and retrieved at step 250 using a proximity factor. The proximity factor may be related, for example, to a user's geographical proximity to a live spectator sports event. It may also be related, for example, to a temporal proximity to a scheduled live or broadcasted spectator sports event. The proximity factor and a process of ranking athlete profiles using a proximity factor as in Step 280 will be further described with reference to FIG. 2C.

Finally, the method 200 proceeds to step 290 with the block labeled "PRESENT PROFILES IN RANKED ORDER". At this step, the server application presents the athlete profiles in the ranked order from step 280. For example, server app 102 presents ranked athlete profiles to a user by sending the ranked athlete profiles to the user through client app 112a. The server app 102 may present all of the ranked athlete profiles or only a predetermined subset of the ranked athlete profiles, e.g., only the first 10. The server app may also present anywhere from a portion to the whole of each ranked athlete profile.

Figure 2B:
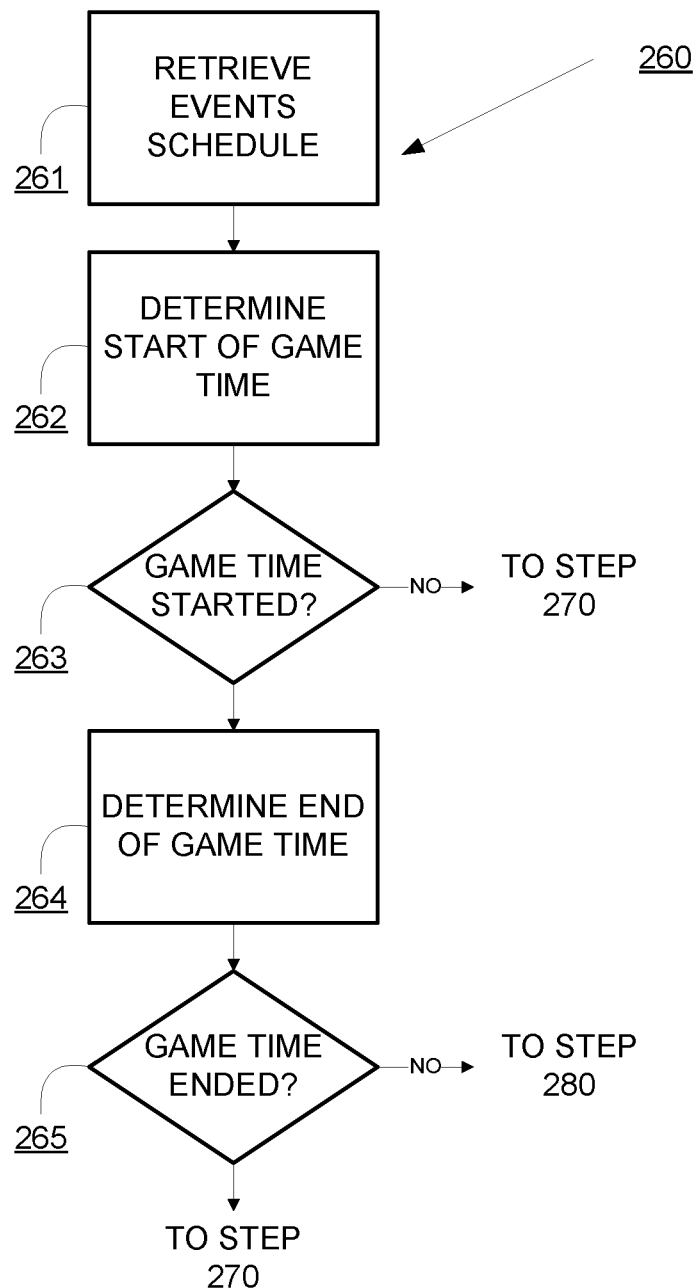
FIG. 2B is a block diagram illustrating a method for determining whether there are any active or remaining games or sports contests scheduled for the current day according to an embodiment of the disclosed subject matter.

FIG. 2B is a block diagram illustrating a method for determining whether there are any active or remaining games or sports contests scheduled for the current day according to an embodiment of the disclosed subject matter. Each of the operations shown in FIG. 2B may correspond to instructions stored in a computer memory or computer readable storage medium. In FIG. 2B, step 260 from the method 200 illustrated in FIG. 2A and described herein is shown in further detail. The process of step 260 begins at step 261 with the block labeled "RETRIEVE EVENTS SCHEDULE". At this step, a server application retrieves an event schedule from a database or from a content provider or a service provider. For example, server app 102 may retrieve an events schedule from database 104 or from content providers 120 or service providers 130. The events schedule may comprise, for example, information about scheduled spectator sporting events. The events schedule may comprise, for example, information related to live and tape-delayed or live streaming broadcast schedules. Such information may include, for example, program schedule information for broadcast television, radio, cable TV, satellite, and Internet or broadband streams. The events schedule may be customized or tailored for specific markets based on, for example, geographical regions or time zones.

The process of step 260 proceeds to step 262 with the block labeled "DETERMINE START OF GAME TIME". At this step, a server application determines the start of "game time." For example, server app 102 may determine from the event schedule retrieved at step 261 the starting time of the first game for the current day. The start of game time may correspond to the actual starting time of the sporting event, or it may correspond to the starting time for a live or tape-delayed broadcast of the sporting event. Thus, the start of "game time" may be different from the start of the sporting event.

The process of step 260 proceeds to step 263 with the decision block labeled "GAME TIME STARTED?" At this step, a server application compares the current time to the start of game time that was determined at step 262. For example, server app 102 may compare the current time to the start of game time that was determined at step 262. If the current time is before the start of game time, then the process of step 260 proceeds to step 270. If, on the other hand, the current time is after the start of game time, then the process of step 260 proceeds to step 264 with the block labeled "DETERMINE END OF GAME TIME". At this step, a server application determines the end of "game time." For example, server app 102 may determine from the event schedule retrieved at step 261 the ending time of the last game for the current day. The end of game time may correspond to the actual ending time of the sporting event, or it may correspond to the ending time for a live or tape-delayed broadcast of the sporting event. Thus, the end of "game time" may be different from the end of the sporting event. Also, while some sporting events generally have a fixed timed duration and consequently a generally predictable end time, other sporting events do not generally have a fixed time duration and consequently may have generally unpredictable end times. Additionally, some sporting events may require overtime periods to determine a winner. As a result, the end of game time may not necessarily correspond to end of the last scheduled game for a current day. For example, the second-to-last scheduled game of the day may end after the end of the last scheduled game for the current day. The server app 102 may receive, for example, periodic updates from content providers 120 and service providers 130 relating to the status of completion for all scheduled games for the current day. In this way, server app 102 may determine the end of game time.

The process of step 260 proceeds to step 265 with the decision block labeled "GAME TIME ENDED?" At this step, a server application compares the current time to the end of game time that was determined at step 264. For example, server app 102 may compare the current time to the end of game time that was determined at step 264. If the current time is before the end of game time, then the process of step 260 proceeds to step 280. If, on the other hand, the current time is after the end of game time, then the process of step 260 proceeds to step 270.

Figure 2C:
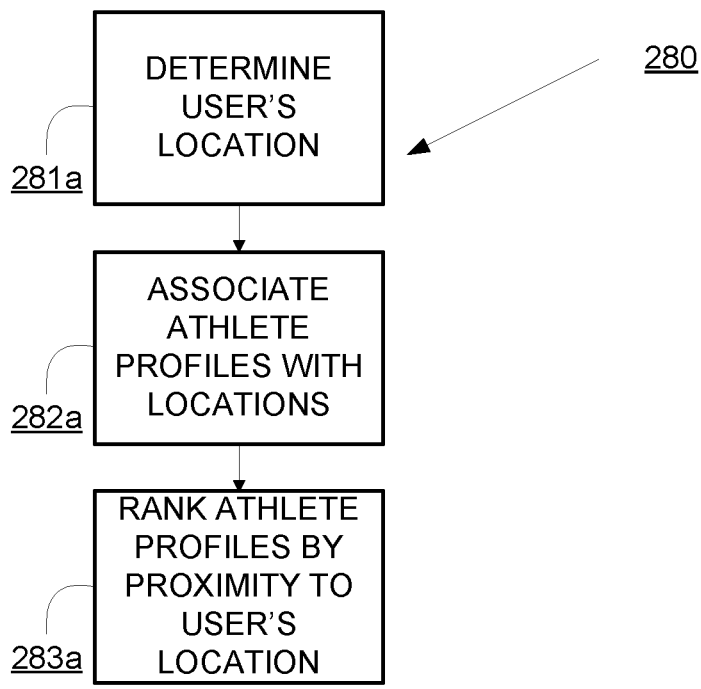
FIG. 2C is a block diagram illustrating a method for ranking athlete profiles using a proximity factor according to an embodiment of the disclosed subject matter.

FIG. 2C is a block diagram illustrating a method for ranking athlete profiles using a proximity factor according to an embodiment of the disclosed subject matter. Each of the operations shown in FIG. 2C may correspond to instructions stored in a computer memory or computer readable storage medium.

In FIG. 2C, step 280 from the method 200 illustrated in FIG. 2A and described herein is shown in further detail. The process of step 280 begins at step 281a with the block labeled "DETERMINE USER'S LOCATION". At this step, a server application determines a user's location. For example, server app 102 may determine a user's location based on a determination of the location of the user's device 110a. Server app 102 may determine the location of device 110a using location information obtained by app 112a from device 110a. The location information may comprise, for example, GPS location data, an IP address assigned to device 110a, network location data based on registration with a cell tower or WiFi access point, or a combination of such location data. Location information may also be designated by a user preference or setting, for example, by selecting a home location or a home market (or media market) by zip code or postal code, local time zone, city, or other such option as is known in the art. Location information may also be designated, for example, by a user selection of a television service provider, whether such provider is one of broadcast over-the-air (OTA), cable, satellite, or an Internet service provider.

The process of step 280 proceeds to step 282a with the block labeled "ASSOCIATE ATHLETE PROFILES WITH LOCATIONS". At this step, a server application associates athlete profiles with geographic locations. For example, server app 102 may associate athlete profiles, retrieved at step 250 from the method 200 illustrated in FIG. 2A and described herein, with geographic locations. The server app 102 may associate an athlete profile with a geographic location, for example, by determining the location of the athlete's next game. The server app 102 may use information from the events schedule retrieved at step 261, for example, to determine the location of the athlete's next game, which can be used as a geographic location associated with the athlete and the corresponding athlete profile. In some cases, an athlete may be participating in a game that is currently underway, and it may be desirable to designate the current game as the "next game." The server app 102 may also associate an athlete profile with a geographic location, for example, based on the athlete's "home market" or geographic location where the athlete is based. For example, an athlete may be a member of a professional sports team based in Los Angeles, Calif. The athlete may be a participating in a game occurring in Chicago, Ill. The server app 102 may associate the athlete and the corresponding athlete profile with a location in Chicago, Ill. based on the game that is occurring there. Alternatively, the server app 102 may associate the athlete and the corresponding athlete profile with a location in Los Angeles, Calif. based on the athlete's "home market" in that location.

The process of step 280 proceeds to step 283a with the block labeled "RANK ATHLETE PROFILES BY PROXIMITY TO USER'S LOCATION". In this step, a server application ranks athlete profiles by using the associated geographic locations and comparing these locations to the user's location, and ranking the athletes in order of proximity. For example, server app 102 may use the geographic locations associated with each athlete profile to rank the athlete profiles in order of proximity to the user's location.

Figure 2D:
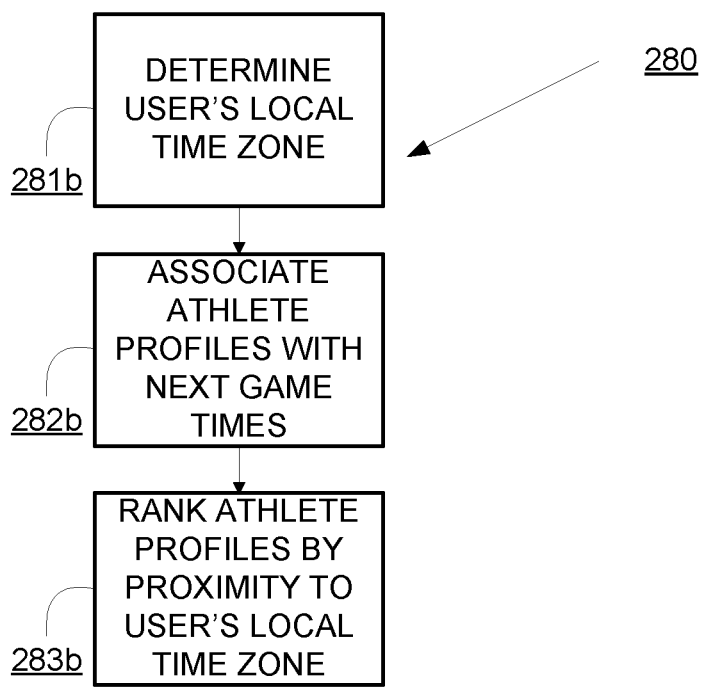
FIG. 2D is a block diagram illustrating a method for ranking athlete profiles using a proximity factor according to an embodiment of the disclosed subject matter.

FIG. 2D is a block diagram illustrating an alternate method for ranking athlete profiles using a proximity factor according to an embodiment of the disclosed subject matter. Each of the operations shown in FIG. 2D may correspond to instructions stored in a computer memory or computer readable storage medium.

In FIG. 2D, step 280 from the method 200 illustrated in FIG. 2A and described herein is shown in further detail. The process of step 280 begins at step 281b with the block labeled "DETERMINE USER'S LOCAL TIME ZONE". At this step, a server application determines a user's local time zone. For example, server app 102 may determine a user's local time zone based on a determination of the user's location. The server app 102 may determine the user's location based on a determination of the location of the user's device 110a. Server app 102 may determine the location of device 110a using location information obtained by app 112a from device 110a. The location information may comprise, for example, GPS location data, an IP address assigned to device 110a, network location data based on registration with a cell tower or WiFi access point, or a combination of such location data. Location information may also be designated by a user preference or setting, for example, by selecting a home location or home market by zip code or postal code, local time zone, city, or other such option as is known in the art. Location information may also be designated, for example, by a user selection of a television service provider, whether such provider is one of broadcast over-the-air (OTA), cable, satellite, or an Internet service provider.

The process of step 280 proceeds to step 282b with the block labeled "ASSOCIATE ATHLETE PROFILES WITH NEXT GAME TIMES". At this step, a server application associates athlete profiles with next game times. For example, server app 102 may associate athlete profiles, retrieved at step 250 from the method 200 illustrated in FIG. 2A and described herein, with next game times. The server app 102 may associate an athlete profile with a next game time, for example, by determining the starting time of the athlete's next game. The server app 102 may use information from the events schedule retrieved at step 261, for example, to determine the starting time of the athlete's next game, which can be associated with the athlete and the corresponding athlete profile. In some cases, an athlete may be participating in a game that is currently underway, and it may be desirable to designate the current game as the "next game."

The process of step 280 proceeds to step 283b with the block labeled "RANK ATHLETE PROFILES BY PROXIMITY TO USER'S LOCAL TIME ZONE". In this step, a server application ranks athlete profiles by using the associated next game times and comparing these times to the user's local time zone (i.e., the user's local time), and ranking the athletes in order of proximity. For example, server app 102 may use the next game times associated with each athlete profile to rank the athlete profiles in order of proximity to the user's local time zone. In some cases, an athlete's next game may be broadcast on a tape-delayed basis for some markets and time zones. In such cases, an athlete profile may be ranked lower as a result of the game being tape-delayed even though the actual start time of the game may be earlier than the local broadcast start time from the user's perspective.

Figure 3:
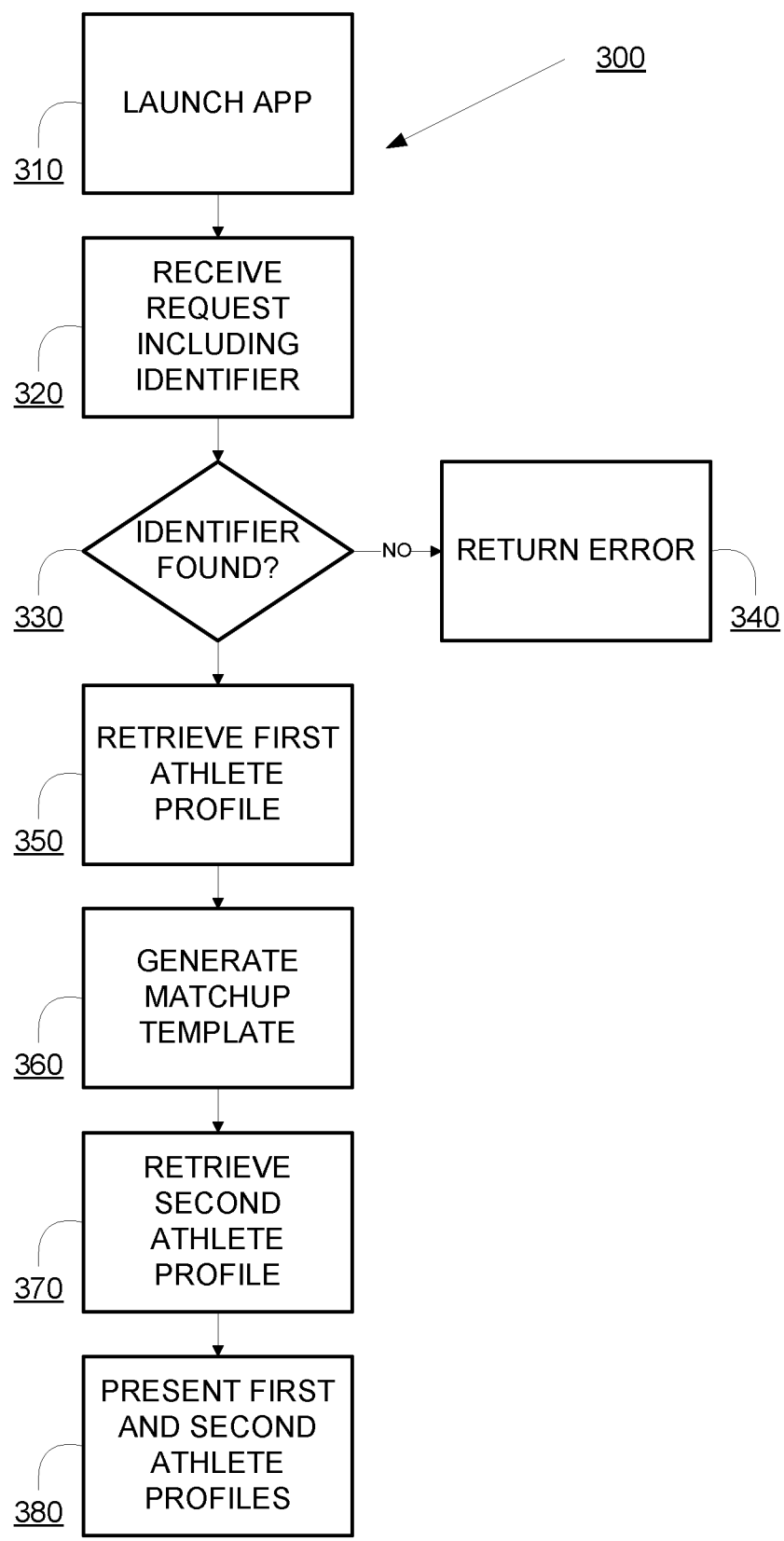
FIG. 3 is a block diagram illustrating a method for processing a request for athlete information according to an embodiment of the disclosed subject matter.

FIG. 3 is a block diagram illustrating a method for processing a request for athlete information according to an embodiment of the disclosed subject matter. Each of the operations shown in FIG. 3 may correspond to instructions stored in a computer memory or computer readable storage medium.

Referring to FIG. 3 and with reference to FIG. 1A, the method 300 begins at step 310 with the block labeled "LAUNCH APP". At this step, a user launches an app, such as a mobile client application executing on the user's mobile device, and the mobile client application establishes a communications session with a server application executing on a server. For example, App 112a may establish a communications session with server app 102 executing on server 100. The server app 102 and the corresponding mobile client application App 112a may comprise, for example, an athlete information discovery tool.

The method 300 proceeds to step 320 with the block labeled "RECEIVE REQUEST INCLUDING IDENTIFER". At this step, the mobile client application receives a request from the user for athlete information. The request may include an identifier such as, for example, a jersey number or other numeric identifier. For example, App 112a may receive a request from the user and transmit the request to server app 102. The identifier may also be, for example, any other pseudo-unique ID comprising an alphanumeric string or combination.

The method 300 proceeds to step 330 with the decision block labeled "IDENTIFIER FOUND?" At this step, a server application queries a database of athlete information using the identifier as a key. For example, server app 102 may query database 104 using the identifier received at step 320. If the identifier is not found in the database, the method 300 proceeds to step 340 with the block labeled "RETURN ERROR". At this step, the server application returns an error message. For example, server app 102 may return an error message to client app 112a. If, on the other hand, the identifier is found in the database in step 330, the method 300 proceeds to step 350 with the block labeled "RETRIEVE FIRST ATHLETE PROFILE". At this step, the server application selects and retrieves a first profile corresponding to the identifier from the database. Because the athlete identifier may be a pseudo-unique ID such as a jersey number or other numeric identifier that is common to more than one athlete, the server application may select and retrieve the first athlete profile from the possibly multiple athlete profiles based on a request using a single identifier. The server application may select the first athlete profile using a variety of filtering and sorting rules. For example, server app 102 may query database 104 and select and retrieve the first athlete profile corresponding to the identifier from steps 320 and 330. Server app 102 may also retrieve, for example, athlete information and other non-athlete information from content providers 120 and service providers 130. Accordingly, the selected and retrieved first athlete profile may comprise a combination of static athlete information and dynamic athlete information, and the profile may be generated in real-time in response to the request of step 320.

The method 300 proceeds to step 360 with the block labeled "GENERATE MATCHUP TEMPLATE". At this step, the server application extracts information from the first athlete profile to generate a matchup template. For example, server app 102 may extract information from the first athlete profile to generate a matchup template. The matchup template may be used to discover or identify one or more athletes similar to the athlete whose first athlete profile was retrieved at step 350, or it may be used to discover or identify a rival athlete. Accordingly, a measure of similarity or rivalry may be determined, for example, based on attributes such as an athlete's age, player position, team affiliation, years of experience, college attended, hometown, and the like. Alternatively, the first athlete profile may already have a previously determined "best match" athlete or "top rival" athlete associated with the first athlete, with such "best match" or "top rival" stored in database 104 as part of, or associated with, the first athlete profile.

The method 300 proceeds to step 370 with the block labeled "RETRIEVE SECOND ATHLETE PROFILE". At this step, the server application selects and retrieves a second athlete profile based on the matchup template. Because the matchup template may include attributes that are common to more than one athlete, the server application may select and retrieve the second athlete profile from the possibly multiple athlete profiles using a variety of filtering and sorting rules. Second athlete profiles may be ranked, for example, based on head-to-head contests, schedules, athlete or team rankings, or social network trends. For instance, if the first athlete profile is associated with the quarterback of a first team, the second athlete profile may be associated with the quarterback of the opposing team. The server app 102 may query database 104 and select and retrieve the second athlete profile and may also retrieve, for example, athlete information and other non-athlete information from content providers 120 and service providers 130. Accordingly, the selected and retrieved second athlete profile may comprise a combination of static athlete information and dynamic athlete information, and the profile may be generated in real-time at step 370.

The method 300 proceeds to step 380 with the block labeled "PRESENT FIRST AND SECOND ATHLETE PROFILES". At this step, the server application presents the first and second athlete profiles. For example, server app 102 presents the first and second athlete profiles to a user by sending the first and second athlete profiles to the user through client app 112a. The server app 102 may present anywhere from a portion to the whole of each athlete profile.

Figure 4A:
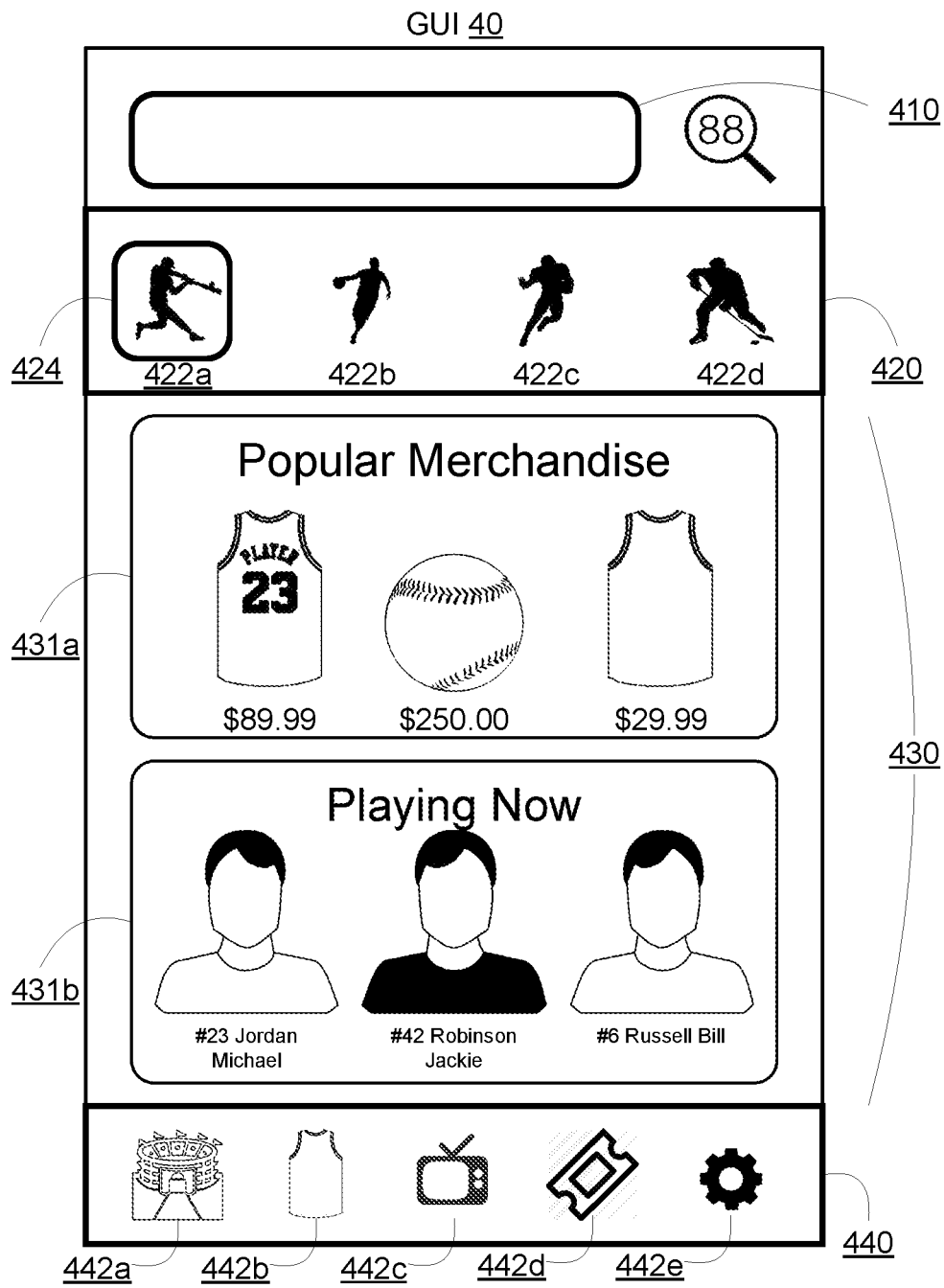
FIG. 4A illustrates an example of a graphical user interface of an athlete information discovery tool according to an embodiment of the disclosed subject matter.

FIG. 4A illustrates an example of a graphical user interface of an athlete information discovery tool according an embodiment of the disclosed subject matter. During operation of an athlete information discovery tool according to an embodiment of the disclosed subject matter, a graphical user interface 40 may be displayed within a client application 112 executing on a user's device 110 such as a smartphone. In FIG. 4A, a graphical user interface (GUI) 40 comprises a number of graphical elements and controls such as search bar 410, control portion 420, main window 430, and toolbar 440. Control portion 420 further comprises control icons 422 including, as shown here, control icons 422a, 422b, 422c, and 422d and selection indicator 424. As shown in this example, control icons 422a, 422b, 422c, and 422d are graphical icons representing baseball, basketball, American football, and hockey. These control icons may be selected using a touch interface or other suitable control interface, and the user's selection may be indicated by selection indicator 424. As shown here, selection indicator 424 is an outlined box surrounding control icon 422a, although other means of highlighting may be employed, such as by means of color or other visual cue. Main window 430 displays selected information that in some cases may be related to a query for athlete information. In other cases, main window 430 may display more general information. For example, as shown here, main window 430 displays popular (athlete-related) merchandise information 431a and "Playing Now" athlete information 431b. The popular merchandise information 431a may comprise, as shown here, images of popular athlete-related merchandise such as jerseys and other memorabilia, as well as links to purchase the merchandise from a service provider. The "Playing Now" athlete information 431b may comprise, for example, thumbnails for athlete profiles for athletes who are currently playing in a live spectator sporting event. Toolbar 440 further comprises tool icons 442 including, as shown here, tool icons 442a, 442b, 442c, 442d, and 442e. During the course of interacting with an athlete information discovery tool, a user may wish to obtain various related products and services. For example, a user may wish to purchase tickets for a selected athlete's upcoming contests or a souvenir jersey or other merchandise. In another example, a user may wish to check the broadcast schedule for a selected athlete's upcoming contests. Tool icons 442 allow a user to access various products and services, for example, through external service providers. For example, tool icon 442a is shown here as a stadium icon and serves as a link to the home screen of the athlete information discovery tool, and it may be selected by default. Tool icon 442b as shown here is a jersey icon and serves to facilitate purchasing a sports jersey or other merchandise from an external service provider such as an online merchant. Tool icon 442c as shown here is a TV icon and serves to facilitate access to a broadcast schedule for a selected athlete's upcoming contests. Tool icon 442d as shown here is a ticket icon, and serves to facilitate purchasing tickets for an athlete's upcoming contests. Tool icon 442e as shown here is a gear icon and provides access to various settings and user preferences.

Figure 4B:
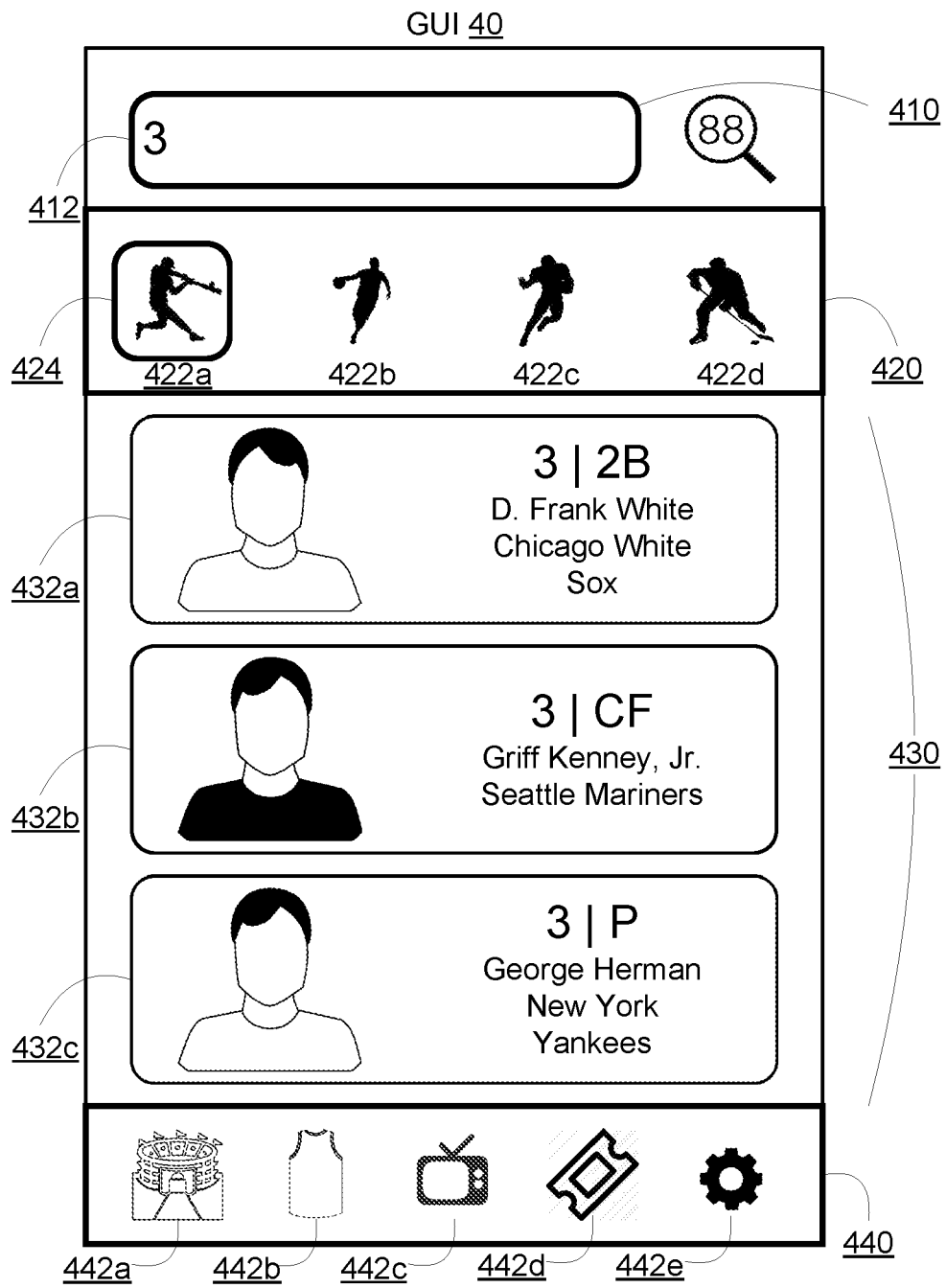
FIG. 4B illustrates an example of a graphical user interface of an athlete information discovery tool according to an embodiment of the disclosed subject matter.

FIG. 4B illustrates an example of a graphical user interface of an athlete information discovery tool displaying search results of a query according an embodiment of the disclosed subject matter. In FIG. 4B, a graphical user interface (GUI) 40 comprises a number of graphical elements and controls such as search bar 410, control portion 420, main window 430, and toolbar 440. During operation of an athlete information discovery tool, a user may enter a query 412 into search bar 410. As shown in this example, query 412 is a numeric string "3" which may be an athlete identifier such as a jersey number. Because the athlete identifier may be shared by a number of athletes on different teams and even in different sports, a user may specify a sport using control icons 422. In this example, as shown here, selection indicator 424 is highlighting control icon 422a, thereby indicating that baseball is selected. The results of the user's query 412 are shown in main window 430. As shown here, main window 430 displays query results in the form of athlete thumbnails 432 including thumbnails 432a, 432b, and 432c. Athlete thumbnails 432a, 432b, and 432c as shown here each comprise a photo of an athlete, the athlete's jersey number and position, the athlete's name, and team affiliation. In this example, athlete thumbnail 432a is for "D. Frank White, 2B Chicago White Sox", athlete thumbnail 432b is for "Griff Kenney, Jr., CF Seattle Mariners" and athlete thumbnail 432c is for "George Herman, P New York Yankees". The athlete thumbnails 432a, 432b, and 432c may be presented in an ordered fashion as determined according to various rules such as those described herein. The main window 430 may be a scrollable area extending beyond the physical borders of the device 110. A user may select an individual athlete thumbnail 432, such as by tapping on it on a touchscreen device, in order to view the full athlete profile.

Figure 4C:
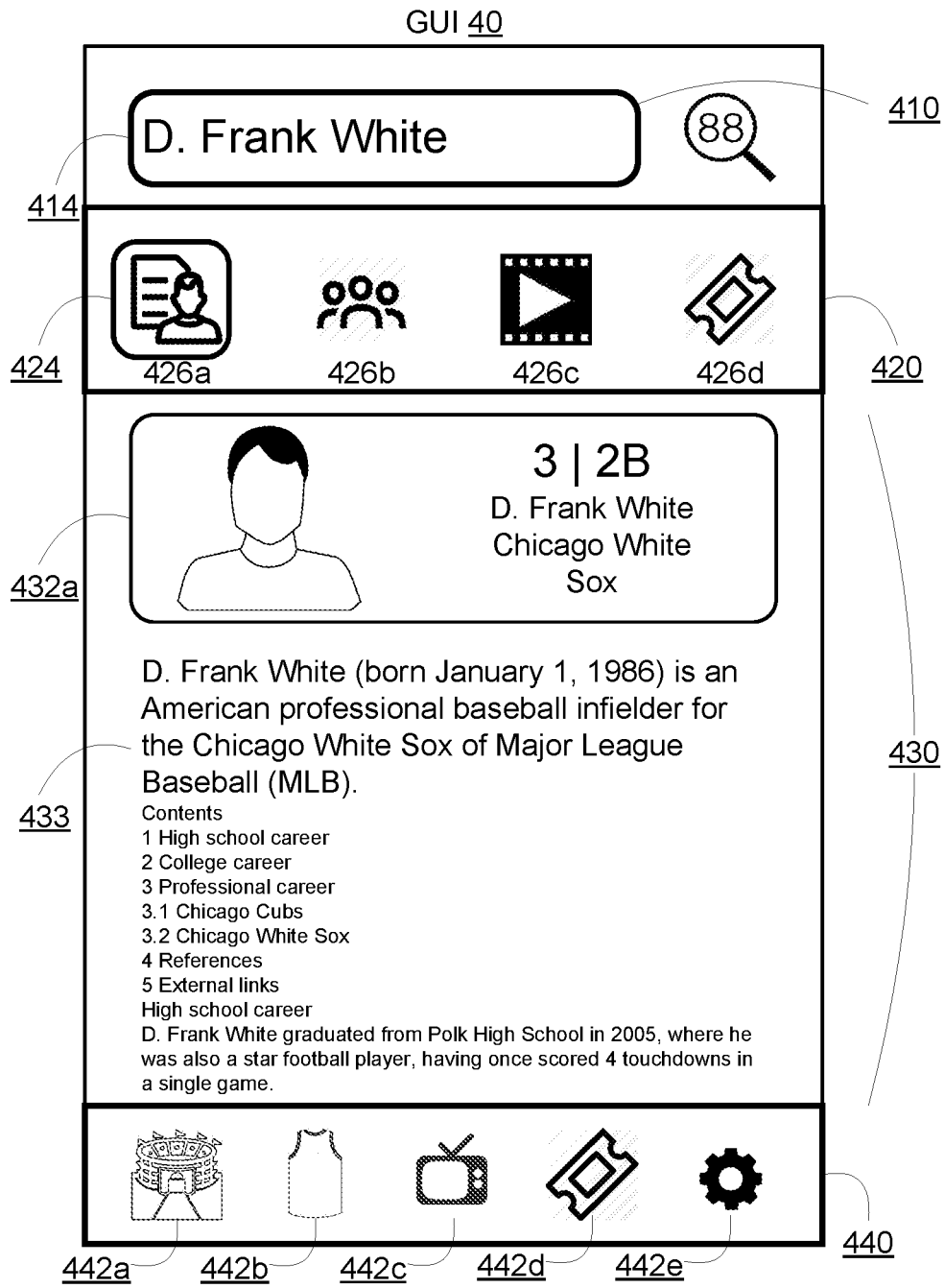
FIG. 4C illustrates an example of a graphical user interface of an athlete information discovery tool according to an embodiment of the disclosed subject matter.

FIG. 4C illustrates an example of a graphical user interface of an athlete information discovery tool displaying a biographical portion of an athlete's profile according an embodiment of the disclosed subject matter. In FIG. 4C, a graphical user interface (GUI) 40 comprises a number of graphical elements and controls such as search bar 410, control portion 420, main window 430, and toolbar 440. As shown in this example, a search query 414 entered into search bar 410 is the string "D. Frank White" which corresponds to the athlete whose profile is displayed in main window 430, and also corresponds to the numeric string "3" that was entered as a search query 412 in FIG. 4B. Control portion 420 further comprises control icons 426 including, as shown here, control icons 426a, 426b, 426c, and 426d and selection indicator 424. As shown in this example, control icons 426a, 426b, 426c, and 426d are graphical icons for accessing various categories of information comprising an athlete's profile such biographical information (426a), social media information (426b), video links (426c), and ticket purchasing links (426d). Other categories of information comprising an athlete's profile may include, for example, news links, photo galleries, and audio links. The control icons 426 may be selected using a touch interface or other suitable control interface, and the user's selection may be indicated by selection indicator 424. As shown here, selection indicator 424 is an outlined box surrounding control icon 426a, although other means of highlighting may be employed, such as by means of color or other visual cue. Alternatively, the various categories of information comprising an athlete's profile may be accessed, for example, using tabbed windows within main window 430. In either case, main window 430 displays the selected category of information. In this example, control icon 426a is selected, which corresponds to a biographical information portion of an athlete profile. Accordingly, main window 430 displays athlete thumbnail 432a and biography 433. Thumbnail 432a, as shown here, comprises a photo of the athlete, the athlete's jersey number and position, the athlete's name, and team affiliation. Biography 433 may be retrieved from an athlete database such as database 104, or it may be retrieved from a content provider 120 or a service provider 130.

Figure 4D:
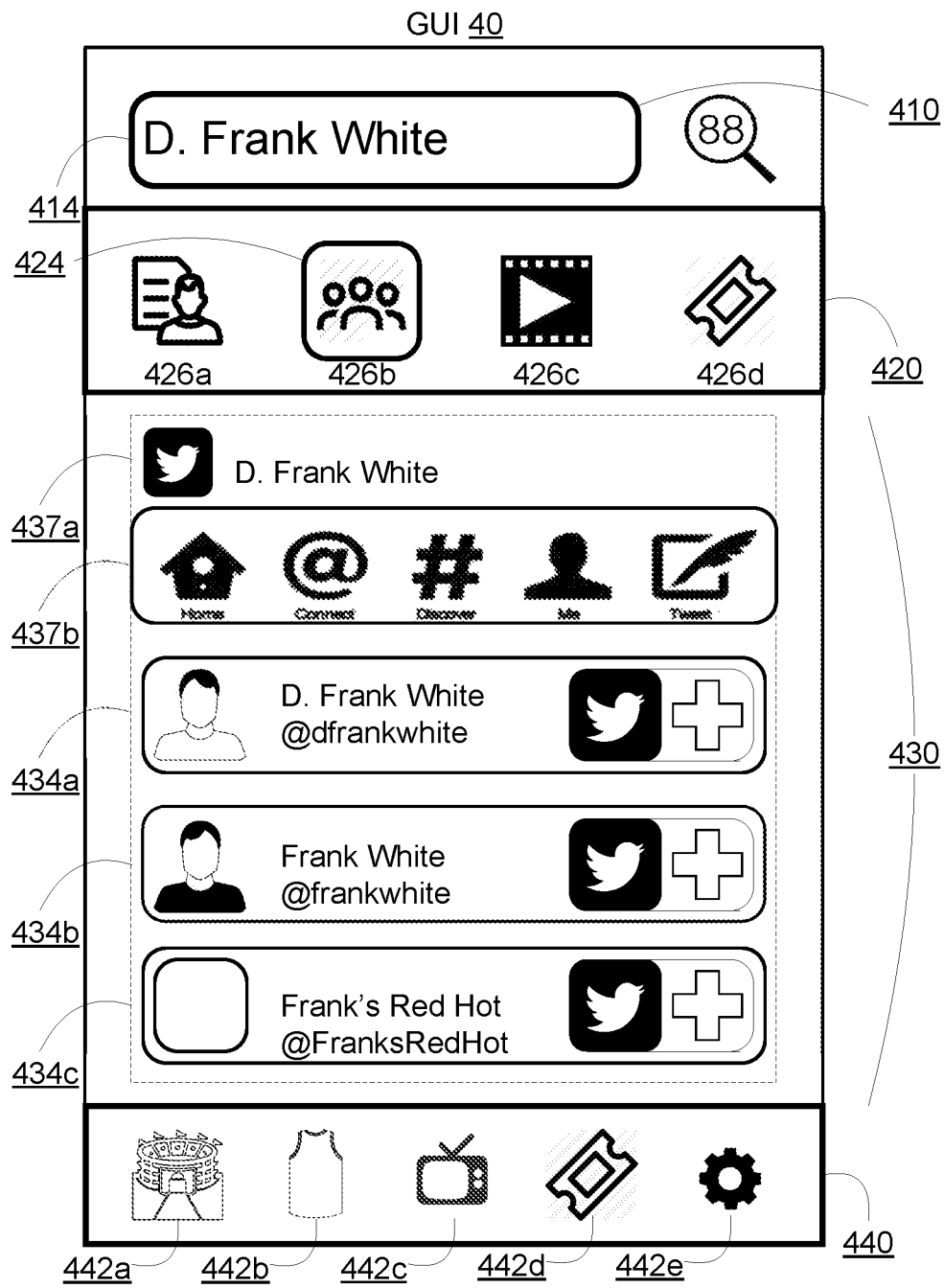
FIG. 4D illustrates an example of a graphical user interface of an athlete information discovery tool according to an embodiment of the disclosed subject matter.

FIG. 4D illustrates an example of a graphical user interface of an athlete information discovery tool displaying a social media portion of an athlete's profile according an embodiment of the disclosed subject matter. In FIG. 4D, a graphical user interface (GUI) 40 comprises a number of graphical elements and controls such as search bar 410, control portion 420, main window 430, and toolbar 440. As shown in this example, a search query 414 entered into search bar 410 is the string "D. Frank White" which corresponds to the athlete whose profile is displayed in main window 430, and also corresponds to the numeric string "3" that was entered as a search query 412 in FIG. 4B. Control portion 420 further comprises control icons 426 including, as shown here, control icons 426a, 426b, 426c, and 426d and selection indicator 424. As shown in this example, control icons 426a, 426b, 426c, and 426d are graphical icons for accessing various categories of information comprising an athlete's profile such biographical profile information (426a), social media profile information (426b), video links (426c), and ticket purchasing links (426d). These control icons may be selected using a touch interface or other suitable control interface, and the user's selection may be indicated by selection indicator 424. As shown here, selection indicator 424 is an outlined box surrounding control icon 426b, although other means of highlighting may be employed, such as by means of color or other visual cue. In this example, control icon 426b is selected, which corresponds to social media profile information. Accordingly, main window 430 displays links to social media accounts 434, including links 434a, 434b, and 434c as shown here. Social media account links 434 may be retrieved based on performing a query using the search query 414. Alternatively, an athlete's verified account information may be retrieved, for example, from an athlete database, such as database 104, or it may be retrieved from a content provider 120 or a service provider 130. In this example, the search query 414 is used in a search on an external social media platform, such as twitter. Main window 430 displays external controls, such as control 437a and control 437b. In this case, control 437a displays the search term from search query 414 as well as an icon indicating the external social media platform that was searched, while control 437b is a toolbar native to the external social media platform. In effect, the athlete information discovery tool in this example acts as a portal to the external social media platform. Alternatively, main window 430 may display, for example, posts relating to the athlete from social media channels of third parties. Such third parties may include, for example, followers and non-followers of an athlete who may be engaged in posting to social media channels about the athlete.

Figure 4E:
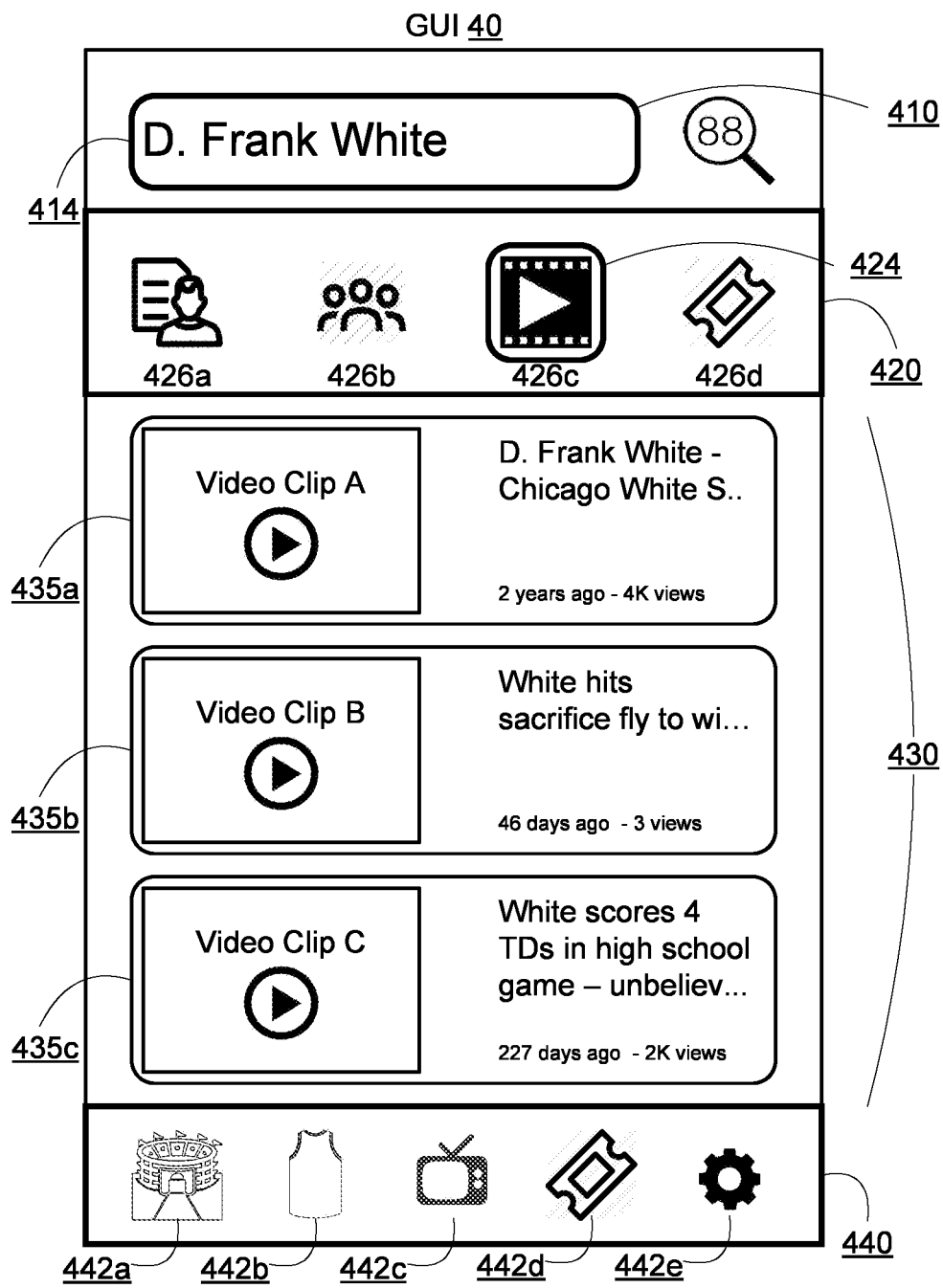
FIG. 4E illustrates an example of a graphical user interface of an athlete information discovery tool according to an embodiment of the disclosed subject matter.

FIG. 4E illustrates an example of a graphical user interface of an athlete information discovery tool displaying a video links portion of an athlete's profile according an embodiment of the disclosed subject matter. In FIG. 4E, a graphical user interface (GUI) 40 comprises a number of graphical elements and controls such as search bar 410, control portion 420, main window 430, and toolbar 440. As shown in this example, a search query 414 entered into search bar 410 is the string "D. Frank White" which corresponds to the athlete whose profile is displayed in main window 430, and also corresponds to the numeric string "3" that was entered as a search query 412 in FIG. 4B. Control portion 420 further comprises control icons 426 including, as shown here, control icons 426a, 426b, 426c, and 426d and selection indicator 424. As shown in this example, control icons 426a, 426b, 426c, and 426d are graphical icons for accessing various categories of information comprising an athlete's profile such biographical profile information (426a), social media profile information (426b), video links (426c), and ticket purchasing links (426d). These control icons may be selected using a touch interface or other suitable control interface, and the user's selection may be indicated by selection indicator 424. As shown here, selection indicator 424 is an outlined box surrounding control icon 426c, although other means of highlighting may be employed, such as by means of color or other visual cue. In this example, control icon 426c is selected, which corresponds to a video links portion of an athlete profile. Accordingly, main window 430 displays video thumbnails 435 including, as shown here, video thumbnails 435a, 435b, and 435c. Each video thumbnail 435, as shown here, comprises a clickable link to a video file including a preview image, as well as a description of the video, an indicator of when the video was posted, and how many times the video has been viewed. These video thumbnails 435 may be retrieved based on performing a query using the search query 414. Alternatively, the video thumbnails 435 may be retrieved, for example, from an athlete database, such as database 104, or they may be retrieved from a content provider 120 or a service provider 130.

Figure 4F:
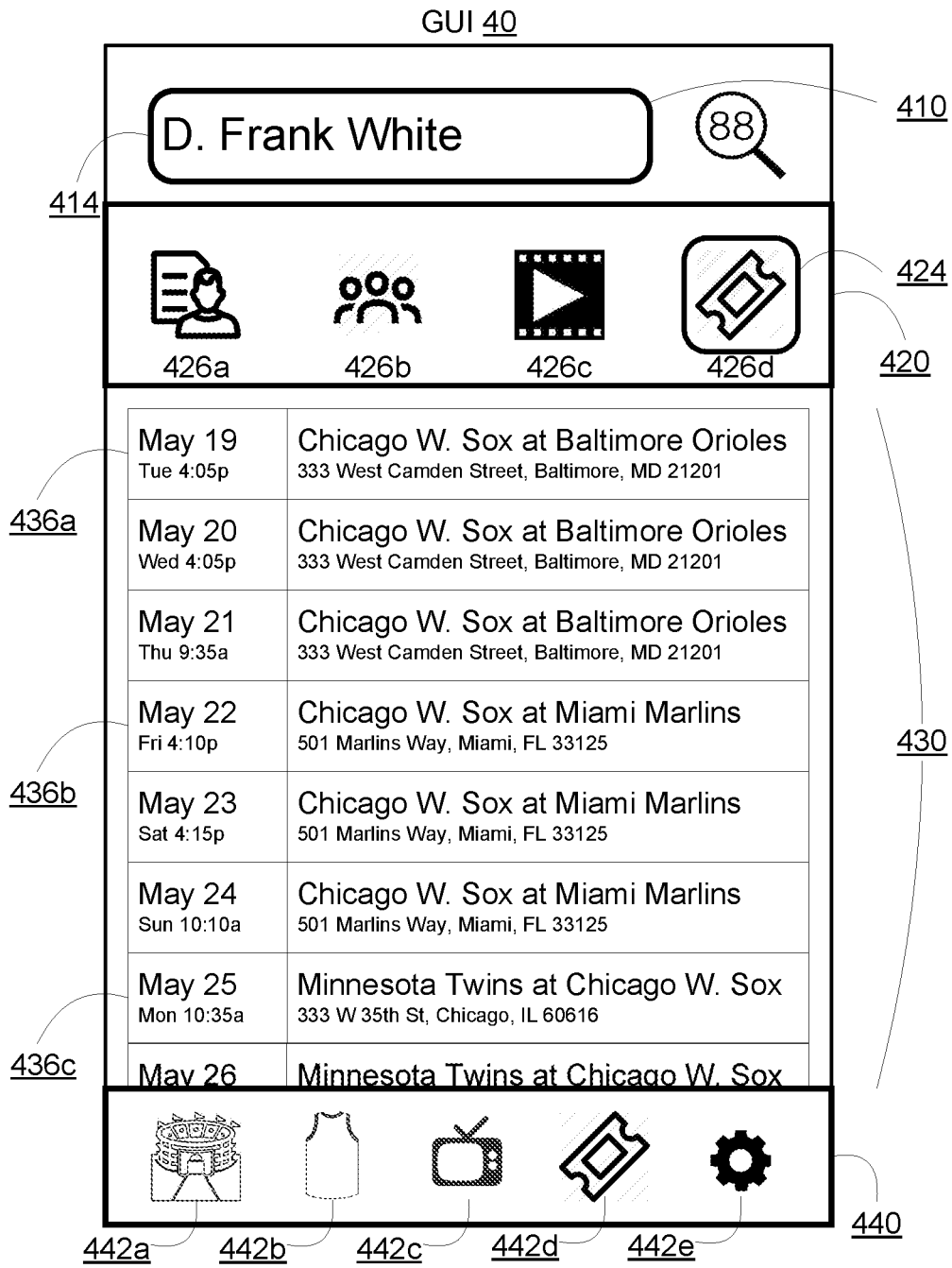
FIG. 4F illustrates an example of a graphical user interface of an athlete information discovery tool according to an embodiment of the disclosed subject matter.

FIG. 4F illustrates an example of a graphical user interface of an athlete information discovery tool displaying a ticket purchasing links portion of an athlete's profile according an embodiment of the disclosed subject matter. In FIG. 4F, a graphical user interface (GM) 40 comprises a number of graphical elements and controls such as search bar 410, control portion 420, main window 430, and toolbar 440. As shown in this example, a search query 414 entered into search bar 410 is the string "D. Frank White" which corresponds to the athlete whose profile is displayed in main window 430, and also corresponds to the numeric string "3" that was entered as a search query 412 in FIG. 4B. Control portion 420 further comprises control icons 426 including, as shown here, control icons 426a, 426b, 426c, and 426d and selection indicator 424. As shown in this example, control icons 426a, 426b, 426c, and 426d are graphical icons for accessing various categories of information comprising an athlete's profile such biographical profile information (426a), social media profile information (426b), video links (426c), and ticket purchasing links (426d). These control icons may be selected using a touch interface or other suitable control interface, and the user's selection may be indicated by selection indicator 424. As shown here, selection indicator 424 is an outlined box surrounding control icon 426d, although other means of highlighting may be employed, such as by means of color or other visual cue. In this example, control icon 426d is selected, which corresponds to a ticket purchasing links portion of an athlete profile. Accordingly, main window 430 displays a schedule of future contests or events, including event thumbnails 436a, 436b, and 436c. Event thumbnails 436, as shown here, comprise clickable links for purchasing tickets for a selected event. Event thumbnails 436 further comprise the date and time of the event, a description of the event (such as the two teams involved in the contest), and the address of the venue where the event will be held. These event thumbnails 436 may be retrieved based on performing a query using the search query 414. Alternatively, the event thumbnails 436 may be retrieved, for example, from an athlete database, such as database 104, or they may be retrieved from a content provider 120 or a service provider 130.

An athlete information discovery tool, as illustrated and described in the examples with reference to FIGS. 4A-4F, may provide access to various categories of information comprising an athlete profile. In some instances, it may be desirable to restrict access to a portion of an athlete profile, such as an athlete's social media account information, based on various criteria. For example, access may be restricted based on a user's location or a user's subscription or registration status. Alternatively, access may be granted subject to temporal restrictions. For example, access may be provided only during "game time."

In some cases, a user may wish to discover information about athletes participating in a particular event, such as when the user attends a live sporting event. Many casual fans of sports who attend live spectator sporting events may lack in-depth knowledge about athletes participating in these events. As noted above, such casual fans as well as other attendees may discover athlete information through printed programs provided by vendors or through large screens such as a Jumbotron™ located in the stadium or other venue. However, these options suffer various shortcomings as noted above. Another option is an interactive athlete information discovery tool as is disclosed herein.

In one embodiment, an athlete information discovery tool provides athlete information for a particular sporting event. The athlete information discovery tool may provide, for example, an interactive electronic program for a particular sporting event based on a user's attendance at the event. Attendance may be determined, for example, based on a user's location.

Figure 5:
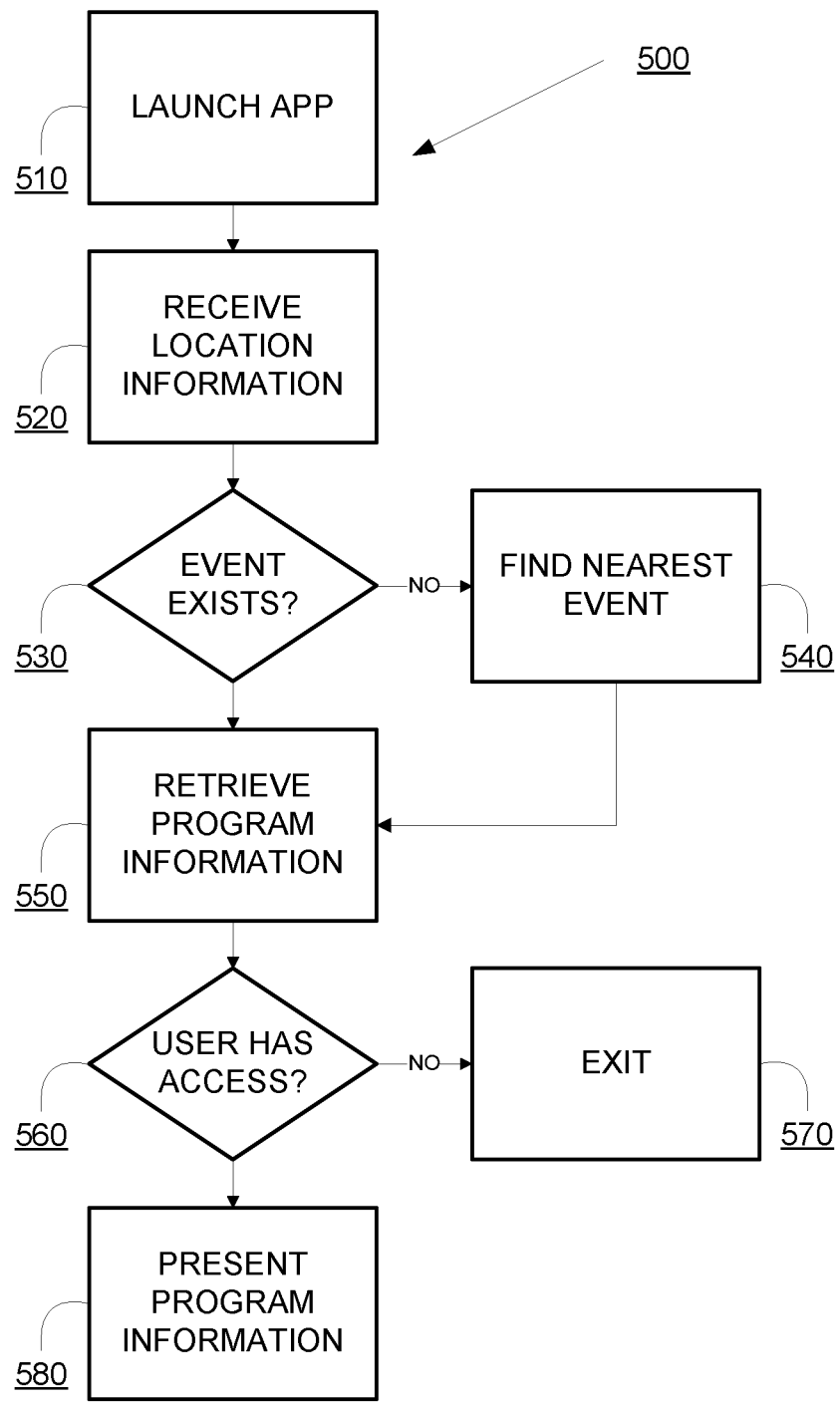
FIG. 5 is a block diagram illustrating a method for providing program information for a live spectator event according to an embodiment of the disclosed subject matter.

FIG. 5 is a block diagram illustrating a method for providing program information for a live spectator event based on a user's location according an embodiment of the disclosed subject matter. Each of the operations shown in FIG. 5 may correspond to instructions stored in a computer memory or computer readable storage medium.

In FIG. 5, a method 500 begins at step 510 with the block labeled "LAUNCH APP". At this step, a user launches an app, such as a mobile client application executing on the user's mobile device, and the mobile client application establishes a communications session with a server application executing on a server. For example, App 112a may establish a communications session with server app 102 executing on server 100. The server app 102 and the corresponding mobile client application App 112a may comprise, for example, an athlete information discovery tool.

The method 500 proceeds to step 520 with the block labeled "RECEIVE LOCATION INFORMATION". At this step, an athlete information discovery tool receives location information from a user. For example, a server app 102 may receive location information from a client application App 112a operating on the user's device 110a. This may be achieved via a variety of methods. For example, the user may perform a "check-in" procedure within the athlete information discovery tool. Alternatively, the client application App 112a may automatically detect the user's location if location sharing is enabled on the user's device 110a. Location information may also be shared from another application executing on the user's device 110a through an appropriate application programming interface (API) function call.

The method 500 proceeds to step 530 with the decision block labeled "EVENT EXISTS?" At this step, an athlete information discovery tool determines whether an event exists at the location specified by the location information received at step 520. For example, a server app 102 may retrieve information stored in database 104 comprising a schedule of live spectator sporting events. Alternatively, server app 102 may retrieve such schedule information from a content provider 120 or a service provider 130. The server app 102 may also compare the current time to the scheduled times. In some cases, a multi-purpose stadium or venue may be used to host more than one live spectator event during the same day. Also, there may be multiple contests scheduled on the same day, such as during a tournament.

If the result of the query at step 530 is affirmative, then the method 500 proceeds to step 550 with the block labeled "RETRIEVE PROGRAM INFORMATION". If the result of the query at step 530 is negative, then the method 500 proceeds to step 540 with the block labeled "FIND NEAREST EVENT". At this step, an athlete information discovery tool determines the nearest event based on the location information. In this context, the "nearest" event may be determined based on geographic proximity, temporal proximity, or a combination of geographic and temporal proximity. In some cases, an event may be deemed as the "nearest" event as a proxy for being the "most relevant." For example, two events may have the same geographical distance (such as for two events occurring at the same venue), but one may be judged as being "nearer" or "nearest" based on a time schedule. Also, the concept of "nearness" or being "near" as used herein may be related to the concept of "nearestness." In other words, an event may be judged as being "near" a location on the basis that it is "nearest" to such location, without falling within an arbitrary threshold of distance or separation.

The method 500 then proceeds to step 550 with the block labeled "RETRIEVE PROGRAM INFORMATION". At this step, an athlete information discovery tool retrieves program information for a selected live spectator event. For example, a server app 102 may retrieve program information from database 104, or may retrieve program information from a content provider 120 or a service provider 130. Alternatively, the server app 102 may generate program information on the fly using static information stored in database 104 and dynamic information retrieved from a content provider 120 and/or a service provider 130. The program information may comprise, for example, information typically found in printed programs such as those as may be provided by vendors at live spectator events. Such program information may include static information such as, for example, player rosters for competing teams, player biographies, photos, and other information. The program information may also include dynamic information such as, for example, player news, video links, social media activity, and the like. The program information may also include purchasing recommendations and links for player-related or team-related merchandise as well as for tickets for future events.

The method 500 then proceeds to step 560 with the decision block labeled "USER HAS ACCESS?" At this step, an athlete information discovery tool determines whether the user is authorized to access the program information. For example, a server app 102 may determine whether the user is authorized to access the program information using a variety of criteria. For example, access may be granted based on a user's subscription status, which may be stored in database 104. Alternatively, access may be granted based only on the user's location at the stadium or venue. As another example, a user may scan a barcode, QR code, or other code on a printed ticket for the event, or the user's device may utilize radiofrequency identification (RFID) or near-field communications (NFC) tags.

If the result of the query at step 560 is negative, then the method 500 may terminate at step 570 with the block labeled "EXIT". If the result of the query at step 560 is affirmative, then the method 500 proceeds to step 580 with the block labeled "PRESENT PROGRAM INFORMATION". At this step, an athlete information discovery tool may provide the program information to the user. For example, a server app 102 may transmit the program information (along with all appropriate graphics commands) to a client application App 112a executing on a user's device 110a. The program information may be formatted and presented, for example, as a scrollable list of thumbnails, such as the athlete thumbnails 432 depicted in FIG. 4B. An individual athlete profile may be selectively accessed, for example, by selecting a particular individual athlete thumbnail.

As disclosed, the method 500 illustrated in FIG. 5 and described herein may be used to provide program information for a live spectator event such as a baseball, basketball, football, or hockey game. In such team-based sporting events, certain athletes may be active at some times and inactive during others. For example, player substitutions are frequent in basketball and hockey games, while in football games, many players are active only when their team is playing offense or defense. In baseball, a player may be "at bat" or otherwise involved in offense or may be "in the field" on defense. Accordingly, it may be desirable to present program information or athlete information only for those athletes who are currently active. This can be achieved, for example, by an athlete information discovery tool, such as server app 102, receiving information from a service provider 130 regarding currently active athletes for a particular live spectator sporting event. In another embodiment, an athlete's current state may be monitored, for example, by detecting a physical token or chip worn by the athlete or embedded in the athlete's shoe or other equipment. The physical token or chip may be detected, for example, by using radiofrequency identification (RFID), Bluetooth, or other suitable technology.

To further expand this concept, it may in some cases be desirable to present athlete information for those athletes who are currently active or whose activity is most current. For example, a user of an athlete information discovery tool may wish to discover information about an athlete who just scored a run, touchdown, or goal, or who performed another feat. In such a case, the user may perform a search using, for example, an athlete's jersey number as the basis for the query. An athlete information discovery tool such as the one described in various embodiments herein may rank the results according to real-time (or near real-time) tracking of athletic events using so-called "play-by-play" information, which may comprise a detailed running commentary of the action occurring during an athletic event. An athlete information discovery tool may receive play-by-play information, for example, from a content provider 120 or a service provider 130. For example, various game-tracking and stattracking casting services may broadcast play-by-play information. An athlete information discovery tool may extract the relevant play-by-play information which may be formatted, for example, to include athlete names, jersey numbers, timestamps or other time codes, and descriptions of the play or action. The athlete information discovery tool may store such relevant play-by-play information, for example, in a dynamic table or a database, such as database 104. As used herein, the term "database" may refer generically to a structured set of data held in one or more computing devices, either in volatile or non-volatile memory stores. A database may comprise one or more files and may contain one or more tables. As used herein, the term "table" may in some cases refer to a database. The athlete information discovery tool may extract athlete names and jersey numbers and arrange this information in the dynamic table or database according to the timestamps or other time codes, thus creating a table of athletes sorted by most recent activity. In this manner, recent play activity may be used as a proximity factor for ranking athlete search results such as in conjunction with the method described and illustrated in FIG. 2A. Alternatively, recent play activity may be used as a factor for ranking or presenting athlete profiles of athletes such as in a "Playing Now" section 431b of a GUI as shown in FIG. 4A. Athletes and their profiles appearing in a "Playing Now" section may be further sorted and grouped according to individual games or contests. This is further described with reference to, for example, FIGS. 10-12 and the corresponding description.

Figure 6:
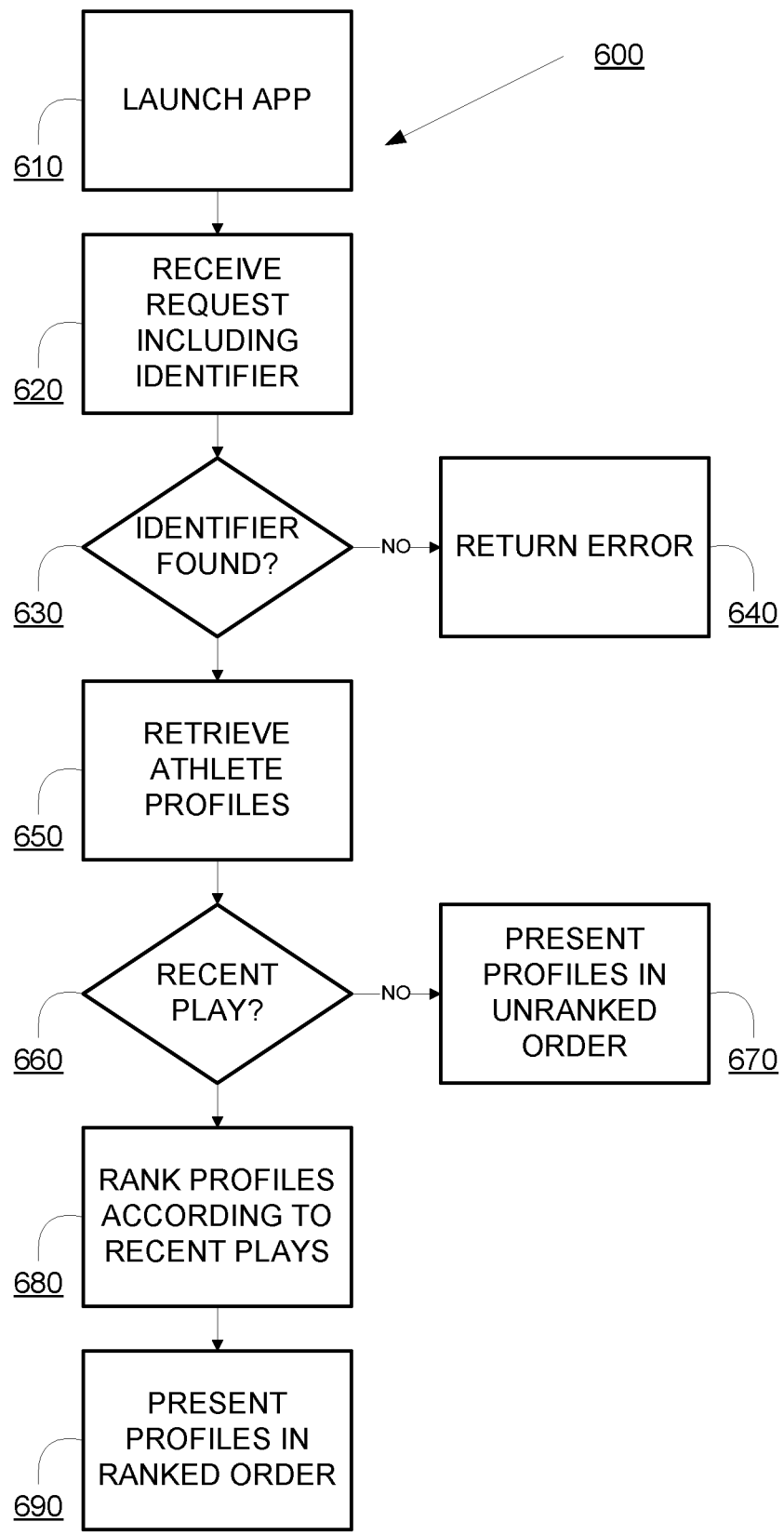
FIG. 6 is a block diagram illustrating a method for processing a request for athlete information according to an embodiment of the disclosed subject matter.

FIG. 6 is a block diagram illustrating a method for processing a request for athlete information according to an embodiment of the disclosed subject matter. Each of the operations shown in FIG. 6 may correspond to instructions stored in a computer memory or computer readable storage medium.

In FIG. 6, a method 600 begins with the step 610 with the block labeled "LAUNCH APP". At this step, a user launches an app, such as a mobile client application executing on the user's mobile device, and the mobile client application establishes a communications session with a server application executing on a server. For example, App 112a may establish a communications session with server app 102 executing on server 100. The server app 102 and the corresponding mobile client application App 112a may comprise, for example, an athlete information discovery tool.

The method 600 proceeds to step 620 with the block labeled "RECEIVE REQUEST INCLUDING IDENTIFER". At this step, the mobile client application receives a request from the user for athlete information. The request may include an identifier such as, for example, a jersey number or other numeric identifier. For example, App 112a may receive a request from the user and transmit the request to server app 102. The identifier may also be, for example, any other pseudo-unique ID comprising an alphanumeric string or combination.

The method 600 proceeds to step 630 with the decision block labeled "IDENTIFIER FOUND?" At this step, a server application queries a database of athlete information using the identifier as a key. For example, server app 102 may query database 104 using the identifier received at step 620.

If the identifier is not found in the database, the method 600 proceeds to step 640 with the block labeled "RETURN ERROR". At this step, the server application returns an error message. For example, server app 102 may return an error message to client app 112a.

If, on the other hand, the identifier is found in the database in step 630, the method 600 proceeds to step 650 with the block labeled "RETRIEVE ATHLETE PROFILES". At this step, the server application selects and retrieves athlete information organized as profiles and corresponding to the identifier from the database. Because the athlete identifier may be a pseudo-unique ID such as a jersey number or other numeric identifier that is common to more than one athlete, the server application may select and retrieve multiple athlete profiles based on a request using a single identifier. For example, server app 102 may query database 104 and select and retrieve athlete information organized as athlete profiles and corresponding to the identifier from steps 620 and 630. Server app 102 may also retrieve, for example, athlete information and other non-athlete information from content providers 120 and service providers 130. Accordingly, the selected and retrieved athlete profiles may comprise a combination of static athlete information and dynamic athlete information, and the profiles may be generated in real-time in response to the request of step 620.

The method 600 continues to step 660 with the decision block labeled "RECENT PLAY?" At this step, the server application determines whether any of the athletes whose profiles were retrieved in step 650 were involved in a recent play. For example, server app 102 may make such a determination by comparing the athlete names and jersey numbers from the athlete profiles with athlete names and jersey numbers from a dynamic table of play-by-play information, such as the one illustrated in FIGS. 7A-B. The determination of whether an athlete was involved in a recent play may also depend on a temporal proximity factor. A play may be considered "recent" if it occurred within, for example, two minutes or other appropriate time interval. The specific time interval or cutoff time utilized may depend, for example, on the granularity of the play-by-play information, the frequency with which the play-by-play information is updated, and other factors.

Figure 7A:
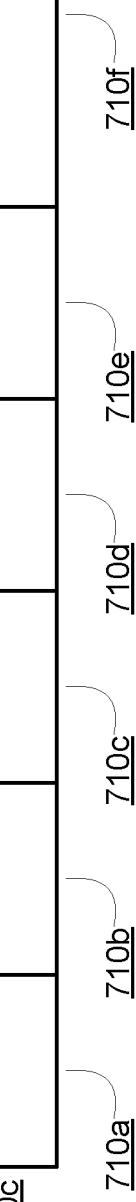
FIG. 7A illustrates an example of a dynamic table of play-by-play information according to an embodiment of the disclosed subject matter.

FIG. 7A illustrates an example of a dynamic table of play-by-play information according to an embodiment of the disclosed subject matter. In FIG. 7A, a dynamic play-by-play table 70 comprises multiple columns 710 and rows 720 of information. Dynamic play-by-play table 70 is shown here with rows 720a, 720b, and 720c, which represent various entries of play-by-play information. Columns 710a, 710b, 710c, 710d, 710e, and 710f represent various categories of play-by-play information for each entry in the dynamic play-by-play table 70. For example, as shown here, column 710a stores timestamps associated with a particular play-by-play event, column 710b stores athlete IDs (such as jersey numbers), column 710c stores athlete names, column 710d stores team IDs, column 710e stores game IDs, and column 710f stores play details.

Figure 7B:
FIG. 7B illustrates an example of a portion of a dynamic table of play-by-play information according to an embodiment of the disclosed subject matter.

FIG. 7B illustrates an example of a portion of a dynamic table of play-by-play information according to an embodiment of the disclosed subject matter. In FIG. 7B, a single entry in a dynamic play-by-play table 70 is represented here by row 720a, which contains various data elements 711-716. Data element 711, as shown here, is a timestamp or time code for a particular play-by-play event. In this example, the timestamp is "18:04:22.50." Data element 712, as shown here, is an athlete ID for the athlete involved in the particular play-by-play event. In this example, the athlete ID is "23" which may correspond to the athlete's jersey number. In some embodiments, a unique athlete identifier may be used with or without a pseudo-unique identifier such as a jersey number. Data element 713, as shown here, is a name of the athlete involved in the particular play-by-play event. In this example, the value is "James King." Data element 714, as shown here, is a team ID identifying the team of the athlete involved in the particular play-by-play event. In this example, the team ID is "Cleveland Cavaliers." Data element 715, as shown here, is a game ID for the particular game or contest in which the particular play-by-play event occurred. In this example, the game ID is represented by the numeric string "123456789" but it may be any string that uniquely identifies the athletic contest. Data element 716, as shown here, gives details of the particular play-by-play event. In this example, the details are represented by the narrative "James King jump shot from 19 feet (2 points)."

It should be understood that the examples of dynamic play-by-play tables illustrated in FIGS. 7A and 7B may be updated periodically using, for example, either a client pull or a server push methodology as is known in the art. The dynamic play-by-play table may be updated, for example, by accessing a database of play-by-play information and extracting the desired information at regular intervals (e.g., every 30 seconds) or at irregular intervals.

Referring again to FIG. 6, if the determination at step 660 is negative, then the method 600 proceeds to step 670 with the block labeled "PRESENT PROFILES IN UNRANKED ORDER". At this step, the server application presents the athlete profiles selected and retrieved at step 650. For example, server app 102 presents selected and retrieved athlete profiles to a user by sending the selected and retrieved athlete profiles to the user through client app 112a. The server app 102 may present the selected and retrieved athlete profiles in an unranked order. These athlete profiles may be sorted, for example, by sport and/or league, alphabetically by the last names, alphabetically by the names of teams, or by any other pre-determined order.

If, on the other hand, the determination at step 660 is positive, then the method 600 proceeds to step 680 with the block labeled "RANK PROFILES ACCORDING TO RECENT PLAYS". At this step, the server application ranks the athlete profiles selected and retrieved at step 650 according to recent plays. For example, server app 102 may rank the athlete profiles selected and retrieved at step 650 according to recent plays. The ranking may be ordered, for example, so that athletes involved in the most recent plays are ranked highest or first. In some embodiments, the first athlete may be selected based on the most recent play while additional athletes may be ranked by one or more other criteria, such as by a proximity factor as described with respect to the methods of FIGS. 2A-2D.

Finally, the method 600 proceeds to step 690 with the block labeled "PRESENT PROFILES IN RANKED ORDER". At this step, the server application presents the athlete profiles in the ranked order from step 680. For example, server app 102 presents ranked athlete profiles to a user by sending the ranked athlete profiles to the user through client app 112a. The server app 102 may present all of the ranked athlete profiles or only a predetermined subset of the ranked athlete profiles, e.g., only the first 10. The server app may also present anywhere from a portion to the whole of each ranked athlete profile.

While the method 600 of FIG. 6 has been described within the context of ranking athlete information profiles according to recent activity using play-by-play information, the concepts can of course be extended to replays or tape-delayed broadcasts and streams as well. For example, the timestamps or timecodes from a dynamic play-by-play table may be cross-referenced with, for example, a local broadcast schedule (for a tape-delayed broadcast) using additional logic.

Figure 8A:
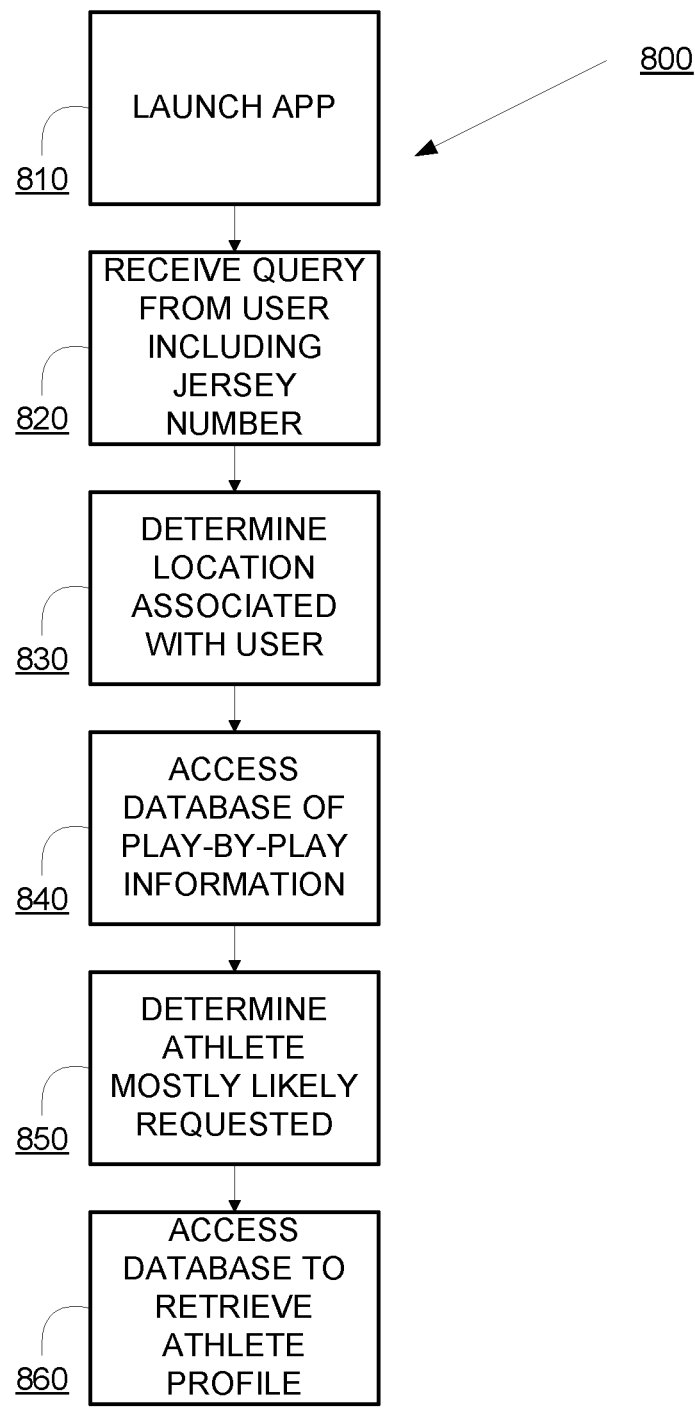
FIG. 8A is a block diagram illustrating a method for processing a request for athlete information for an athlete involved in a recent play according to an embodiment of the disclosed subject matter.

FIG. 8A is a block diagram illustrating a method for processing a request for athlete information for an athlete involved in a recent play according to an embodiment of the disclosed subject matter. Each of the operations shown in FIG. 8A may correspond to instructions stored in a computer memory or computer readable storage medium.

In FIG. 8, a method 800 begins with the step 810 with the block labeled "LAUNCH APP". At this step, a user launches an app, such as a mobile client application executing on the user's mobile device, and the mobile client application establishes a communications session with a server application executing on a server. For example, App 112a may establish a communications session with server app 102 executing on server 100. The server app 102 and the corresponding mobile client application App 112a may comprise, for example, an athlete information discovery tool.

The method 800 proceeds to step 820 with the block labeled "RECEIVE QUERY FROM USER INCLUDING JERSEY NUMBER". At this step, an athlete information discovery tool receives a query from a user, the query including an athlete's jersey number. For example, a user operating a client application 112a on a device 110a may enter a query, such as the numeric string "23", and the client application 112a may forward this query to server app 102.

The method 800 proceeds to step 830 with the block labeled "DETERMINE LOCATION ASSOCIATED WITH USER". At this step, an athlete information discovery tool determines a location associated with the user. For example, server app 102 may determine a user's location based on a determination of the location of the user's device 110a. Server app 102 may determine the location of device 110a using location information obtained by app 112a from device 110a. The location information may comprise, for example, GPS location data, an IP address assigned to device 110a, network location data based on registration with a cell tower or WiFi access point, or a combination of such location data. Location information may also be designated by a user preference or setting, for example, by selecting a home location or a home market (or media market) by zip code or postal code, local time zone, city, or other such option as is known in the art. Location information may also be designated, for example, by a user selection of a television service provider, whether such provider is one of broadcast over-the-air (OTA), cable, satellite, or an Internet service provider.

The method 800 proceeds to step 840 with the block labeled "ACCESS DATABASE OF PLAY-BY-PLAY INFORMATION". At this step, an athlete information discovery tool accesses a database of play-by-play information to identify one or more athletes involved in a recent play. For example, server app 102 may access a database of play-by-play information stored in database 104. Alternatively, server app 102 may maintain a dynamic table or database of play-by-play information separate from database 104. Server app 102 may also access play-by-play information stored or supplied by a content provider 120 or a service provider 130. In some cases, there may be more than one athlete involved in a particular play. Additionally, there may be more than one recent play involving athletes whose jersey number matches the jersey number from the received query.

The method 800 proceeds to step 850 with the block labeled "DETERMINE ATHLETE MOST LIKELY REQUESTED". At this step, an athlete information discovery tool uses the received query, the location associated with the user, and the identified one or more athletes from one or more recent plays to infer that a particular athlete's information is desired. For example, server app 102 may use the numeric string "23" from the received query, the location associated with the user, and play-by-play information for recent plays to infer that the user desires information about James King. In case there are multiple athletes with the jersey number "23", for example, that were involved in recent plays, the location associated with the user may aid in the determination of a particular athlete from a plurality of candidates. The server app 102 may rank the various candidates, for example, according to proximity to the location associated with the user, with a shorter distance being ranked more highly. The server app 102 may also rank candidate athletes according to other factors, such as a proximity in time, with athletes involved in more recent plays being ranked more highly. An example of a method for determining a "best match" athlete is illustrated in FIG. 8B.

Figure 8B:
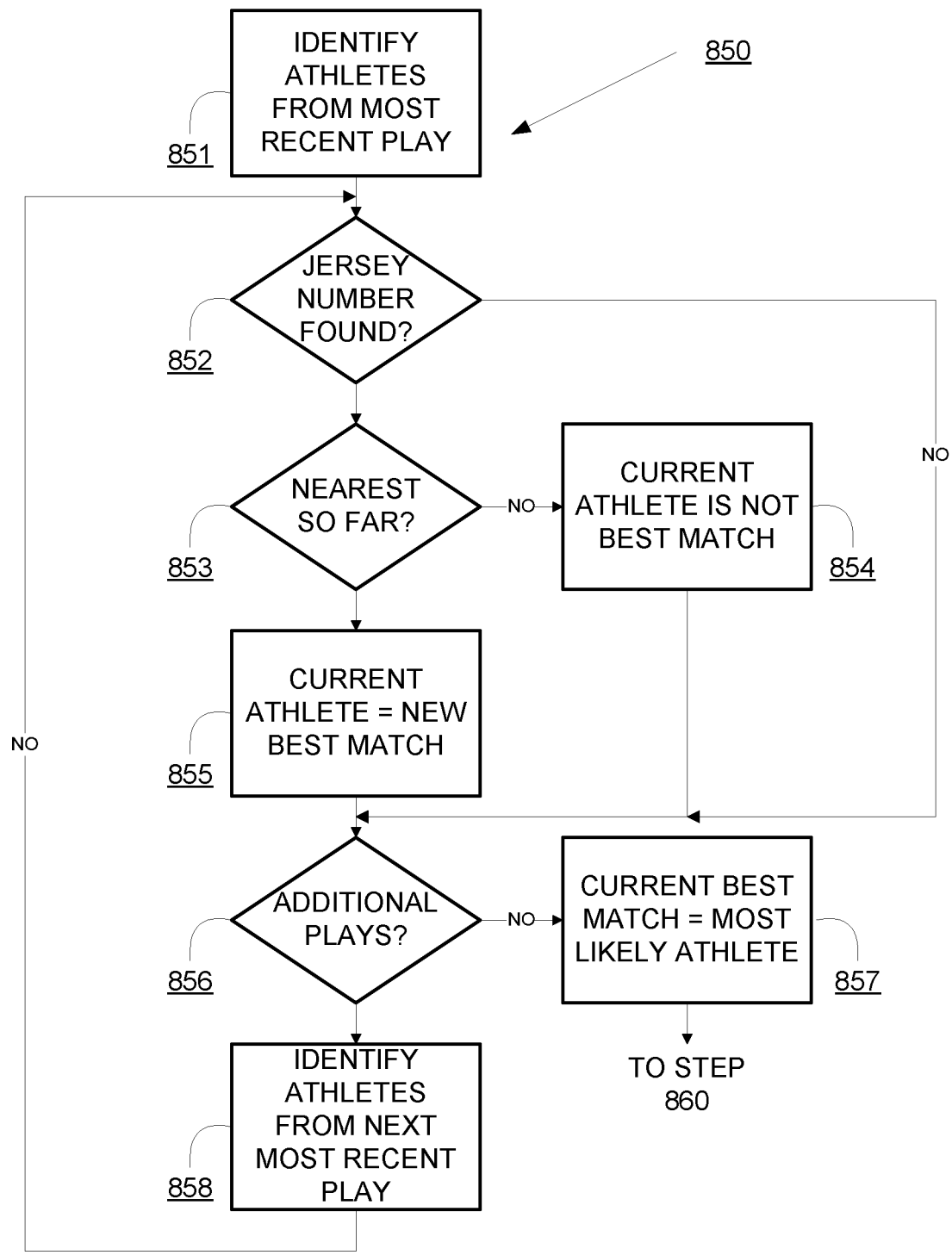
FIG. 8B is a block diagram illustrating a method for inferring that a particular athlete's information is desired according to an embodiment of the disclosed subject matter.

FIG. 8B is a block diagram illustrating a method for inferring that a particular athlete's information is desired according to an embodiment of the disclosed subject matter. Each of the operations shown in FIG. 8B may correspond to instructions stored in a computer memory or computer readable storage medium.

In FIG. 8B, the process of step 850 begins at step 851 with the block labeled "IDENTIFY ATHLETES FROM MOST RECENT PLAY". At this step, an athlete information discovery tool identifies the one or more athletes involved in the most recent play from the play-by-play information. For example, server app 102 may examine the play-by-play information, or it may access a database of roster information, if necessary. If there are multiple athletes involved in a particular play, each athlete may be considered individually in sequence as part of this step. The server app 102 may store a "current athlete" under consideration in a register or other memory location.

The process of step 850 proceeds to step 852 with the decision block labeled "JERSEY NUMBER FOUND?" At this step, an athlete information discovery tool determines whether the current athlete under consideration is associated with the jersey number from the received query. For example, server app 102 may compare the jersey number from the received query with the jersey number associated with the current athlete.

If the determination is negative, the process of step 850 proceeds to step 856, which will be described in further detail below. If the determination at step 852 is affirmative, then the process of step 850 proceeds to step 853 with the decision block labeled "NEAREST SO FAR?" At this step, an athlete information discovery tool determines whether the current athlete under consideration is currently the athlete nearest to the location associated with the user (and being associated with a corresponding matching jersey number). For example, server app 102 may calculate the distance between the location of the current athlete and the location of associated with the user. The server app 102 may store this calculated distance together with the current athlete in a register or other memory location. The server app 102 may compare any newly calculated distance with such a stored distance to determine whether the current athlete is indeed nearest.

If the determination at step 853 is negative, the process of step 850 proceeds to step 854 with the block labeled "CURRENT ATHLETE IS NOT BEST MATCH". At this step, an athlete information discovery tool determines that the current athlete is not the best match, and the process of step 850 proceeds to step 856, which will be described below.

If the determination at step 853 is positive, then the process of step 850 proceeds to step 855 with the block labeled "CURRENT ATHLETE=NEW BEST MATCH". At this step, an athlete information discovery tool determines that the current athlete under consideration is the new "best match" candidate, and updates this information. For example, server app 102 may store the current athlete as the new "best match" candidate in a register or other memory location.

The process of step 850 proceeds to step 856 with the decision block labeled "ADDITIONAL PLAYS?" At this step, an athlete information discovery tool determines whether there are additional plays from the play-by-play information to be considered. For example, server app 102 may access a database of play-by-play information and process only a predetermined number of recent plays or it may retrieve all recent plays for a predetermined time period and consider the recent plays in turn.

If the determination is negative, then the process of step 850 proceeds to step 857 with the block labeled "CURRENT BEST MATCH=MOST LIKELY ATHLETE". At this step, an athlete information discovery tool determines that the athlete that is currently determined to be the "best match" is indeed the most likely athlete whose profile was desired. For example, server app 102 may store the "best match" candidate in a register or other memory location, and the current "best match" athlete may be used in subsequent processing in the method 800 of FIG. 8A.

If the determination at step 856 is positive, then the process of step 850 proceeds to step 858 with the block labeled "IDENTIFY ATHLETES FROM NEXT MOST RECENT PLAY". The processing of this step is substantially similar to the processing of step 851. That is, an athlete information discovery tool identifies the one or more athletes involved in the most recent play from the play-by-play information. For example, server app 102 may examine the play-by-play information, or it may access a database of roster information, if necessary. If there are multiple athletes involved in a particular play, each athlete may be considered individually in sequence as part of this step. From step 858, the process of step 850 then reverts to step 852, and processing continues as above.

Referring again to FIG. 8A, the method 800 proceeds to step 860 with the block labeled "ACCESS DATABASE TO RETRIEVE ATHLETE PROFILE". At this step, an athlete information discovery tool accesses a database of athlete profiles to retrieve the desired athlete information. For example, server app 102 may access a database of athlete information stored in database 104, or it may access a database provided by a content provider 120 or a service provider 130. The database of athlete profiles associates athlete jersey numbers with other athlete information.

Figure 9A:
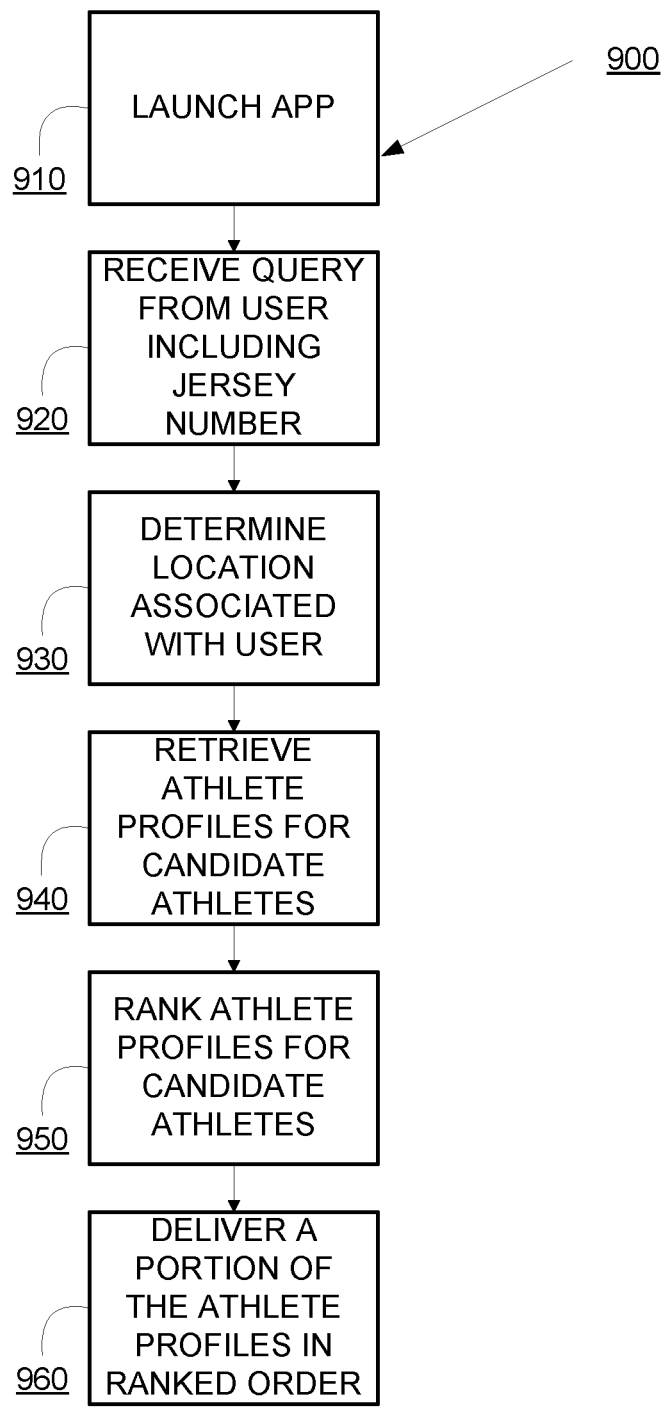
FIG. 9A is a block diagram illustrating a method for processing a request for athlete information according to an embodiment of the disclosed subject matter.

FIG. 9A is a block diagram illustrating a method for processing a request for athlete information according to an embodiment of the disclosed subject matter. Each of the operations shown in FIG. 9A may correspond to instructions stored in a computer memory or computer readable storage medium.

In FIG. 9A, a method 900 begins with the step 910 with the block labeled "LAUNCH APP". At this step, a user launches an app, such as a mobile client application executing on the user's mobile device, and the mobile client application establishes a communications session with a server application executing on a server. For example, App 112a may establish a communications session with server app 102 executing on server 100. The server app 102 and the corresponding mobile client application App 112*a* may comprise, for example, an athlete information discovery tool.

The method 900 proceeds to step 920 with the block labeled "RECEIVE QUERY FROM USER INCLUDING JERSEY NUMBER". At this step, an athlete information discovery tool receives a query from a user, the query including an athlete's jersey number. For example, a user operating a client application 112*a* on a device 110*a* may enter a query, such as the numeric string "23", and the client application 112*a* may forward this query to server app 102. The query may also be associated with a time window or a timestamp. For example, server 100 may associate a timestamp or time window to the received query based on an operating system clock incorporated within the server 100.

The method 900 proceeds to step 930 with the block labeled "DETERMINE LOCATION ASSOCIATED WITH USER". At this step, an athlete information discovery tool determines a location associated with the user. For example, server app 102 may determine a user's location based on a determination of the location of the user's device 110*a*. Server app 102 may determine the location of device 110*a* using location information obtained by app 112*a* from device 110*a*. The location information may comprise, for example, GPS location data, an IP address assigned to device 110*a*, network location data based on registration with a cell tower or WiFi access point, or a combination of such location data. Location information may also be designated by a user preference or setting, for example, by selecting a home location or a home market (or media market) by zip code or postal code, local time zone, city, or other such option as is known in the art. Location information may also be designated, for example, by a user selection of a television service provider, whether such provider is one of broadcast over-the-air (OTA), cable, satellite, or an Internet service provider.

The method 900 proceeds to step 940 with the block labeled "RETRIEVE ATHLETE PROFILES FOR CANDIDATE ATHLETES". At this step, an athlete information discovery tool retrieves athlete profiles for candidate athletes. Candidate athletes may be identified as those being associated with the jersey number from the received query and participating in an athletic event in proximity to the user and the query, in a geographic sense, a temporal sense, or both. That is, the athlete information discovery tool may infer that the user is interested in athlete information for those athletes who either recently performed, are currently performing, or will soon be performing at or near the location associated with the user. For example, server app 102 may retrieve athlete profiles for candidate athletes from a database of athlete information, such as database 104, or in combination with databases accessible through a content provider 120 or a service provider 130. An example of a more detailed process for step 940 is illustrated in FIG. 9B.

Figure 9B:
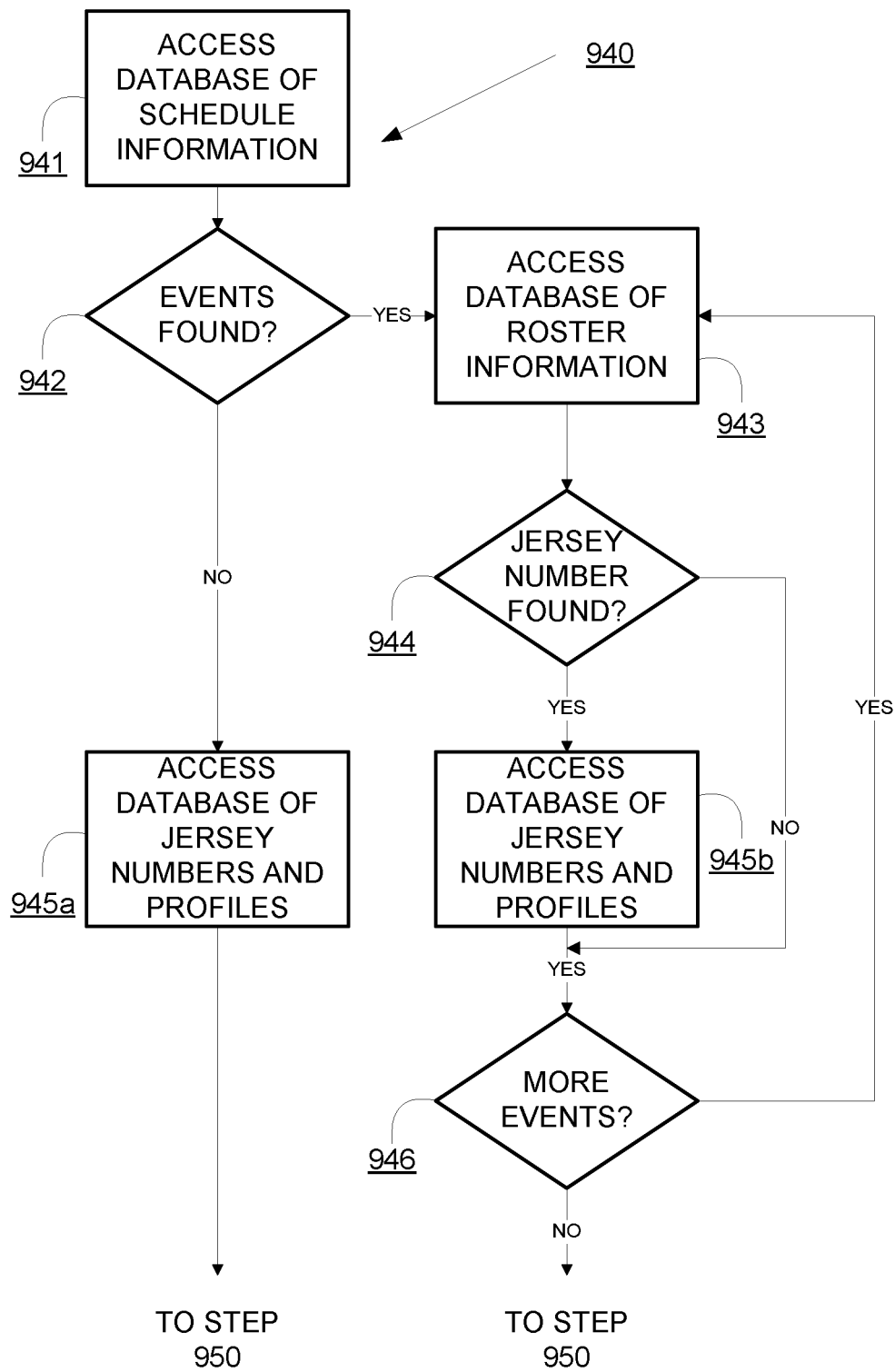
FIG. 9B is a block diagram illustrating a method for retrieving athlete profiles for candidate athletes according to an embodiment of the disclosed subject matter.

FIG. 9B is a block diagram illustrating a method for retrieving athlete profiles for candidate athletes according to an embodiment of the disclosed subject matter. Each of the operations shown in FIG. 9B may correspond to instructions stored in a computer memory or computer readable storage medium.

In FIG. 9B, the process of step 940 begins at step 941 with the block labeled "ACCESS DATABASE OF SCHEDULE INFORMATION". At this step, an athlete information discovery tool accesses a database of schedule information related to athletic events. For example, server app 102 may access schedule information for athletic events from a database such as database 104, which may be accessed in combination with databases accessible through a content provider 120 or a service provider 130. The schedule information may contain, for example, a list of scheduled athletic events and various details such as the scheduled start time, the location or venue, and the participating athletes or teams. Other details such as broadcasting information may also be included. In some cases, a scheduled broadcast time for a particular event may not be the same as the actual start time of the event such as, for example, in the case of a tape-delayed broadcast.

The process of step 940 proceeds to step 942 with the decision block labeled "EVENTS FOUND?" At this step, an athlete information discovery tool determines whether there are any events proximal to the location associated with the user and/or proximal to the timestamp or time window associated with the received query. For example, server app 102 may determine whether any such events exist, subject to certain threshold values, which may or may not be configurable by an application administrator or by a user. For example, geographical proximity may be determined as within 100 miles of the location associated with the user, and temporal proximity may be determined as within 2 hours. In this way, only the most relevant results can be returned in response to the received query.

If the determination at decision block 942 is negative, then no events were identified as being in proximity to the user's location and/or time associated with the query. In this case, the process of step 940 proceeds to step 945*a* with the block labeled "ACCESS DATABASE OF JERSEY NUMBERS AND PROFILES". At this step, an athlete information discovery tool accesses a database of jersey numbers and profiles to retrieve athlete profiles for athletes associated with the jersey number from the received query. For example, server app 102 may access a database such as may be stored in database 104 or accessible through a content provider 120 or a service provider 130. The database may include, for example, jersey numbers, athlete names, and other athlete information comprising athlete profiles. From step 944*a*, the process of step 940 proceeds to step 950 of FIG. 9A.

Referring again to decision block 942 of FIG. 9B, if the determination at decision block 942 is affirmative, then the process of step 940 proceeds to step 943 with the block labeled "ACCESS DATABASE OF ROSTER INFORMATION". At this step, an athlete information discovery tool accesses a database of roster information to determine athletes participating in each particular athletic event identified as being in proximity to the user's location and/or the time associated with the received query. For example, server app 102 may access a database of roster information such as may be stored in database 104 or accessed from a content provider 120 or a service provider 130. The roster information may be used to identify, for example, athletes who are "starting" athletes for a particular contest, and may reflect status due to injuries and/or replacements as well as regular changes in rotation, such as for starting pitchers in baseball.

The process of step 940 proceeds to step 944 with the decision block labeled "JERSEY NUMBER FOUND?" At this step, an athlete information discovery tool determines whether the jersey number from the received query is found in the roster information for a particular athletic event, which indicates that a particular athlete recently performed, is performing, or will soon perform. In some cases, more than one athlete (from different teams) may be involved in one particular athletic event if they share the same jersey number.

If the determination at step 944 is affirmative, then the process of step 940 proceeds to step 945b with the block labeled "ACCESS DATABASE OF JERSEY NUMBERS AND PROFILES". This step is substantially similar to the step 945a as it was described above, with the only difference being that following this step, the process of step 940 proceeds to step 946, with the decision block labeled "MORE EVENTS?" This step is also reached when the determination at decision block 944 is negative, which indicates that no athlete performing in a particular athletic event is associated with the jersey number from the received query. At this step 946, an athlete information discovery tool determines whether there are additional events identified as being in proximity to the user's location and/or the time of the received query. If the determination is positive, then the process of step 940 reverts to step 943. If the determination at step 946 is negative, then the process of step 940 proceeds to step 950 of FIG. 9A.

Referring again to FIG. 9A, the method 900 proceeds to step 950 with the block labeled "RANK ATHLETE PROFILES FOR CANDIDATE ATHLETES". At this step, an athlete information discovery tool ranks the athlete profiles for the identified candidate athletes according to a measure of proximity. For example, server app 102 may rank the retrieved athlete profiles based on proximity of each athlete's location (for example, determined by the location of the athletic contest) to the location associated with the user as well as the temporal proximity of the athletic event to the time associated with the received query. As an example, athlete profiles for athletes whose performances are located in closer proximity to the user's location may be ranked higher. Additionally, athlete profiles for athletes who are currently performing may be ranked higher than athlete profiles for athletes who have recently performed, which may in turn by ranked higher than athlete profiles for athletes who are scheduled to perform. Other rankings are possible, including applying various weighting schemes for location and temporal proximity. These rankings may also be influenced, for example, by user preferences if they are available in a particular configuration.

The method 900 proceeds to step 960 with the block labeled "DELIVER A PORTION OF THE PROFILES IN RANKED ORDER". At this step, an athlete information discovery tool delivers at least a portion of selected athlete profiles according to the ranking from step 950. For example, server app 102 may process thumbnails for each athlete profile and transmit them to a client application 112a executing on a user's device 110a. The thumbnails may be, for example, as depicted in FIG. 4B, and may be linked to additional information comprising more complete athlete profiles as depicted, for example, in FIGS. 4C-F.

The previously disclosed embodiments dealt primarily with examples of systems and methods for discovering athlete information in the context of attending live spectator sporting events. The athlete information discovery tool in these embodiments may also be used in conjunction with viewing spectator sporting events on televisions through broadcast, cable, or satellite services, on personal computing devices using live or delayed Internet streams, or through video-on-demand (VOD) services.

Moreover, the previously disclosed embodiments were mainly described within the context of a user performing an active search for athlete information, such as by submitting a query comprising a numeric identifier such as a jersey number or another pseudo-unique ID. The athlete information discovery tool disclosed in these embodiments may also be used in a passive discovery mode, whereby suggestions or recommendations can be made based on one or more factors. For example, suggestions or recommendations may be made based on a proximity factor. The proximity factor may be measured between, for example, a user or the user's device and an athlete, a team, a scheduled event, a particular venue, or even a media market. The suggestions or recommendations may be made, for example, taking into account the location of the user or the user's device. The suggestions or recommendations may also be made, for example, taking into account various user preferences or settings such as a favorite team, a home location or home market, or a preferred content or service provider such as a subscription TV service. The suggestions or recommendations may also be made, for example, based upon membership in or affiliation with a particular group or individual, including being a follower on social media channels or being a member or subscriber of a service. The suggestions or recommendations may also be made, for example, based upon popular trends relating to purchases, social media "buzz", trending keyword searches, and the like—all of which may be collected, combined, and updated by the athlete information discovery tool.

In a passive discovery mode, an athlete information discovery tool may present suggestions or recommendations for athletes as well as purchase recommendations for merchandise, tickets, transportation fare to events, and the like. Examples of such suggestions or recommendations have been described in relation to FIG. 4A, including the description of the popular merchandise information 431a and the "Playing Now" information 431b. Applying the various concepts of the systems and methods relating to the previously disclosed embodiments, such suggestions or recommendations can be grouped, ranked, and presented in a variety of ways.

Figure 10:
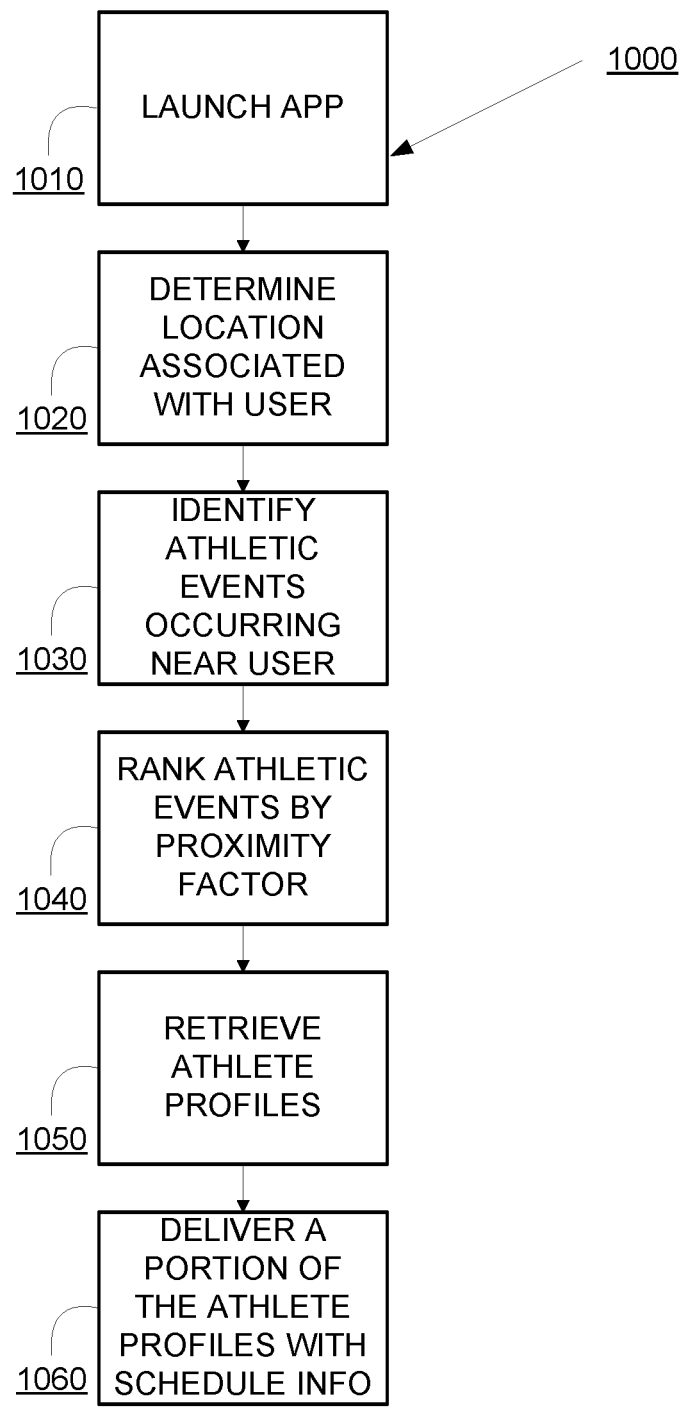
FIG. 10 is a block diagram illustrating a method for presenting athlete information in a passive discovery mode according to an embodiment of the disclosed subject matter.

FIG. 10 is a block diagram illustrating a method for presenting athlete information in a passive discovery mode according to an embodiment of the disclosed subject matter. Each of the operations shown in FIG. 10 may correspond to instructions stored in a computer memory or computer readable storage medium.

In FIG. 10, a method 1000 begins with the step 1010 with the block labeled "LAUNCH APP". At this step, a user launches an app, such as a mobile client application executing on the user's mobile device, and the mobile client application establishes a communications session with a server application executing on a server. For example, App 112a may establish a communications session with server app 102 executing on server 100. The server app 102 and the corresponding mobile client application App 112a may comprise, for example, an athlete information discovery tool.

The method 1000 proceeds to step 1020 with the block labeled "DETERMINE LOCATION ASSOCIATED WITH USER". At this step, an athlete information discovery tool determines a location associated with the user. For example, server app 102 may determine a user's location based on a determination of the location of the user's device 110a. Server app 102 may determine the location of device 110a using location information obtained by app 112a from device 110a. The location information may comprise, for example, GPS location data, an IP address assigned to device 110a, network location data based on registration with a cell tower or WiFi access point, or a combination of such location data. Location information may also be designated by a user preference or setting, for example, by selecting a home location or a home market (or media market) by zip code or postal code, local time zone, city, or other such option as is known in the art. Location information may also be designated, for example, by a user selection of a television service provider, whether such provider is one of broadcast over-the-air (OTA), cable, satellite, or an Internet service provider.

The method 1000 proceeds to step 1030 with the block labeled "IDENTIFY ATHLETIC EVENTS OCCURRING NEAR USER". At this step, an athlete information discovery tool accesses a database of schedule information related to athletic events. For example, server app 102 may access schedule information for athletic events from a database such as database 104, which may be accessed in combination with databases accessible through a content provider 120 or a service provider 130. The schedule information may contain, for example, a list of scheduled athletic events and various details such as the scheduled start time, the location or venue, and the participating athletes or teams. Other details such as broadcasting information may also be included. In some cases, a scheduled broadcast time for a particular event may not be the same as the actual start time of the event such as, for example, in the case of a tape-delayed broadcast. The athlete information discovery tool determines whether there are any events proximal to the location associated with the user and/or proximal to the current time. For example, server app 102 may determine whether any such events exist, subject to certain threshold values, which may or may not be configurable by an application administrator or by a user. For example, geographical proximity may be determined as within 100 miles of the location associated with the user, and temporal proximity may be determined as within 2 hours.

In one embodiment, an athlete information discovery tool determines the nearest events based on the location information associated with the user and the schedule information. In this context, the "nearest" events may be determined based on geographic proximity, temporal proximity, or a combination of geographic and temporal proximity. In some cases, an event may be deemed as the "nearest" event as a proxy for being the "most relevant." For example, two events may have the same geographical distance (such as for two events occurring at the same venue), but one may be judged as being "nearer" or "nearest" based on a time schedule. Also, the concept of "nearness" or being "near" as used herein may be related to the concept of "nearestness." In other words, an event may be judged as being "near" a location on the basis that it is "nearest" to such location, without falling within an arbitrary threshold of distance or separation.

In other cases, an athletic event may be determined to be "near" the user if it is being broadcast (or otherwise transmitted) within or near the user's location. For example, the location associated with the user that was determined at step 1010 may have been determined, in part, by a user preference or setting that specifies the user's television service provider. In such cases, athletic events that are broadcast by the user's television service provider may be deemed to be "near" the user. Alternatively, athletic events that are broadcast by a different television service provider may also be deemed to be "near" the user on the basis that they are being broadcast to a particular media market.

The method 1000 proceeds to step 1040 with the block labeled "RANK ATHLETIC EVENTS USING PROXIMITY FACTOR". At this step, an athlete information discovery tool ranks the athlete athletic events identified at step 1030 using a proximity factor. For example, server app 102 may rank the athletic events identified at step 1030 using a proximity factor. The proximity factor may be related, for example, to a user's geographical proximity to an athletic event, temporal proximity to a scheduled live or broadcasted event, a proximity based on a user's geographical location or membership within a media market or television provider network, or a combination of such factors. The ranking of athletic events in step 1040 is intended, therefore, to identify not only those athletic events that are most local to a user, but also those athletic events that may be most locally available for viewing by the user based on media channels. Moreover, a user's preferences or settings, such as specification of favorite teams or athletes, may also be taken into account for ranking purposes.

The method 1000 proceeds to step 1050 with the block labeled "RETRIEVE ATHLETE PROFILES". At this step, an athlete information discovery tool retrieves athlete profiles for athletes participating in the athletic events identified at step 1030 and ranked at step 1040. For example, server app 102 selects and retrieves athlete information organized as profiles from a database such as database 104. Server app 102 may also retrieve, for example, athlete information and other non-athlete information from content providers 120 and service providers 130. Accordingly, the selected and retrieved athlete profiles may comprise a combination of static athlete information and dynamic athlete information, and the profiles may be generated and updated in real-time. Athlete profiles may be sorted according to starting rosters or by information relating to which athletes are currently actively participating, and this information may also be updated as necessary.

The method 1000 proceeds to step 1060 with the block labeled "DELIVER A PORTION OF THE ATHLETE PROFILES WITH SCHEDULE INFO". At this step, an athlete information discovery tool delivers at least a portion of selected athlete profiles to the user through a graphical user interface. For example, server app 102 may process thumbnails for each athlete profile and transmit them to a client application 112a executing on a user's device 110a. The thumbnails may be grouped by athletic event, with the athletic events being sorted according to the ranking of step 1040, along with schedule information for each athletic event.

Figure 11:
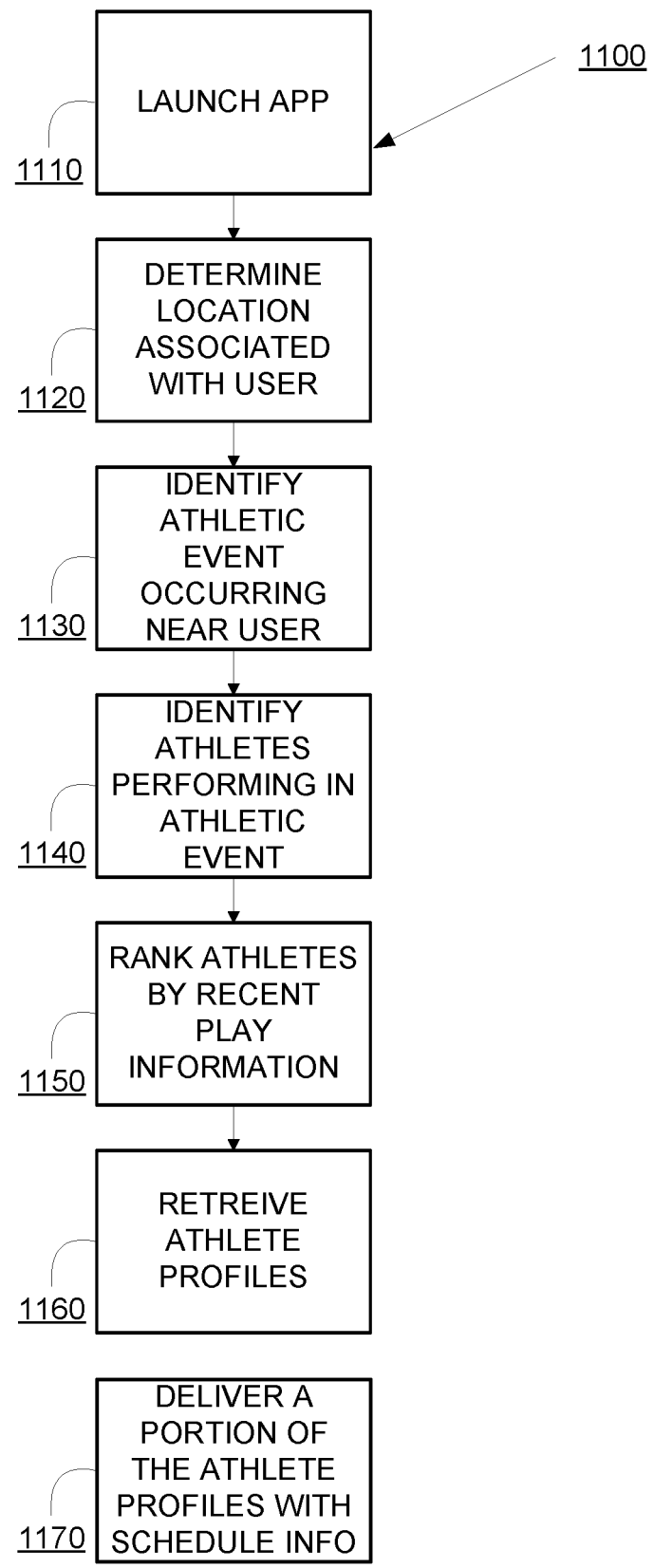
FIG. 11 is a block diagram illustrating a method for presenting athlete information for athletes involved in recent plays in a passive discovery mode according to an embodiment of the disclosed subject matter.

FIG. 11 is a block diagram illustrating a method for presenting athlete information for athletes involved in recent plays in a passive discovery mode according to an embodiment of the disclosed subject matter. Each of the operations shown in FIG. 11 may correspond to instructions stored in a computer memory or computer readable storage medium.

In FIG. 11, a method 1100 begins with the step 1110 with the block labeled "LAUNCH APP". At this step, a user launches an app, such as a mobile client application executing on the user's mobile device, and the mobile client application establishes a communications session with a server application executing on a server. For example, App 112a may establish a communications session with server app 102 executing on server 100. The server app 102 and the corresponding mobile client application App 112a may comprise, for example, an athlete information discovery tool.

The method 1100 proceeds to step 1120 with the block labeled "DETERMINE LOCATION ASSOCIATED WITH USER". At this step, an athlete information discovery tool determines a location associated with the user. For example, server app 102 may determine a user's location based on a determination of the location of the user's device 110a. Server app 102 may determine the location of device 110a using location information obtained by app 112a from device 110a. The location information may comprise, for example, GPS location data, an IP address assigned to device 110a, network location data based on registration with a cell tower or WiFi access point, or a combination of such location data. Location information may also be designated by a user preference or setting, for example, by selecting a home location or a home market (or media market) by zip code or postal code, local time zone, city, or other such option as is known in the art. Location information may also be designated, for example, by a user selection of a television service provider, whether such provider is one of broadcast over-the-air (OTA), cable, satellite, or an Internet service provider.

The method 1100 proceeds to step 1130 with the block labeled "IDENTIFY ATHLETIC EVENT OCCURRING NEAR USER". At this step, an athlete information discovery tool accesses a database of schedule information related to athletic events. For example, server app 102 may access schedule information for athletic events from a database such as database 104, which may be accessed in combination with databases accessible through a content provider 120 or a service provider 130. The schedule information may contain, for example, a list of scheduled athletic events and various details such as the scheduled start time, the location or venue, and the participating athletes or teams. Other details such as broadcasting information may also be included. In some cases, a scheduled broadcast time for a particular event may not be the same as the actual start time of the event such as, for example, in the case of a tape-delayed broadcast. The athlete information discovery tool determines whether there are any events proximal to the location associated with the user and/or proximal to the current time. For example, server app 102 may identify at least one athletic event occurring near the user in a manner similar to that as described for step 1030 in the method 1000 of FIG. 10.

Referring again to FIG. 11, the method 1100 proceeds to step 1140 with the block labeled "IDENTIFY ATHLETES PERFORMING IN ATHLETIC EVENT". At this step, an athlete information discovery tool identifies athletes performing in the athletic event identified at step 1130. For example, server app 102 may retrieve this information from a database such as database 104 or from a content provider 120 or a service provider 130. Such database may contain, for example, roster information for athletes participating in the athletic event, including information designating which athletes are starting and/or which athletes are currently performing.

The method 1100 proceeds to step 1150 with the block labeled "RANK ATHLETES BY RECENT PLAY INFORMATION". At this step, an athlete information discovery tool ranks the athletes identified at step 1140 according to recent play information. For example, server app 102 may retrieve data from a recent play database such as is illustrated by table 70 in FIG. 7A. Table 70 may be, for example, contained within database 104, or may be retrieved from a content provider 120 or a service provider 130. Alternatively, a recent play database may be constructed or generated on the fly according to recent play information stored in database 104 or retrieved from a content provider 120 or a service provider 130. The athletes may be ranked according to the recent play information so that an athlete involved in the most recent play is ranked higher than athletes involved in earlier plays.

The method 1100 proceeds to step 1160 with the block labeled "RETRIEVE ATHLETE PROFILES". At this step, an athlete information discovery tool retrieves athlete information organized as athlete profiles for the athletes identified at step 1140. For example, server app 102 may retrieve athlete information organized as athlete profiles from a database such as database 104, or it may retrieve athlete profiles from a content provider 120 or a service provider 130. The athlete profiles may comprise static athlete information and dynamic athlete information that may include, for example, updated player statistics as well as information relating to purchase recommendations for tickets, transportation fare, player related merchandise, and player sports betting propositions.

The method 1100 proceeds to step 1170 with the block labeled "DELIVER A PORTION OF THE ATHLETE PROFILES WITH SCHEDULE INFO". At this step, an athlete information discovery tool delivers a portion of the athlete profiles retrieved at step 1160 to a user. For example, server app 102 may deliver thumbnails of one or more athlete profiles to a client app 112a executing on a user's device 110a through a graphical user interface. Such thumbnails may be arranged according to the ranking of step 1150, and may be delivered along with schedule information for the athletic event identified at step 1130. The thumbnails may represent a portion of the athlete profiles and may provide interactive links to more comprehensive athlete profiles.

FIG. 12A illustrates an example of a portion of a graphical user interface of an athlete information discovery tool according to an embodiment of the disclosed subject matter. In FIG. 12A, a portion of a graphical user interface (GUI) 12 comprises an athletic events window 1210, labeled here "Playing Now" and an athletes window 1220, labeled here "Recent Plays." As shown here, athletic events window 1210 and athletes window 1220 have visible borders, but they may be implemented without borders. GUI 12 may be a portion of a graphical user interface of an athlete information discovery tool, and as such, may be incorporated within, for example, the GUI 40 of FIGS. 4A-4F. For example, GUI 12 may be incorporated within main window 430.

FIG. 12A may be used to present athlete information in a passive discovery mode such as has been described with regard to FIGS. 10-11. In some embodiments, an athlete information discovery tool may operate in a passive discovery mode to present athlete information in the absence of direct input from a user. In other embodiments, an athlete information discovery tool may operate in a passive discovery mode to present athlete information and then may receive interactive input from a user, where such interactive input does not comprise a search or active query. In this way, an athlete information discovery tool may allow a user to browse through suggestions in order to discovery athlete information and related purchase recommendations and the like.

Athletic events window 1210 displays event thumbnails 1212a, 1212b, and 1212c. Each of the event thumbnails comprises icons 1214 representing the competitors of the athletic events. For example, event thumbnail 1212a comprises icons 1214a1 and 1214a2, representing the Indiana Pacers basketball team and the Boston Celtics basketball team, respectively. Likewise, event thumbnail 1212b comprises icons 1214b1 and 1214b2, representing the Atlanta Hawks basketball team and the Golden State Warriors basketball team, respectively. Finally, event thumbnail 1212c comprises icons 1214c1 and 1214c2, representing the Brooklyn Nets basketball team and the Dallas Mavericks basketball team, respectively.

The event thumbnails 1212 may be arranged according to various ranking schemes, such as has been described with reference to FIG. 10, for example. As pictured here, the event thumbnails 1212a, 1212b, and 1212c are arranged according to the start times of the athletic events. The event corresponding to event thumbnail 1212a is in the 4th quarter, the event corresponding to event thumbnail 1212b is in the 2nd quarter, and the event corresponding to event thumbnail 1212c is in the 1st quarter. Each of these event thumbnails 1212 may be selected, for example, by tapping on a touchscreen, to access an athletic event profile. An athletic event profile may comprise event information such as location, venue, start time, and television broadcast information. An athletic event profile may also include additional information such as purchase recommendations. Such purchase recommendations may be related to, for example, tickets and transportation fare for the athletic event. Additionally, selecting a particular event thumbnail 1212 may allow a user to focus on the corresponding event, as will be described with reference to FIG. 12B.

Still referring to FIG. 12A, athletes window 1220 displays athlete thumbnails 1222a, 1222b, and 1222c. Each athlete thumbnail 1222 comprises a photo of an athlete, the athlete's name, and a designation of a team affiliation. Next to each athlete thumbnail 1222 is an associated event summary 1224 as well as an associated recent play summary 1226. Associated broadcast information 1228 is also displayed next to each athlete thumbnail 1222.

Here as shown, athlete thumbnail 1222a is a thumbnail for "Steve Curry", who is a member of the Golden State Warriors. Athlete thumbnail 1222a is shown with event summary 1224a, which reads "Warriors 55 Hawks 48 1:15 2nd Qtr." The event summary 1224a thus provides an in-game summary of the athletic event corresponding to event thumbnail 1212b which is between the Warriors and the Hawks, including the score as well as the time remaining. Recent play summary 1226a reads "Steve Curry makes 26-foot three point jumper" and includes a timestamp "1 minute ago." Broadcast information 1228a comprises the text "NBATV 345" and indicates a television channel broadcasting the athletic event corresponding to event thumbnail 1212b.

Similarly, athlete thumbnail 1222b is a thumbnail for "Dick Nowitzki", who is a member of the Dallas Mavericks. Athlete thumbnail 1222b is shown with event summary 1224b, which reads "Mavericks 19 Nets 11 5:31 1st Qtr" and gives an in-game summary of the athletic event corresponding to event thumbnail 1212c. Recent play summary 1226b reads "Dick Nowitzki makes driving dunk" and includes a timestamp "1 minute ago." Broadcast information 1228b comprises the text "KCAL 9" and indicates a television channel broadcasting the athletic event corresponding to event thumbnail 1212c.

Likewise, athlete thumbnail 1222c is a thumbnail for "Monty Ellis", who is a member of the Indiana Pacers. Athlete thumbnail 1222c is shown with event summary 1224c, which reads "Pacers 99 Celtics 97 3:16 4th Qtr" and gives an in-game summary of the athletic event corresponding to the event thumbnail 1212a. Recent play summary 1226c reads "Monty Ellis makes 15-foot jumper" and includes a timestamp "2 minutes ago." Broadcast information 1228c comprises the text "TWC 43" and indicates a television channel broadcasting the athletic event corresponding to event thumbnail 1212a.

The athlete thumbnails 1222a, 1222b, and 1222c may be individually selected, for example, by tapping on a touchscreen to access an athlete profile such as has been described, for example, with reference to FIGS. 4C-4F. In this way, a user may interact with an athlete information discovery tool operating in a passive discovery mode to discover athlete information without inputting a search term or query.

As shown here, the athlete thumbnails 1222a, 1222b, and 1222c have been arranged according to recent play activity, where the athlete involved in the most recent play is ranked higher than athletes involved in less recent plays. In some cases, a user may wish to focus on one particular athletic event by selecting a corresponding event thumbnail 1212.

Figure 12B:
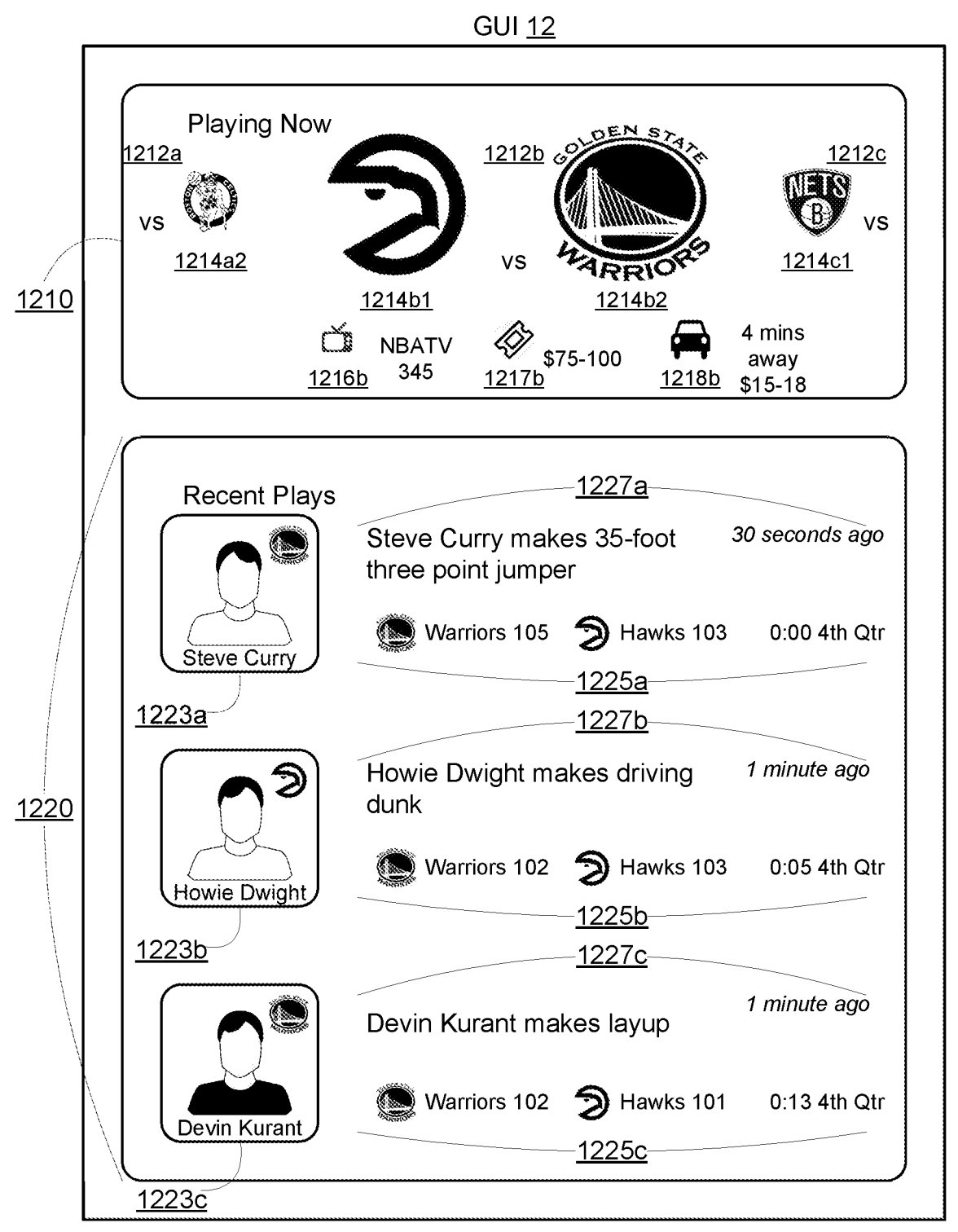

FIG. 12B illustrates an example of a portion of a graphical user interface of an athlete information discovery tool according to an embodiment of the disclosed subject matter. In FIG. 12B, a portion of a graphical user interface (GUI) 12 comprises an athletic events window 1210, labeled here "Playing Now" and an athletes window 1220, labeled here "Recent Plays." As shown here, athletic events window 1210 and athletes window 1220 have visible borders, but they may be implemented without borders. GUI 12 may be a portion of a graphical user interface of an athlete information discovery tool, and as such, may be incorporated within, for example, the GUI 40 of FIGS. 4A-4F. For example, GUI 12 may be incorporated within main window 430.

FIG. 12B illustrates the same event thumbnails 1212a, 1212b, and 1212c as were shown in FIG. 12A. However, in FIG. 12B, event thumbnail 1212b has been enlarged relative to event thumbnails 1212a and 1212c. As was described with reference to FIG. 12A, the event thumbnails 1212 may be selected to focus on a particular event. The event thumbnails 1212 may be arranged in a scrollable list, in a fashion similar to a "Camera Roll" or "Filmstrip Mode." That is, they are arranged side by side and like frames in a filmstrip or pictures in a roll of film in a camera. As shown here, the enlargement of event thumbnail 1212b results in event thumbnails 1212a and 1212c being only partially visible.

FIG. 12B includes additional elements in the athletic events window 1210. The selection of event thumbnail 1212b may cause an athlete information discovery tool to display an event profile for an athletic event. As shown here, the event profile is the augmented event thumbnail 1212b, with enlarged icons 1214b1 and 1214b2, as well as channel control icon 1216b, ticket control icon 1217b, and transportation control icon 1218b. Channel control icon 1216b as shown here indicates that the athletic event corresponding to event thumbnail 1212b is broadcast on the channel "NBATV 345." Channel control icon 1216b includes a TV icon, which in some embodiments may be a link to a content provider 120 or to a service provider 130 that allows viewing of the athletic event. If there are alternate viewing options available, additional icons and links may also be displayed, such as for allowing viewing of live streams over the Internet. Ticket control icon 1217b as shown here indicates that tickets to the athletic event corresponding to event thumbnail 1212b cost between "$75-100." Ticket control icon 1217b includes a ticket icon, which in some embodiments may be a link to a service provider that allows purchasing a ticket for the athletic event. Finally, transportation control icon 1218b as shown here indicates that a taxi service or car for hire is "4 mins away" with a cost between "$15-18." Transportation control icon 1218b includes a car icon, which in some embodiments may be a link to a service provider 130 that allows reserving and purchasing transportation fare to the athletic event. In this way, the athletic event profile or augmented event thumbnail 1212b may include links to content and services as well as purchase recommendations.

Athletes window 1220 displays athlete thumbnails 1223a, 1223b, and 1223c. As with athlete thumbnails 1222, each athlete thumbnail 1223 comprises a photo of an athlete, the athlete's name, and a designation of a team affiliation. Next to each athlete thumbnail 1223 is an associated event summary 1225 as well as an associated recent play summary 1227. Because broadcast information is already displayed in the athletic event profile (i.e., the augmented event thumbnail 1212*b*) in the form of channel control icon 1216*b*, it is not displayed next to the athlete thumbnail.

Here as shown, athlete thumbnail 1223*a* is a thumbnail for "Steve Curry", who is a member of the Golden State Warriors. Athlete thumbnail 1223*a* is shown with event summary 1225*a*, which reads "Warriors 105 Hawks 103 0:00 4th Qtr." The event summary 1225*a* thus provides an in-game summary of the athletic event corresponding to event thumbnail 1212*b* which is between the Warriors and the Hawks, including the score as well as the time remaining. Recent play summary 1227*a* reads "Steve Curry makes 35-foot three point jumper" and includes a timestamp "30 seconds ago."

Similarly, athlete thumbnail 1223*b* is a thumbnail for "Howie Dwight", who is a member of the Atlanta Hawks. Athlete thumbnail 1223*b* is shown with event summary 1225*b*, which reads "Warriors 102 Hawks 103 0:04 4th Qtr" and gives an in-game summary of the same athletic event corresponding to event thumbnail 1212*b*. Recent play summary 1227*b* reads "Howie Dwight makes driving dunk" and includes a timestamp "1 minute ago."

Likewise, athlete thumbnail 1223*c* is a thumbnail for "Devin Kurant", who is a member of the Golden State Warriors. Athlete thumbnail 1223*c* is shown with event summary 1225*c*, which reads "Warriors 102 Hawks 101 0:13 4th Qtr" and gives an in-game summary of the same athletic event corresponding to the event thumbnail 1212*b*. Recent play summary 1227*c* reads "Devin Kurant makes layup" and includes a timestamp "1 minute ago."

As shown, the athlete thumbnails 1223*a*, 1223*b*, and 1223*c* have been arranged according to recent play activity, where the athlete involved in the most recent play is ranked higher than athletes involved in less recent plays.

The above descriptions of FIGS. 12A and 12B illustrate how a user might interact with an athlete information discovery tool operating in a passive discovery mode according to some embodiments of the disclosed subject matter. The athlete information discovery tool may first present the user with a browsable list of current or upcoming athletic events. Such list of events may be derived, for example, based on a location associated with the user, and as such does not require any interactive input from the user. As the user browses through the list of current or upcoming athletic events, the athlete information discovery tool may provide snapshots or capsule summaries of in-game progress, such as recent play information and time remaining. The athlete information discovery tool may allow the user to select a particular athletic event on which to focus.

While the above descriptions of FIGS. 12A and 12B primarily concerned currently ongoing athletic events, the graphical user interface and concepts described could be extended to athletic events scheduled in the future. That is, an athlete information discovery tool may present in an athletic events window 1210 a browsable list of upcoming athletic events, or a combination of currently ongoing and future scheduled athletic events. The athlete information discovery tool may present in an athletes window 1220 athlete thumbnails for athletes participating in such athletic events. Where applicable, each athlete thumbnail may be presented along with an event summary, recent play summary, and broadcast information. Moreover, just as the augmented event profile 1212*b* comprised additional information relating to an athletic event such as through a channel control icon, a ticket control icon, and a transportation control icon as well as links for viewing the event, purchasing a ticket to the event, and reserving and purchasing transportation fare to event, an athlete thumbnail may similarly be augmented or presented along with such additional information and links.

Figure 12C:
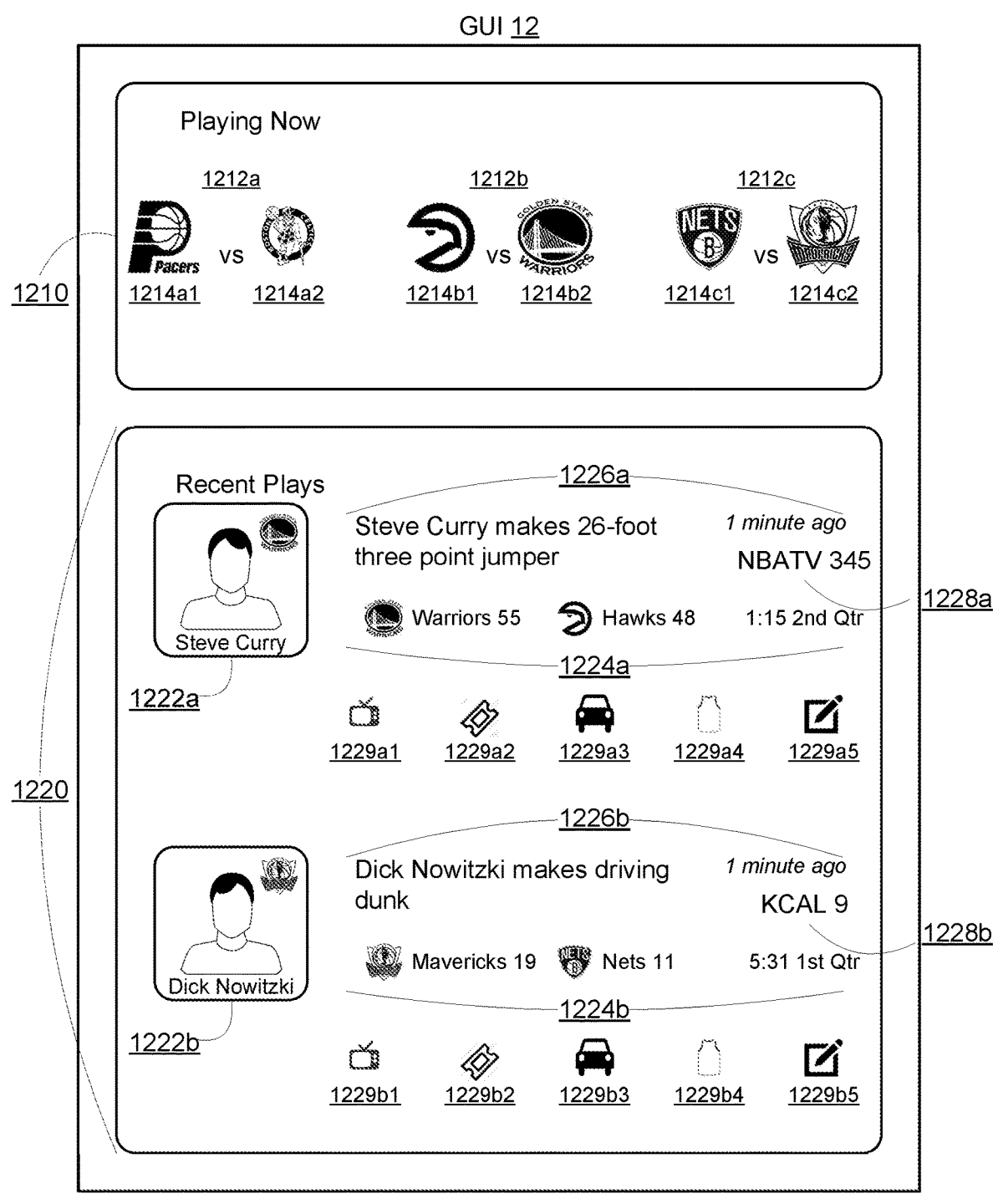

FIG. 12C illustrates an example of a portion of a graphical user interface of an athlete information discovery tool according to an embodiment of the disclosed subject matter. In FIG. 12C, a GUI 12 comprises an athletic events window 1210 and an athletes window 1220. As shown, events window 1210 is identical to the events window depicted in FIG. 12A and described herein. Athletes window 1220 comprises many of the same elements as in FIG. 12A, including athlete thumbnail 1222*a*, event summary 1224*a*, recent play summary 1226*a*, and broadcast information 1228*a*. Athletes window 1220 also comprises athlete thumbnail 1222*b*, event summary 1224*b*, recent play summary 1226*b*, and broadcast information 1228*b*. Not pictured in FIG. 12C are athlete thumbnail 1222*c*, event summary 1224*c*, recent play summary 1226*c*, and broadcast information 1228*c*. Athletes window 1220 further comprises athlete profile control icons 1229*a*1, 1229*a*2, 1229*a*3, 1229*a*4, and 1229*a*5 associated with athlete thumbnail 1222*a*. Likewise, athlete profile control icons 1229*b*1, 1229*b*2, 1229*b*3, 1229*b*4, and 1229*b*5 are associated with athlete thumbnail 1222*b*.

The athlete profile control icons represent various links to portions of the athlete profile corresponding to the associated athlete thumbnail. For example, athlete profile control icon 1229*a*1 is associated with the athlete profile associated with athlete thumbnail 1222*a*, namely the athlete profile for Steve Curry, who is a member of the Golden State Warriors. Athlete profile control icon 1229*a*1 as shown here is a TV icon, and it may provide, for example, one or more links to a live stream of the athletic event corresponding to event thumbnail 1212*b*. Alternatively, athlete profile control icon 1229*a*1 may provide a link to broadcasting information for the athletic event. Athlete profile control icon 1229*a*2 as shown here is a ticket icon, and it may provide, for example, one or more links to a service provider 130 to allow purchase of a ticket to the athletic event corresponding to the event thumbnail 1212*b*. Athlete profile control icon 1229*a*3 as shown here is an automobile icon, and it may provide, for example, one or more links to a service provider 130 to allow reservation and purchase of transportation fare to the athletic event corresponding to the event thumbnail 1212*b*. Athlete profile control icon 1229*a*4 as shown here is a jersey icon, and it may provide, for example, one or more links to a service provider 130 to allow purchase of a jersey or sports-related merchandise associated with the athlete Steve Curry or the Golden State Warriors. Athlete profile control icon 1229*a*5 as shown here is an icon depicting a pen and paper, and represents posting to social media. It may provide one or more links, for example, to social media accounts and trending topics on social media related to Steve Curry, the Golden State Warriors, or the game between the Golden State Warriors and the Atlanta Hawks.

The athlete profile control icons depicted in FIG. 12C may provide links to various portions of an athlete profile that are accessible to a user of an athlete information discovery tool in an interactive searching or query mode as has been described herein. By incorporating the athlete profile control icons in a passive discovery mode, a user may easily access the same portions of an athlete profile while browsing through athletic event thumbnails and athlete thumbnails.

In some embodiments, an athlete profile may further comprise information and links related to player sports betting propositions. Player sports betting propositions relate to an individual athlete's performance, which may be measured, for example, by a number of points scored or other statistic. For example, bettors may wager whether Steve Curry will score 33 or fewer points in a particular game or 33 or more points in that game.

Figure 12D:
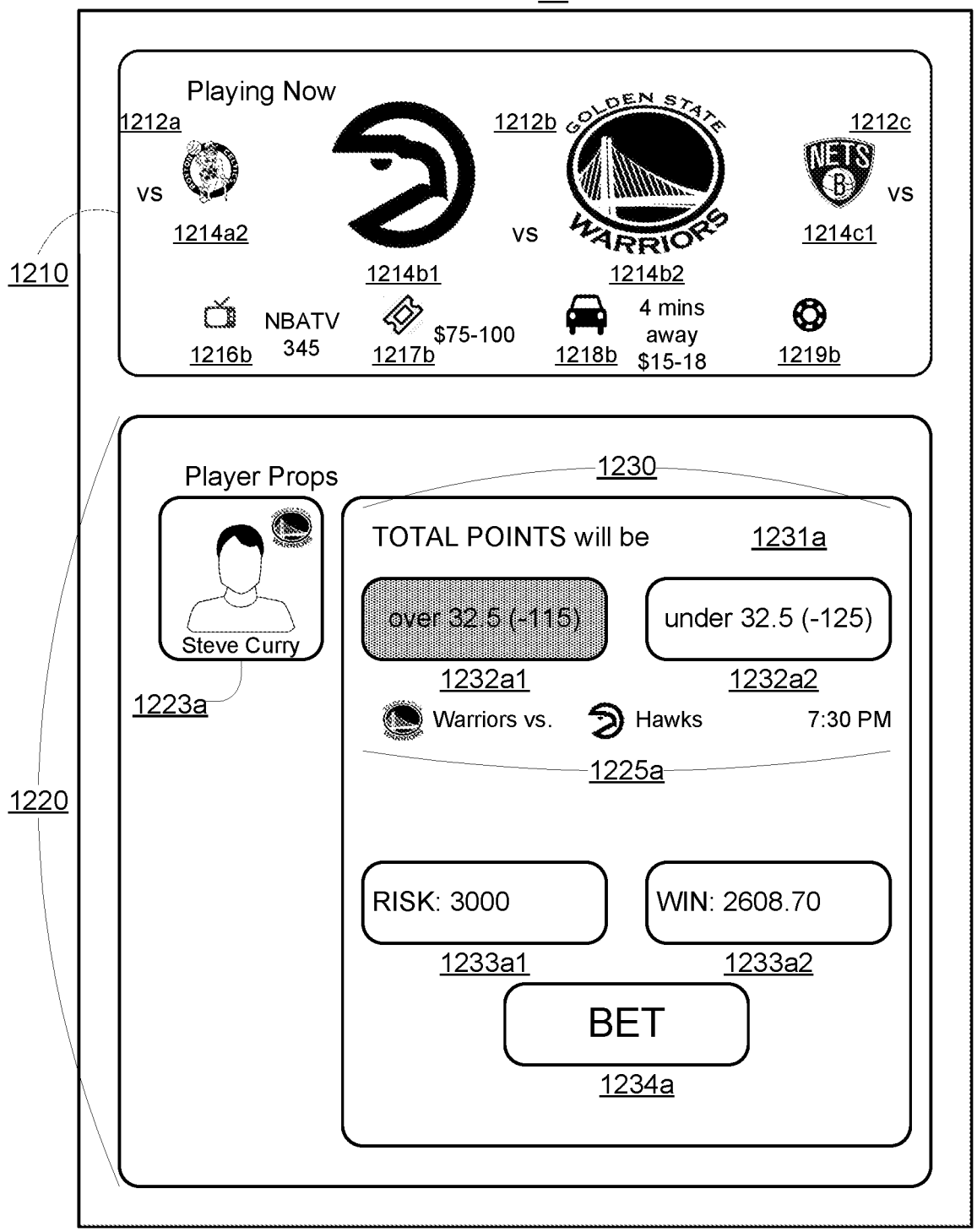
FIG. 12D illustrates an example of a portion of a graphical user interface for an athlete information discovery tool that comprises an implementation of player sports betting propositions according to an embodiment of the disclosed subject matter.

FIG. 12D illustrates an example of a portion of a graphical user interface for an athlete information discovery tool that comprises an implementation of player sports betting propositions according to an embodiment of the disclosed subject matter. In FIG. 12D, a GUI 12 comprises an athletic events window 1210 and an athletes window 1220. The events window 1210 comprises the same elements as the events window 1210 of FIG. 12B. Additionally, a betting control icon 1219b is displayed among an augmented event profile for the event 1212b. The betting control icon 1219b may provide a link to a service provider 130 to allow a user to participate in betting on player sports betting propositions.

The athletes window 1220, labeled here as "Player Props", comprises an athlete thumbnail 1223a for Steve Curry, who is a member of the Golden State Warriors. The athletes window 1220 further comprises an event summary 1225a, which reads "Warriors vs. Hawks 7:30 PM" and which is a summary of the athletic event in which Steve Curry is scheduled to participate.

The GUI 12 further comprises betting control overlay 1230, shown here with a border. The betting control overlay is a portion of GUI 12 that is activated when betting control icon 1219b is selected by a user of an athlete information discovery tool. Betting control overlay 1230 comprises wager information and controls 1231a, 1232a1, 1232a2, 1233a1, 1233a2, and 1234a. Wager information and control 1231a reads "Total points will be" and specifies the type of wager, i.e., a "total points" wager. Below control 1231a are wager information and controls 1232a1 and 1232a2, shown here as selectable buttons. In this example, wager information and control 1232a1 has been selected, as is indicated by the shading of that button. The button is labeled with the information "over 32.5 (-115)." This indicates that the user has selected the "over" side of the betting proposition, or in other words, is betting that Steve Curry will score 33 or more points. The -115 designation indicates the moneyline on the wager, which means that the user must risk $115 to win $100 on a successful wager. Wager information and control 1232a2 is a button labeled with the information "under 32.5 (-125)." This indicates that the user would bet the "under" side of the betting proposition, or in other words, would be betting that Steve Curry will score 32 or fewer points. The -125 designation indicates the moneyline on the wager, which means that the user would have to risk $125 to win $100 on a successful wager. Wager information and controls 1233a1 and 1233a2 are shown here as boxes where a user may enter either an amount to risk (wager information and control 1233a1) or an amount that is desired to win (wager information and control 1233a2). In this example, the wager information and control 1233a1 has a value of "RISK: 3000" while the wager information and control 1233a2 has a value of "WIN: 2608.70." This means that a user must risk $3000 in order to win $2608.70 for a successful wager. Finally, wager information and control 1234a is a selectable button labeled "BET." When this button is selected, a wager may be placed according to the parameters selected by a user using the other wager information and controls. The wager information and controls 1231a, 1232a1, 1232a2, 1233a1, 1233a2, and 1234a, as well as the betting control overlay 1230 and the betting control icon 1219b may also be implemented in other portions of a GUI for an athlete information discovery tool. For example, they may be incorporated into athlete profiles as well as athletic event profiles.

The athlete information discovery tool described in the various embodiments can provide a user, who may be a spectator of sporting events, an enhanced experience by enabling discovery of athlete information that is relevant to the user, where relevance may be inferred by factors relating to proximity in location and/or time, recent play activity, user preferences, and trending activity as has been described.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

I claim:

1. A method of presenting athlete information comprising:
    receiving during a time window at a server from an electronic device a query for athlete information, the query comprising an athlete's jersey number and the server comprising a processor and storage;
    determining a location associated with the electronic device;
    retrieving athlete profiles for one or more candidate athletes associated with the jersey number and performing within a certain threshold value of distance to the location and within a certain threshold value of time to the time window by:
        accessing a database of schedule information relating to athletic events to identify one or more athletic events occurring within a certain threshold value of distance to the location and within a certain threshold value of time to the time window;
        accessing a database of roster information of athletes to identify one or more candidate athletes participating in the one or more athletic events and associated with the jersey number from the received query;
        accessing a database of dynamic athlete information comprising news and social media information to identify one or more of the candidate athletes related to at least one topic; and
        accessing a database associating jersey numbers with individual athletes and athlete information;
    ranking the one or more athlete profiles based on one or more of a proximity factor and a status and progress of each of the one or more athletic events; and
    delivering at least of a portion of the one or more athlete profiles to the electronic device according to the ranking and in response to the received query.

2. A method according to claim 1, wherein at least one of the one or more athlete profiles comprises a purchase recommendation or a betting proposition.

3. A method according to claim 1, wherein determining a location associated with the electronic device is based on location information derived from one or more of a GPS location, IP address, network location data, or a user-specified preference or setting.

4. A method according to claim 1, wherein accessing a database of schedule information relating to athletic events to identify one or more athletic events occurring within a certain threshold value of distance to the location is based on one or more of a location of a venue where an athletic event is occurring, a media market for an athletic event, or a location based on a user preference or setting.

5. A method according to claim 1, wherein the proximity factor relates to one or more of the following: a degree to which the location associated with the electronic device is within a certain threshold value of distance to a location associated with a candidate athlete, a degree to which the time window of the received query is within a certain threshold value of time to the scheduled time of an athletic event in which a candidate athlete performs, and a degree to which the time window of the received query is within a certain threshold value of time to a time window associated with the at least one topic.

6. A method according to claim 1,
wherein the step of retrieving athlete profiles for one or more candidate athletes associated with the jersey number and performing within a certain threshold value of distance to the location and within a certain threshold value of time to the time window further comprises:
accessing a database of play-by-play information to identify a recent play and one or more candidate athletes involved in the recent play;
and further wherein the proximity factor relates to one or more of the following: a degree to which the location associated with the electronic device is within a certain threshold value of distance to a location associated with a candidate athlete, a degree to which the time window of the received query is within a certain threshold value of time to the scheduled time of an athletic event in which a candidate athlete performs, and a degree to which the time window of the received query is within a certain threshold value of time to a timestamp associated with the recent play.

7. A method according to claim 1, further comprising:
retrieving an athlete profile for an alternate athlete associated with the jersey number and performing in an alternate athletic event not necessarily near the location by:
accessing a database of schedule information relating to athletic events to identify an alternate athletic event, the identification of the alternate athletic event being related to the status and progress of each athletic event;
accessing a database of roster information of athletes to identify an alternate athlete participating in the alternate athletic event and associated with the jersey number from the received query; and
accessing a database associating jersey numbers with individual athletes and athlete information;
and wherein ranking the one or more athlete profiles comprises ranking the one or more athlete profiles and the athlete profile for the alternate athlete based in part on an event ranking of the one or more athletic events including the alternate athletic event, the event ranking being related to the status and progress of each of the one or more athletic events including the alternate athletic event.

8. A computer system for presenting athlete information comprising:
one or more computers having one or more communications links;
one or more storage devices communicably coupled to the one or more computers, the one or more storage devices storing instructions that are operable, when executed by the one or more computers, to cause the one or more computers to perform operations comprising:
receiving during a time window at a server from an electronic device a query for athlete information, the query comprising an athlete's jersey number and the server comprising a processor and storage;
determining a location associated with the electronic device;
retrieving athlete profiles for one or more candidate athletes associated with the jersey number and performing within a certain threshold value of distance to the location and within a certain threshold value of time to the time window by:
accessing a database of schedule information relating to athletic events to identify one or more athletic events occurring within a certain threshold value of distance to the location and within a certain threshold value of time to the time window;
accessing a database of roster information of athletes to identify one or more candidate athletes participating in the one or more athletic events and associated with the jersey number from the received query;
accessing a database of dynamic athlete information comprising news and social media information to identify one or more of the candidate athletes related to at least one topic; and
accessing a database associating jersey numbers with individual athletes and athlete information;
ranking the one or more athlete profiles based on one or more of a proximity factor and a status and progress of each of the one or more athletic events; and
delivering at least of a portion of the one or more athlete profiles to the electronic device according to the ranking and in response to the received query.

9. A system according to claim 8, wherein at least one of the one or more athlete profiles comprises a purchase recommendation or a betting proposition.

10. A system according to claim 8, wherein determining a location associated with the electronic device is based on location information derived from one or more of a GPS location, IP address, network location data, or a user-specified preference or setting.

11. A system according to claim 8, wherein accessing a database of schedule information relating to athletic events to identify one or more athletic events occurring within a certain threshold value of distance to the location is based on one or more of a location of a venue where an athletic event is occurring, a media market for an athletic event, or a location based on a user preference or setting.

12. A system according to claim 8, wherein the proximity factor relates to one or more of the following: a degree to which the location associated with the electronic device is within a certain threshold value of distance to a location associated with a candidate athlete, a degree to which the time window of the received query is within a certain threshold value of time to the scheduled time of an athletic event in which a candidate athlete performs, and a degree to which the time window of the received query is within a certain threshold value of time to a time window associated with the at least one topic.

13. A system according to claim 8,
wherein the step of retrieving athlete profiles for one or more candidate athletes associated with the jersey number and performing within a certain threshold value of distance to the location and within a certain threshold value of time to the time window further comprises:
accessing a database of play-by-play information to identify a recent play and one or more candidate athletes involved in the recent play;
and further wherein the proximity factor relates to one or more of the following: a degree to which the location associated with the electronic device is within a certain threshold value of distance to a location associated with a candidate athlete, a degree to which the time window of the received query is within a certain threshold value of time to the scheduled time of an athletic event in which a candidate athlete performs, and a degree to which the time window of the received query is within a certain threshold value of time to a timestamp associated with the recent play.

14. A system according to claim 8, wherein the operations further comprise:
retrieving an athlete profile for an alternate athlete associated with the jersey number and performing in an alternate athletic event not necessarily near the location by:
accessing a database of schedule information relating to athletic events to identify an alternate athletic event, the identification of the alternate athletic event being related to the status and progress of each athletic event;
accessing a database of roster information of athletes to identify an alternate athlete participating in the alternate athletic event and associated with the jersey number from the received query; and
accessing a database associating jersey numbers with individual athletes and athlete information;
and wherein ranking the one or more athlete profiles comprises ranking the one or more athlete profiles and the athlete profile for the alternate athlete based in part on an event ranking of the one or more athletic events including the alternate athletic event, the event ranking being related to the status and progress of each of the one or more athletic events including the alternate athletic event.

15. A non-transitory computer storage medium encoded with a computer program, the program comprising instructions that when executed by data processing apparatus cause the data processing apparatus to perform operations comprising:
receiving during a time window at a server from an electronic device a query for athlete information, the query comprising an athlete's jersey number and the server comprising a processor and storage;
determining a location associated with the electronic device;
retrieving athlete profiles for one or more candidate athletes associated with the jersey number and performing within a certain threshold value of distance to the location and within a certain threshold value of time to the time window by:
accessing a database of schedule information relating to athletic events to identify one or more athletic events occurring within a certain threshold value of distance to the location and within a certain threshold value of time to the time window;
accessing a database of roster information of athletes to identify one or more candidate athletes participating in the one or more athletic events and associated with the jersey number from the received query;
accessing a database of dynamic athlete information comprising news and social media information to identify one or more of the candidate athletes related to at least one topic; and
accessing a database associating jersey numbers with individual athletes and athlete information;
ranking the one or more athlete profiles based on one or more of a proximity factor and a status and progress of each of the one or more athletic events; and
delivering at least of a portion of the one or more athlete profiles to the electronic device according to the ranking and in response to the received query.

16. A computer storage medium according to claim 15, wherein at least one of the one or more athlete profiles comprises a purchase recommendation or a betting proposition.

17. A computer storage medium according to claim 15, wherein determining a location associated with the electronic device is based on location information derived from one or more of a GPS location, IP address, network location data, or a user-specified preference or setting.

18. A computer storage medium according to claim 15, wherein accessing a database of schedule information relating to athletic events to identify one or more athletic events occurring within a certain threshold value of distance to the location is based on one or more of a location of a venue where an athletic event is occurring, a media market for an athletic event, or a location based on a user preference or setting.

19. A computer storage medium according to claim 15, wherein the proximity factor relates to one or more of the following: a degree to which the location associated with the electronic device is within a certain threshold value of distance to a location associated with a candidate athlete, a degree to which the time window of the received query is within a certain threshold value of time to the scheduled time of an athletic event in which a candidate athlete performs, and a degree to which the time window of the received query is within a certain threshold value of time to a time window associated with the at least one topic.

20. A computer storage medium according to claim 15, wherein the step of retrieving athlete profiles for one or more candidate athletes associated with the jersey number and performing within a certain threshold value of distance to the location and within a certain threshold value of time to the time window further comprises:
accessing a database of play-by-play information to identify a recent play and one or more candidate athletes involved in the recent play;
and further wherein the proximity factor relates to one or more of the following: a degree to which the location associated with the electronic device is within a certain threshold value of distance to a location associated with a candidate athlete, a degree to which the time window of the received query is within a certain threshold value of time to the scheduled time of an athletic event in which a candidate athlete performs, and a degree to which the time window of the received query is within a certain threshold value of time to a timestamp associated with the recent play.

* * * * *